(12) United States Patent
Grokop et al.

(10) Patent No.: US 9,305,317 B2
(45) Date of Patent: Apr. 5, 2016

(54) SYSTEMS AND METHODS FOR COLLECTING AND TRANSMITTING TELEMATICS DATA FROM A MOBILE DEVICE

(71) Applicant: Tourmaline Labs, Inc., San Diego, CA (US)

(72) Inventors: Leonard H. Grokop, San Diego, CA (US); Lukas D. Kuhn, San Diego, CA (US)

(73) Assignee: Tourmaline Labs, Inc., San Diego, CA (US)

( * ) Notice: Subject to any disclaimer, the term of this patent is extended or adjusted under 35 U.S.C. 154(b) by 0 days.

(21) Appl. No.: 14/523,391

(22) Filed: Oct. 24, 2014

(65) Prior Publication Data

US 2015/0120336 A1    Apr. 30, 2015

Related U.S. Application Data

(60) Provisional application No. 61/895,162, filed on Oct. 24, 2013, provisional application No. 61/895,177, filed on Oct. 24, 2013, provisional application No. 61/895,190, filed on Oct. 24, 2013.

(51) Int. Cl.
*B60W 40/09* (2012.01)
*G06F 17/00* (2006.01)
(Continued)

(52) U.S. Cl.
CPC ............. *G06Q 40/08* (2013.01); *B60W 40/09* (2013.01); *H04R 3/002* (2013.01); *G06F 17/30743* (2013.01); *H04N 21/41407* (2013.01)

(58) Field of Classification Search
CPC .............. G06F 17/30743; G06K 9/00536; G06Q 30/02; H04H 60/37; H04H 60/58; H04M 1/72566; H04M 1/72569; H04M 1/72572; H04M 2250/10; H04M 2250/12; H04N 21/42203
See application file for complete search history.

(56) References Cited

U.S. PATENT DOCUMENTS 8,019,604 B2   9/2011   Ma
8,046,215 B2   10/2011  Cho
(Continued)

FOREIGN PATENT DOCUMENTS

| KR | 100692395 B1 | 3/2007 |
|----|--------------|--------|
| WO | 2013001159 A1 | 1/2013 |
| WO | 2013128064 A1 | 9/2013 |

OTHER PUBLICATIONS

International Search Report and Written Opinion dated Jan. 29, 2015 for PCT patent application No. PCT/US2014/062219.
(Continued)

*Primary Examiner* — Curtis Kuntz
*Assistant Examiner* — Thomas Maung
(74) *Attorney, Agent, or Firm* — The Mueller Law Office, P.C.

(57) ABSTRACT

A method of analyzing audio signals, such as for a drive monitoring system, includes recording an audio signal from a mobile device, the audio signal including a background audio stream and a residual audio signal. Communication with an audio database is performed to obtain a reference signal. If a match between the background audio stream and the reference signal is determined, a time alignment between the background audio stream and the reference is computed. At least a portion of the recorded audio signal is aligned with the reference signal using the time alignment. The background audio stream is canceled from the recorded audio signal, to result in the residual audio stream. A computer processor is used to determine a driving behavior factor from the residual audio stream.

9 Claims, 26 Drawing Sheets

(51) Int. Cl.
*G06Q 40/08* (2012.01)
*H04R 3/00* (2006.01)
*G06F 17/30* (2006.01)
*H04N 21/414* (2011.01)

(56) References Cited

U.S. PATENT DOCUMENTS

| | | |
|---|---|---|
| 8,175,007 B2 | 5/2012 | Jain et al. |
| 8,290,480 B2 | 10/2012 | Abramson et al. |
| 8,571,863 B1 | 10/2013 | Harb et al. |
| 8,635,091 B2 | 1/2014 | Amigo et al. |
| 8,700,406 B2 | 4/2014 | Grokop et al. |
| 8,788,193 B2 | 7/2014 | Fauci et al. |
| 8,930,229 B2 | 1/2015 | Bowne et al. |
| 8,930,231 B2 | 1/2015 | Bowne et al. |
| 2006/0253282 A1 | 11/2006 | Schmidt et al. |
| 2008/0255888 A1 | 10/2008 | Berkobin et al. |
| 2009/0284361 A1 | 11/2009 | Boddie et al. |
| 2011/0106440 A1 | 5/2011 | Adradi |
| 2011/0161116 A1 | 6/2011 | Peak et al. |
| 2011/0307786 A1 | 12/2011 | Shuster |
| 2012/0172055 A1 | 7/2012 | Edge |
| 2013/0006633 A1 | 1/2013 | Grokop et al. |
| 2013/0046510 A1 | 2/2013 | Bowne et al. |
| 2013/0179198 A1 | 7/2013 | Bowne et al. |
| 2013/0279703 A1 | 10/2013 | Goldstein et al. |
| 2014/0004901 A1 | 1/2014 | Korn |
| 2014/0108058 A1 | 4/2014 | Bourne et al. |
| 2014/0278206 A1 | 9/2014 | Girod et al. |

OTHER PUBLICATIONS

Chiu, Background music identification through content filtering and min-hash matching, Acoustics Speech and Signal Processing (ICASSP), Mar. 14-19, 2010, pp. 2414-2417, 2010 IEEE International Conference, Dallas, TX.

Coxworth, Algorithm could drastically improve the performance of hearing aids, www.gizmag.com, Nov. 16, 2013, Accessed Sep. 24, 2014, www.gizmag.com/hearing-aid-noise-filtering-algorithm/29799/.

Ericsson, Automatic speech/music discrimination in audio files, Master's thesis in Music Acoustics at the School of Media Technology, Royal Institute of Technology, 2009, Accessed on Sep. 24, 2014, www.speech.kth.se/prod/ publications/files/3437.pdf.

Healy et al., Abstract for an algorithm to improve speech recognition in noise for hearing-impaired listeners, The Journal of the Acoustical Society of America, Aug. 2013, Accessed on Sep. 24, 2014, scitation.aip.org/content/asa/journal/jasa/134/4/10.1121/1.4820893.

Ma et al., Context Awareness using Environmental Noise Classification, 8th European Conference on Speech Communication and Technology—Eurospeech 2003, In Conference Proceedings 2237-2240, Geneva, Switzerland, Sep. 2003.

VoxSigma Speech-to-Text Software Suite, Vocapia Research SAS, Accessed on Sep. 24, 2014, www.vocapia.com/voxsigma-speech-to-text.html.

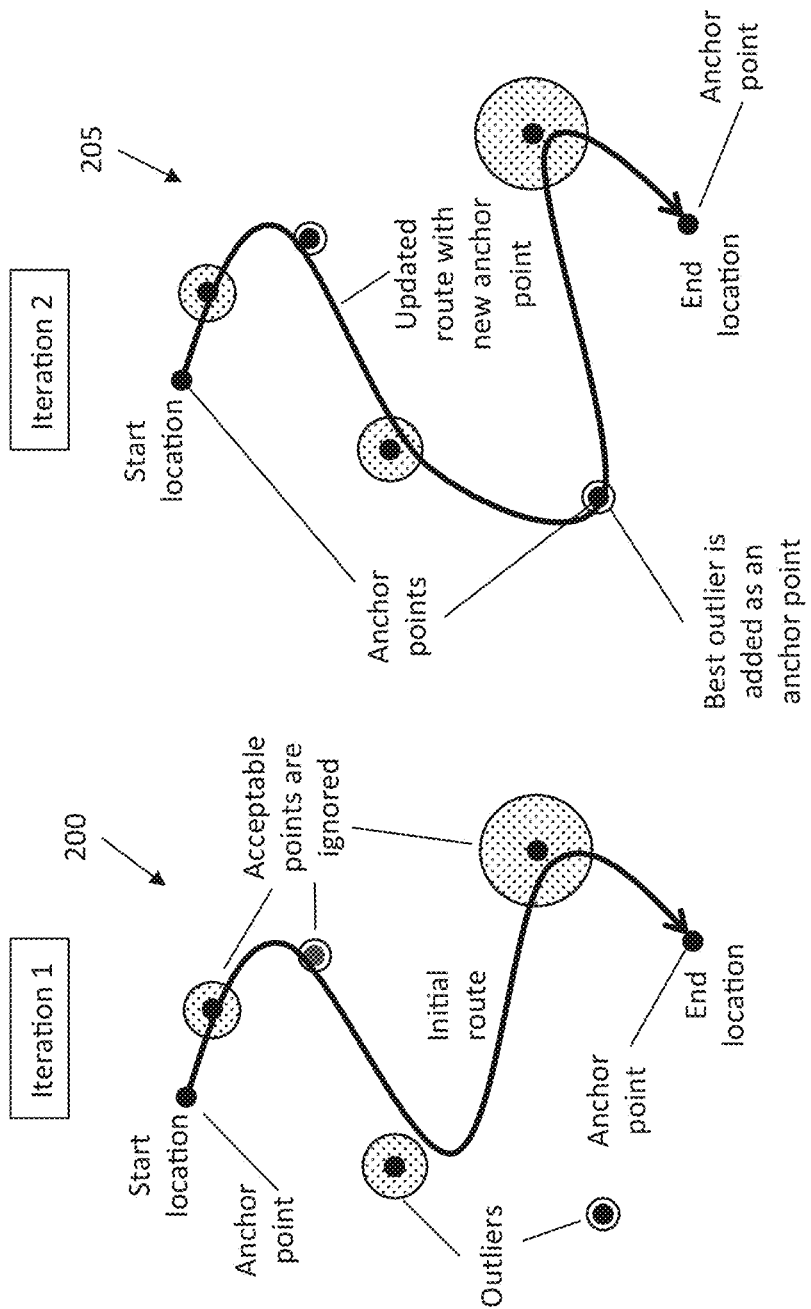

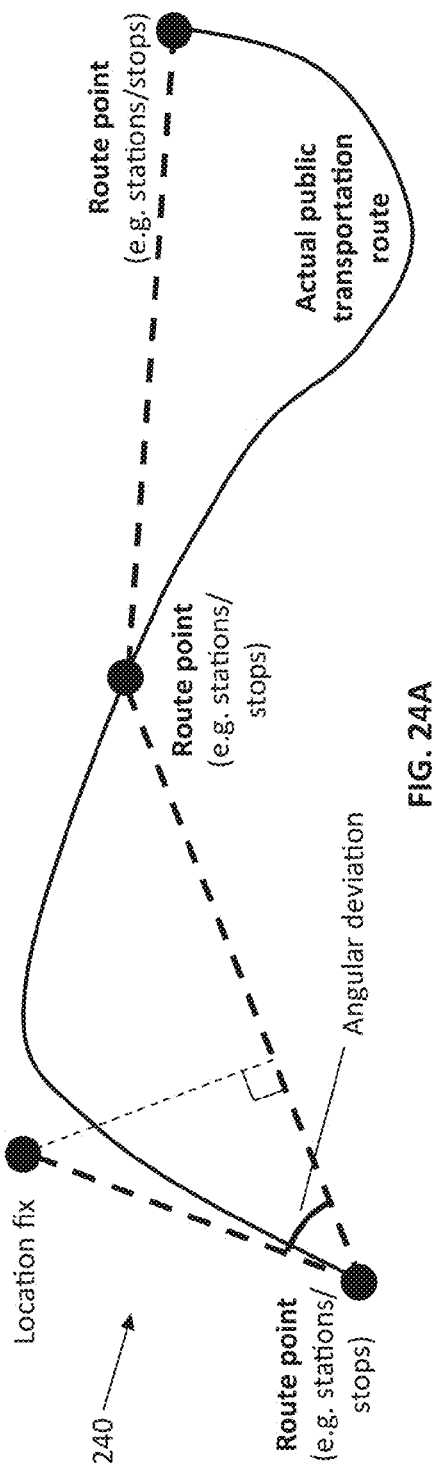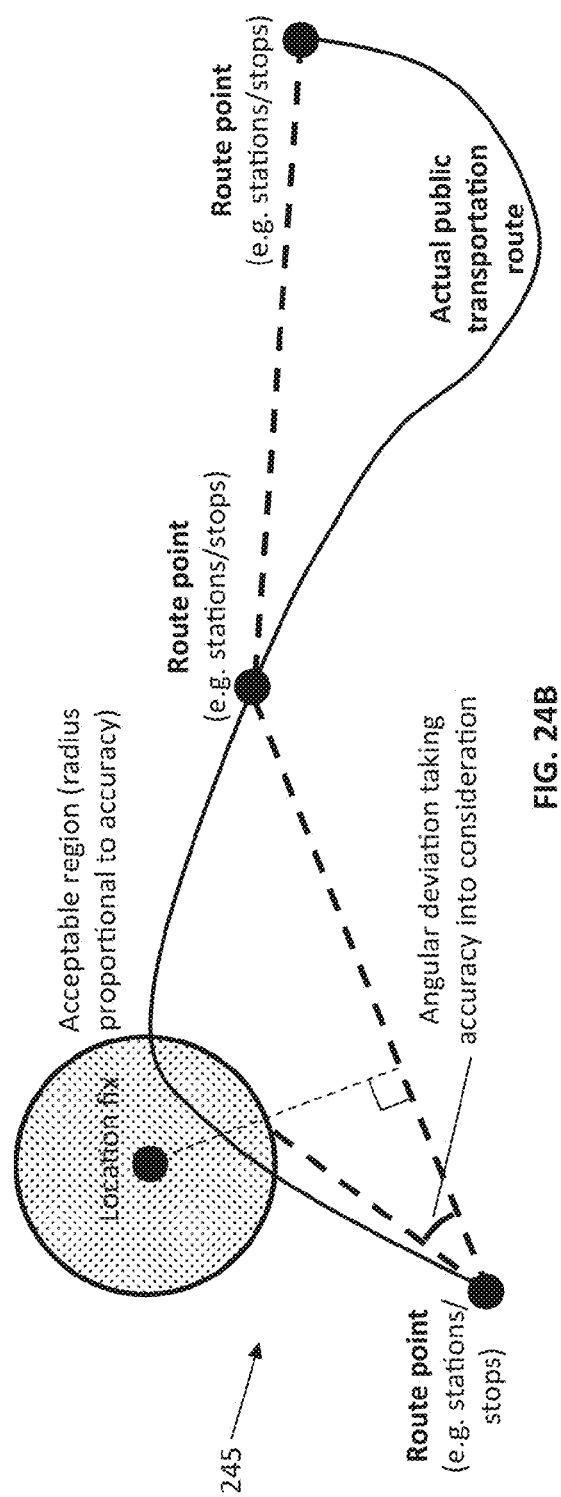
FIG. 24A
FIG. 24B

SYSTEMS AND METHODS FOR COLLECTING AND TRANSMITTING TELEMATICS DATA FROM A MOBILE DEVICE

RELATED APPLICATIONS

This application claims priority from 1) U.S. Provisional Patent Application No. 61/895,162 filed on Oct. 24, 2013 and entitled "Systems and Methods for Collecting and Transmitting Telematics Data from a Mobile Device"; from 2) U.S. Provisional Patent Application No. 61/895,177 filed on Oct. 24, 2013 and entitled "Systems and Methods for Collecting and Transmitting Telematics Data from a Mobile Device"; and from 3) U.S. Provisional Patent Application No. 61/895,190 filed on Oct. 24, 2013 and entitled "Systems and Methods for Collecting and Transmitting Telematics Data from a Mobile Device"; all of which are hereby incorporated by reference for all purposes. This application is also related to U.S. Provisional Patent Application No. 61/940,777 filed on Feb. 17, 2014 and entitled "System and Methods for Estimating Movements of a Vehicle Using a Mobile Device," which is hereby incorporated by reference for all purposes.

BACKGROUND OF THE INVENTION

Mobile devices such as smartphones and tablets have become a common tool for both personal uses as well as business applications. Mobile devices are used in many ways in addition to their traditional role as a communication device, such as for performing shopping transactions, mapping destinations, measuring health parameters, and recording images. The data gathered during usage of a mobile device can be used for analysis purposes, such as for tracking fitness, most frequently visited locations, consumer preferences, and the like.

Automobile insurance is an area in which telematics from mobile devices can be useful. For example, a mobile device can be used to provide information on the number of trips and miles traveled, and then a generating a score for insurance underwriting purposes, based on the data. In another example, a mobile device may be fixed into a vehicle, and driver operation characteristics such as location data, vehicle speed, acceleration can be gathered and utilized by an insurance company.

As mobile devices become more widespread in use, there continue to be further opportunities to utilize these devices as valuable tools in insurance and other areas.

SUMMARY OF THE INVENTION

In one embodiment, a method of analyzing audio signals for a drive monitoring system includes recording an audio signal from a mobile device, the audio signal including a background audio stream and a residual audio signal. Communication with an audio database is performed to obtain a reference signal, using a location identifier such as GPS, cellular network, Wifi signature, or IP address. It is determined if the background audio stream in the recorded audio signal matches the reference signal. If a match between the background audio stream and the reference signal is confirmed, a time alignment between the background audio stream and the reference signal is computed. At least a portion of the recorded audio signal is aligned with the reference signal using the time alignment. The background audio stream is canceled from the recorded audio signal, where the remaining portion of the recorded audio signal, after cancellation of the background audio stream, is the residual audio stream. A computer processor is used to determine a driving behavior factor from the residual audio stream, wherein the driving behavior factor can be identification of a vehicle where the recorded audio signal was recorded, location of the mobile device within the vehicle, and speech recognition to identify the presence of passengers in the vehicle.

In another embodiment, a method of analyzing audio signals for an automobile insurance system includes recording an audio signal from a mobile device, the audio signal including a background audio stream and a residual audio signal. Communication with an audio database is performed to obtain a reference signal. It is determined if the background audio stream in the recorded audio signal matches the reference signal. If a match between the background audio stream and the reference signal is confirmed, a time alignment between the background audio stream and the reference signal is computed. At least a portion of the recorded audio signal is aligned with the reference signal using the time alignment. The background audio stream is canceled from the recorded audio signal, where the remaining portion of the recorded audio signal, after cancellation of the background audio stream, is the residual audio stream. A computer processor is used to determine a driving behavior factor from the residual audio stream.

In a further embodiment, a method of analyzing audio signals for a drive monitoring system includes recording an audio signal from a mobile device, the audio signal including a background audio stream and a residual audio signal. Communication with an audio database is performed to obtain a reference signal. It is determined if the background audio stream in the recorded audio signal matches the reference signal. If a match between the background audio stream and the reference signal is confirmed, a time alignment between the background audio stream and the reference signal is computed. The computing includes taking pilot snippets of the reference signal and aligning the pilot snippets with a start time and an end time of the recorded audio signal. At least a portion of the recorded audio signal is aligned with the reference signal using the time alignment. The background audio stream is canceled from the recorded audio signal, where the remaining portion of the recorded audio signal, after cancellation of the background audio stream, is the residual audio stream. A computer processor is used to determine a driving behavior factor from the residual audio stream, where the driving behavior factor relates to automobile insurance.

BRIEF DESCRIPTION OF THE DRAWINGS

Each of the aspects and embodiments of the invention described herein can be used alone or in combination with one another. The aspects and embodiments will now be described with reference to the attached drawings.

FIGS. 20A-20B are exemplary diagrams of recursive route interpolation.

FIGS. 24A-24B are exemplary diagrams of angular deviation of location fix from a route.

DETAILED DESCRIPTION OF THE EMBODIMENTS

Overview

Figure 1:
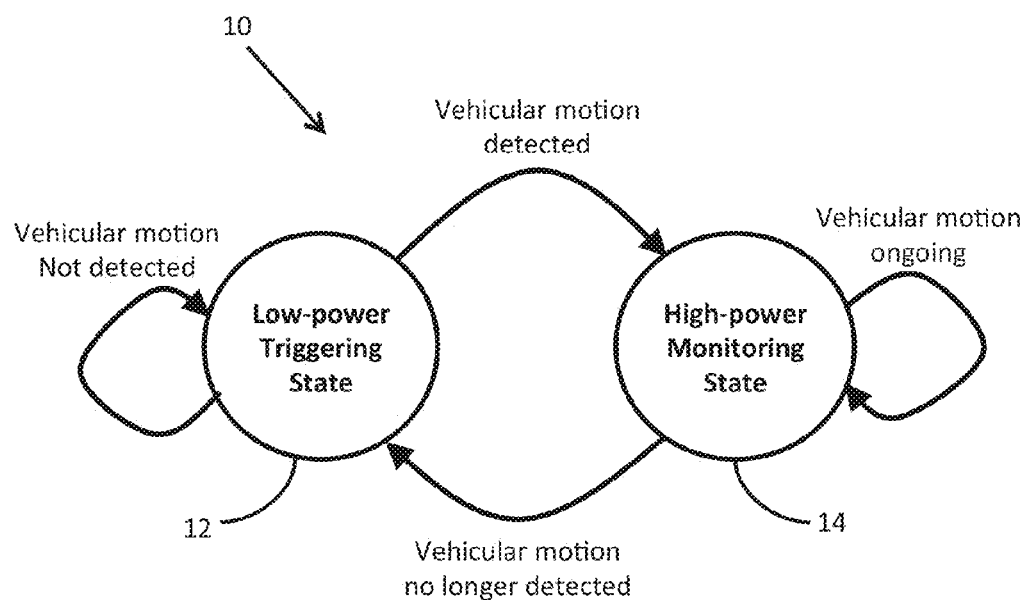
FIG. 1 is an exemplary diagram of triggering and monitoring states.

A system for collecting and transmitting telematics data from a user's mobile device, to one or more automobile insurers, is described. The telematics data contains information that may be correlated with the risk of claim/accident. From this data and other information, the insurer may compute either a policy premium for the user, or a policy discount (e.g. expressed as a percentage). The user may or may not be a current customer of any given insurer.

The mobile device-based telematics system may be used as part of an auto-insurance brokerage, whereby the provider of the telematics data, receives a commission from an insurer for each new customer that signs a policy with them based on using the mobile device-based telematics system.

The system consists of front-end software (the application, or app) running on the user's mobile device that communicates through a wireless network (or otherwise) with software running on a backend server. For the purposes of this disclosure, a mobile device shall refer to a smartphone, tablet, smartwatch, or other similar devices.

The front-end app uses sensors on the mobile device to detect when the user may be driving. When such a determination is made, more intensive sensor monitoring and processing/computation begins. During the monitoring period more sensor data is collected and various features are computed from it and stored, e.g. speed, braking g-forces, etc. This continues until it is determined that the user is no longer driving. After this, various summary features are computed, such as the route taken, start and end times, etc. The summary features and the features computed during the drive are then wirelessly uploaded to a backend server that sorts this information and writes it to a database entry.

In one instantiation the insurer directly accesses part, or all of this database to obtain the data it needs to underwrite a discounted policy for each user. In another instantiation, the database is used to compute a drive score for each user. The score may reflect the risk of accident of the cost of insuring each user relative to the remaining users in the database. The scores may be made available to different insurers who use it to compute policy discounts. The policy discounts may be offered back to the users via an auto-insurance brokerage.

Although the examples herein shall be described in relation to automobile insurance applications, various concepts may be utilized for other applications as well. For example, audio analysis may be used for identifying a room or an office as the ambient environment, for improved speech recognition in noisy environment, or to improve speech quality for voice calls. Vehicle identification applications include, for example, parking API's or fleet management. The various driving behavior characteristics can be used for drive monitoring systems other than insurance. For example, measuring the device's location within a vehicle can be used to determine if the user is the driver or a passenger within the vehicle. From the driving behavior characteristics, notifications and feedback can be given to the user for educational or other purposes. The driving behavior can be employed in multiplayer online gaming to provide a more real-world experience. The driving behavior can also be used for mobile payment applications, such as road tolls, registration fees and parking meter fees.

State Machine with Triggering and Monitoring States

The front end system resides on a mobile device such as a smartphone, smartwatch, tablet, etc. As shown in FIG. 1, the system 10 can be in one of two states: a triggering state 12 or a monitoring state 14. The purpose of the triggering state 12 is to detect the start of a drive event in a low-power way. The purpose of the high-power monitoring state 14 is to collect information that may be pertinent to assessing the risk of accident. The system 10 switches from the triggering state 12 to the monitoring state 14 when it detects vehicular motion, indicating the start of a driving event. It switches back to the triggering state 12 when a sufficient period of time has elapsed without seeing evidence that the user is still driving, or if another event has been detected such as the user walking.

In the triggering state 12, operations that have little impact on battery drain are performed to attempt to ascertain whether or not there is any form of vehicular motion. For instance, the identifying number of the base station or cellular region to which the mobile device is connected may be examined to determine if a number of unique hand-offs have occurred in recent rapid succession, indicating possible vehicular movement. In the monitoring state 14, operations that may have a more noticeable impact on battery drain, such as GPS fixes, are performed to log information about movements, vehicle usage, driving behavior, and general context of the user. The decomposition of the system 10 into a low-power triggering state 12 and a higher power monitoring state 14 minimizes overall average battery drain under the assumption that the user will only be riding in a moving vehicle for a fraction of the day.

Additionally, in other embodiments, other operations occur from time to time in the background such as motion sensor calibration, location fix acquisition, and Wifi scanning.

Concurrent Wake Ups

Figure 2:
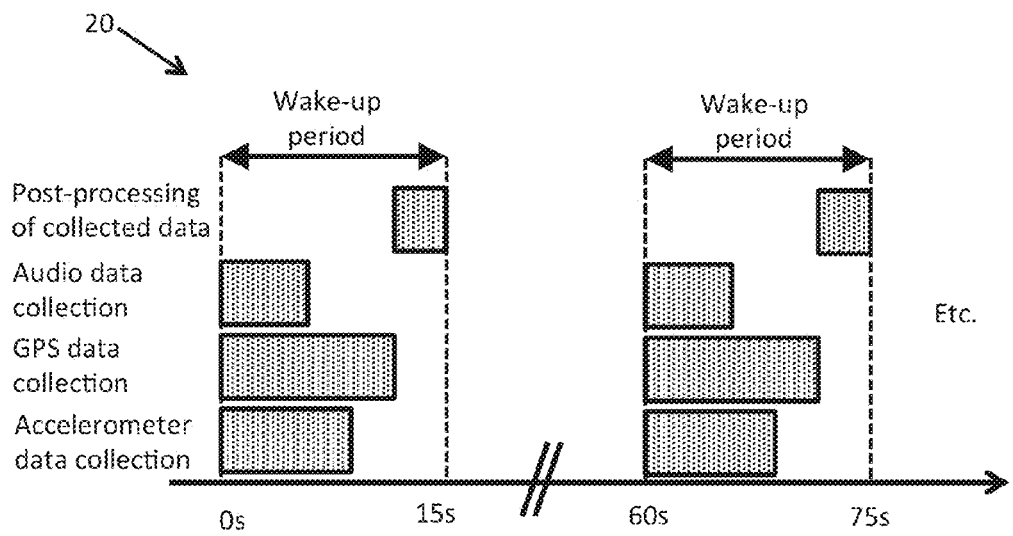
FIG. 2 is an exemplary chart showing synchronous operation during wake periods.

In both triggering and monitoring states, all operations are performed during a given wake up period. As during the wake up period the device's application processor is operating in a higher power state, it is important to perform all such operations in a synchronized and concurrent manner in order to minimize overall power consumption. This synchronous operation during wake up period is illustrated in chart 20 of FIG. 2.

Triggering State

In the triggering state the system wakes periodically and performs a sequence of checks. Each check is designed to rule out the possibility of vehicular motion. The checks are ordered such that the lower power checks are performed before higher power checks. In this manner overall power consumption is minimized. The following are examples of checks that can be used to determine if vehicular movement may be present:

Collecting motion data and analyzing it to determine whether or not the device is stationary.

Collecting motion data and running it through an activity recognizer that has been trained to differentiate between vehicular motion (such as driving a car, riding on a bus, train, etc.) and other motions such as walking, running, bicycling, tilting the device in one's hand, etc.

Checking whether the mobile device is currently connected to a tethered wireless access point (AP) such as a Wifi router, or a Bluetooth device in a printer, desktop computer, etc.

Performing successive Wifi or Bluetooth scans to determine if the list of visible APs or devices is changing over time.

Checking whether the mobile device has been rapidly handing off its cellular connection between a succession of mobile cellular regions.

Performing a GPS fix and examining the speed obtained through the fix to ascertain whether the mobile device is moving at a speed associated with vehicular movement.

Using a Low-Power Activity Recognizer to Trigger a Higher-Power One

Figure 3:
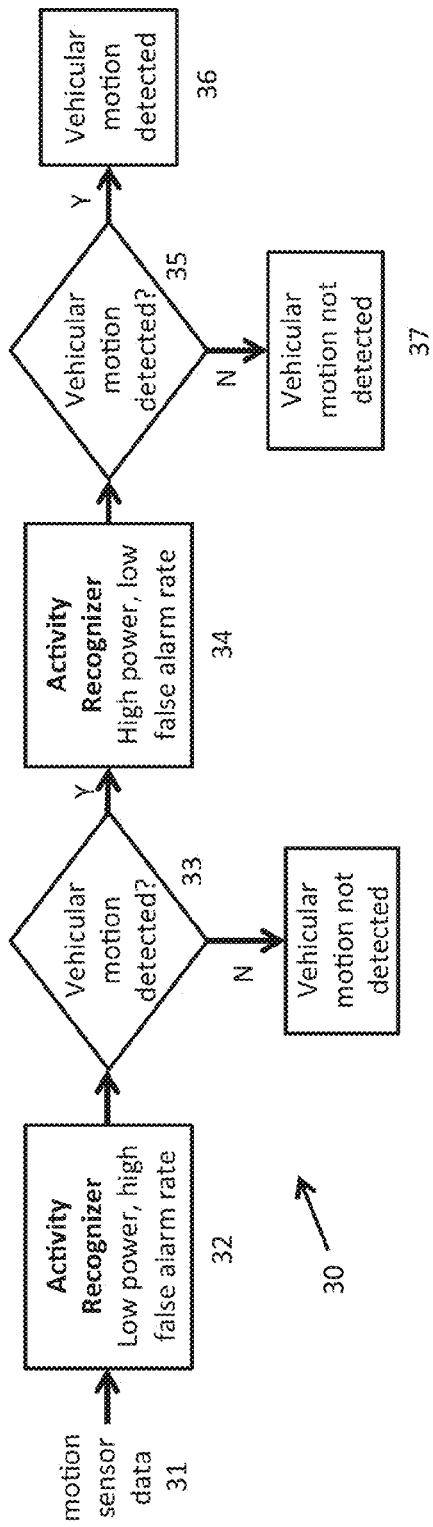
FIG. 3 is a flowchart of an embodiment using a low-power activity recognizer to trigger a higher-power one.

Multiple activity recognizers with different associated power usages and levels of accuracy can be used for analyzing motion for possible vehicular movement. For instance, an activity recognizer with low power usage but high false alarm rate can be used to trigger a check from an activity recognizer with high power usage and low false alarm rate. In this way overall power consumption can be minimized. This is shown in the flowchart 30 of FIG. 3, demonstrating an exemplary embodiment of using a low-power activity recognizer to trigger a higher-power one. To illustrate this consider, as an example, a low-power activity recognizer with a 25% false alarm rate and a 99% detection rate that requires 10 ms of compute time, and a high-power activity recognizer with a 5% false alarm rate and a 99% detection rate that requires 100 ms of computation time. Assume the user rides in a vehicle 5% of the time (e.g. 1.2 hours per day). The system wakes once a minute to acquire motion sensor data 31 and runs the low-power activity recognizer 32, which if it detects vehicular motion 33 triggers the high-power activity recognizer 34 to determine definitively whether vehicular motion 35 is present (36) or not (37). The average amount of computation per minute is then 10 ms+0.05*0.99*100 ms+0.95*0.25*100 ms=33.7 ms and the detection rate is 0.99*0.99=98%. In comparison, running only the high-power recognizer results in a 99% detection rate but with 100 ms of computation every minute.

Figure 4:
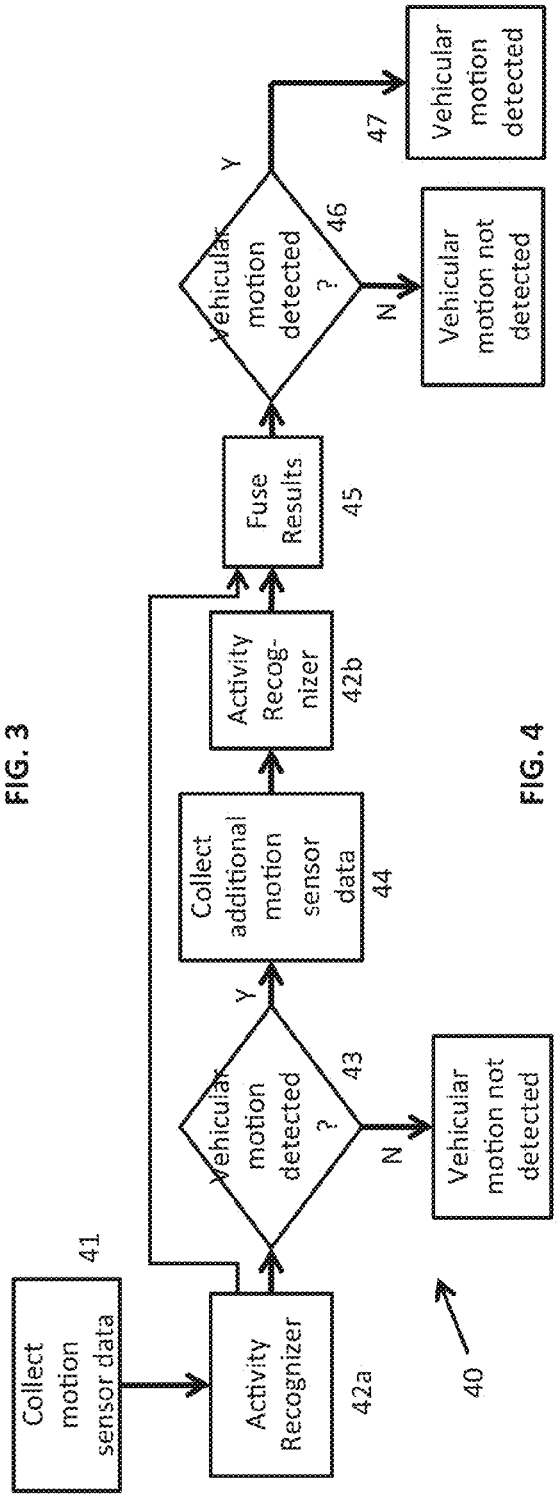
FIG. 4 is a flowchart of an embodiment using detection output of an activity recognizer to trigger collection and analysis of additional data.

Using the Detection Output of an Activity Recognizer to Trigger the Collection and Analysis of Additional Data An activity recognizer may be run on different durations of collected motion data with the accuracy of the result generally increasing with the duration. This design is illustrated in the flowchart 40 of FIG. 4, which shows an exemplary embodiment of using the detection output of an activity recognizer to trigger the collection and analysis of additional data. In order to reduce overall power consumption, an activity recognizer 42*a* may first be run on a short duration of motion data 41. If the result indicates the mobile device is in a moving vehicle (decision point 43, vehicular motion detected), a second duration of motion data 44 may be collected and the activity recognizer 42*b* run on the combined set of collected data (fuse results, 45) with increased accuracy. If the result now indicates vehicular motion at step 46, then vehicular motion 47 is assumed. Some activity recognizers 42*a*, 42*b* such as a Bayesian classifier can be easily configured to combine results already computed from previous data. Such recognizers need not be additionally re-run on the combined set of collected data, but rather, only on the second duration of data, the result being fused with the result from the first duration. This saves additional power.

Collecting Additional Location Data in the Triggering State

In some cases the user may have changed location without vehicular movement. For example, the user may have walked down the street or ridden a bicycle to the grocery store. It may be beneficial to keep track of such location movements. For example, if a user walks out of their apartment, then walks a mile up the street and down into a subway station, it may be beneficial to acquire a location fix prior to entering the station, as it may not be possible to acquire one inside. A number of different techniques can be used to achieve this. For instance, a walking counter can be kept: each wake-up period during which an activity recognizer detects walking, the counter is incremented. When walking is not detected the counter is reset to 0. When the counter reaches N it is reset to 0 and a location fix is acquired. This ensures a location fix is obtained each distance the user walks corresponding to at least N successive wake-up periods. For example, if N=3, the wake-up period is 1 minute, and the user walks continuously at 1 meter per second, a location fix will be obtained every 180 meters. With these parameters, if the user walks immediately down the street and into a subway station, the system will acquire a "last" location fix within 180 meters of the subway station entrance.

The above technique can be broadened to obtain additional location data during periods of movement via other non-vehicular means, for example running, riding a bicycle, skateboarding, etc. This can be achieved by training an activity recognizer to detect these activities. A non-vehicular movement counter is then kept. Each wake-up period during which a non-vehicular movement is detected, the counter is incremented. When non-vehicular movement is not detected, the counter is reset to 0. When the counter reaches N, it is reset and a location fix is acquired.

Figure 5:
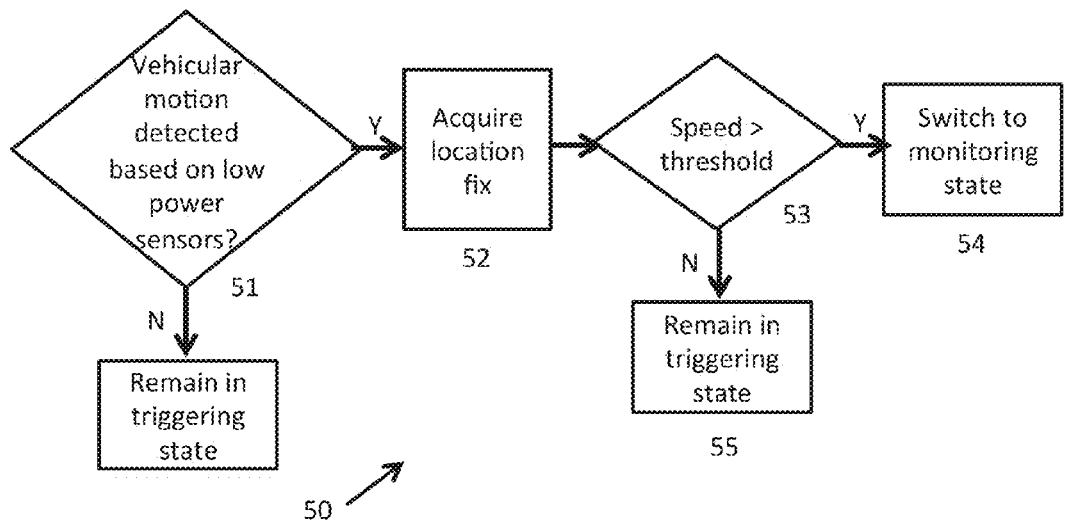
FIG. 5 is an exemplary flowchart of performing a final speed value check to further reduce the occurrence of false alarms.

Performing a Final Speed Value Check to Further Reduce the Occurrence of False Alarms In order to further reduce the number of times the system switches into monitoring state when vehicular motion does not actually exist (false alarms), an additional check can be performed by acquiring a GPS fix and performing a speed check. The technique is illustrated in flowchart 50 of FIG. 5, which shows an embodiment of performing a final speed value check to further reduce occurrence of false alarms. In step 51, the system determines if vehicular motion is detected based on low power sensors. In step 52, a location fix is acquired. If the speed is greater than a certain threshold (e.g. 5-7 mph) in step 53, the switch to monitoring state 54 is made, otherwise, the system remains in triggering state 55.

Using a Mobility State Machine to Reduce the False Alarm Rate

Figure 6:
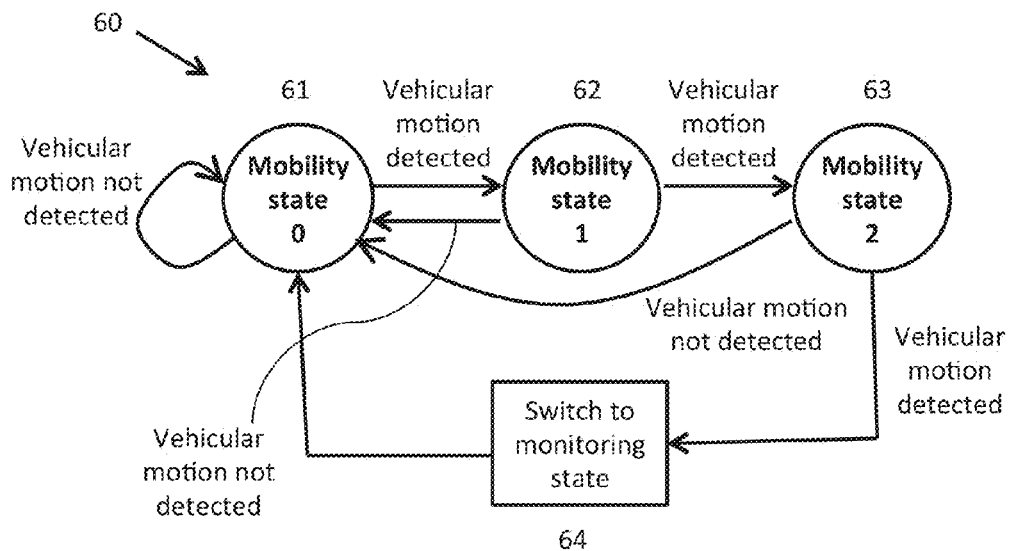
FIG. 6 is an embodiment of using a mobility state machine to reduce the false alarm rate.

A mobility state machine may be used to reduce the number of false alarm vehicular motion events detected. This is illustrated in flowchart 60 of FIG. 6, showing an embodiment of using a mobility state machine to reduce the false alarm rate. In FIG. 6, multiple mobility states 61, 62 and 63 are shown. The mobility state captures the number of successive wake-ups during which vehicular movement has been detected. When vehicular movement has been detected during N successive wake-up periods, the system switches from the triggering state to the monitoring state 64.

Detecting Arbitrary Trips

The afore-described techniques for detecting the start of vehicular motion can be broadened to detect the start of any trip of extended during such as going for a walk, going for a run, riding a bicycle, riding in a moving vehicle, etc. This can be achieved by training the activity recognizer to detect a plurality of mobility types such as walking, running, bicycling, vehicular motion, etc. When a particular mobility type is detected, the system may switch from the triggering state to the monitoring state. Depending on which mobility type was detected, different configurations of the monitoring state may be used. For instance, if a walk is detected, the monitoring state may only monitor location in order to determine the route taken, whereas if vehicular motion is detected, the monitoring state may also monitor driving behavior.

Mobility State Machine with Multiple Mobility States

Figure 7:
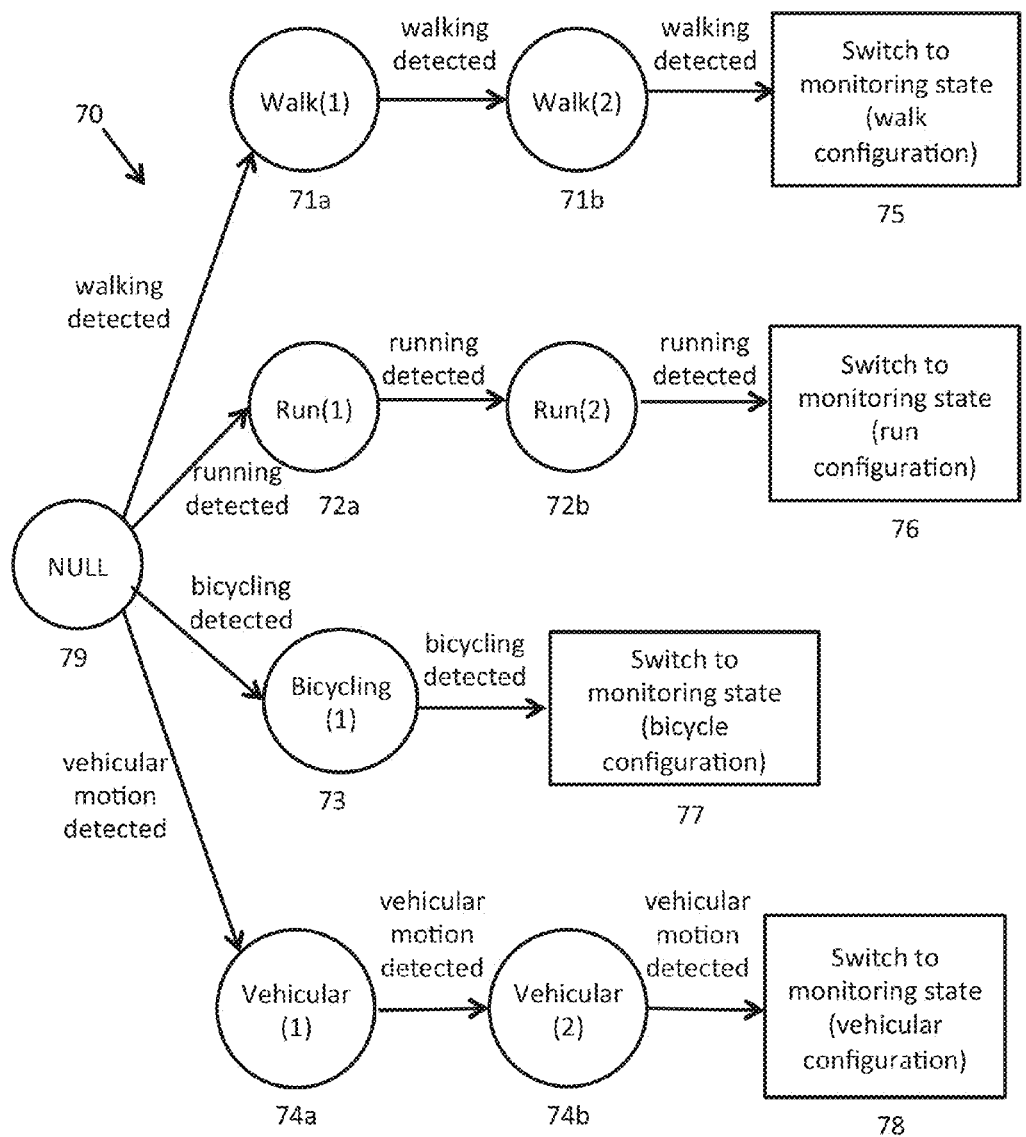
FIG. 7 is an exemplary diagram of a mobility state machine with multiple mobility states.

The mobility state machine can be expanded to include multiple mobility states such as walking, running, bicycling, vehicular motion, etc. Each state has a number of sub-states. This is illustrated in the flowchart 70 of FIG. 7, showing an exemplary mobility state machine with multiple mobility states. For instance, there may be two walk sub-states 71*a* and 71*b*, two run sub-states 72*a* and 72*b*, one bicycle sub-state 73, and two vehicular sub-states 74*a* and 74*b*, requiring either two successive walk detections, two successive run detections, one successive bicycle detection or two successive vehicular detections, in order to switch from the triggering state to a monitoring state 75, 76, 77 or 78. All other detected activities (other than NULL 79) result in returning to the first state for the detected activity. For example, if walking is detected in Vehicular(2) state 74*b*, the next state is Walk(1) state 71*a*. Detecting NULL 79 always results in transitioning to the NULL state.

Example Embodiments

Figure 8:
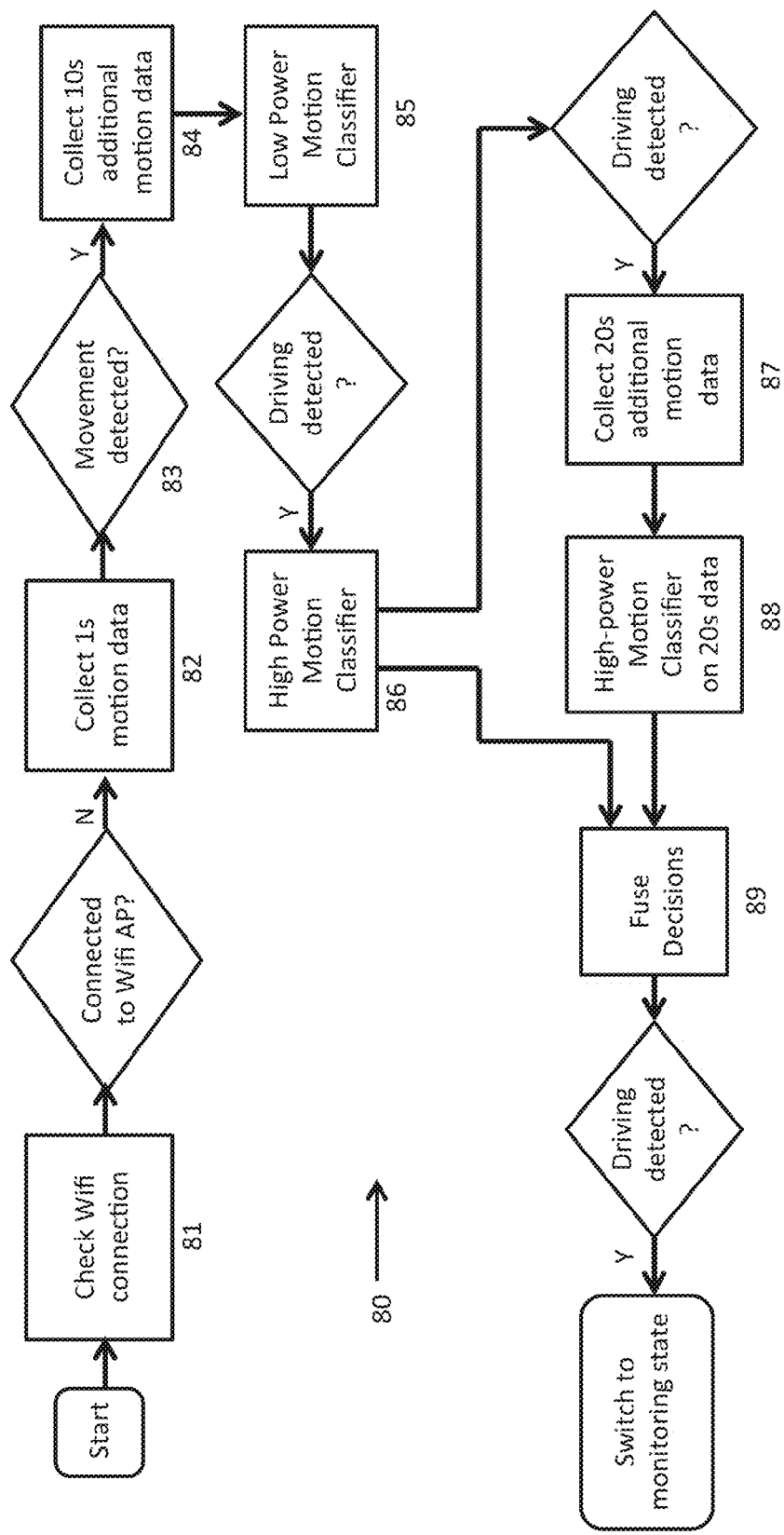
FIG. 8 is an exemplary decision flow for a triggered low-power architecture.

One embodiment uses a decision flow consisting of a sequence of checks as illustrated in flowchart 80 of FIG. 8, which shows an exemplary decision flow for a triggered low-power architecture. The method in this embodiment is as follows: first, check if the mobile device is connected to a Wifi AP in step 81. This is an extremely low power operation as this information is already made available by the hardware. If the mobile device is not connected, collect an amount, such as 1 second, of accelerometer data at step 82 and check if there is any device movement (versus at rest) at step 83. If movement is detected, collect another amount, such as 10 seconds, of additional accelerometer data at step 84 and run it through a low-power/high-false alarm rate activity recognizer 85 (also referred to as a motion classifier). If the low-power activity recognizer 85 reports vehicular motion, run the same data through a high-power/low-false alarm rate activity recognizer 86 (also referred to as a motion classifier). If the high power activity recognizer 86 reports vehicular motion, collect another amount, such as 20 seconds, of additional accelerometer data at step 87 and run it through a high-power/low-false alarm rate activity recognizer 88. Next, the output of this decision is fused in step 89 with the output of the decision made on the previous 10 seconds of data. If the fused decision reports vehicular motion, then switch from the triggering state to the monitoring state.

Figure 9:
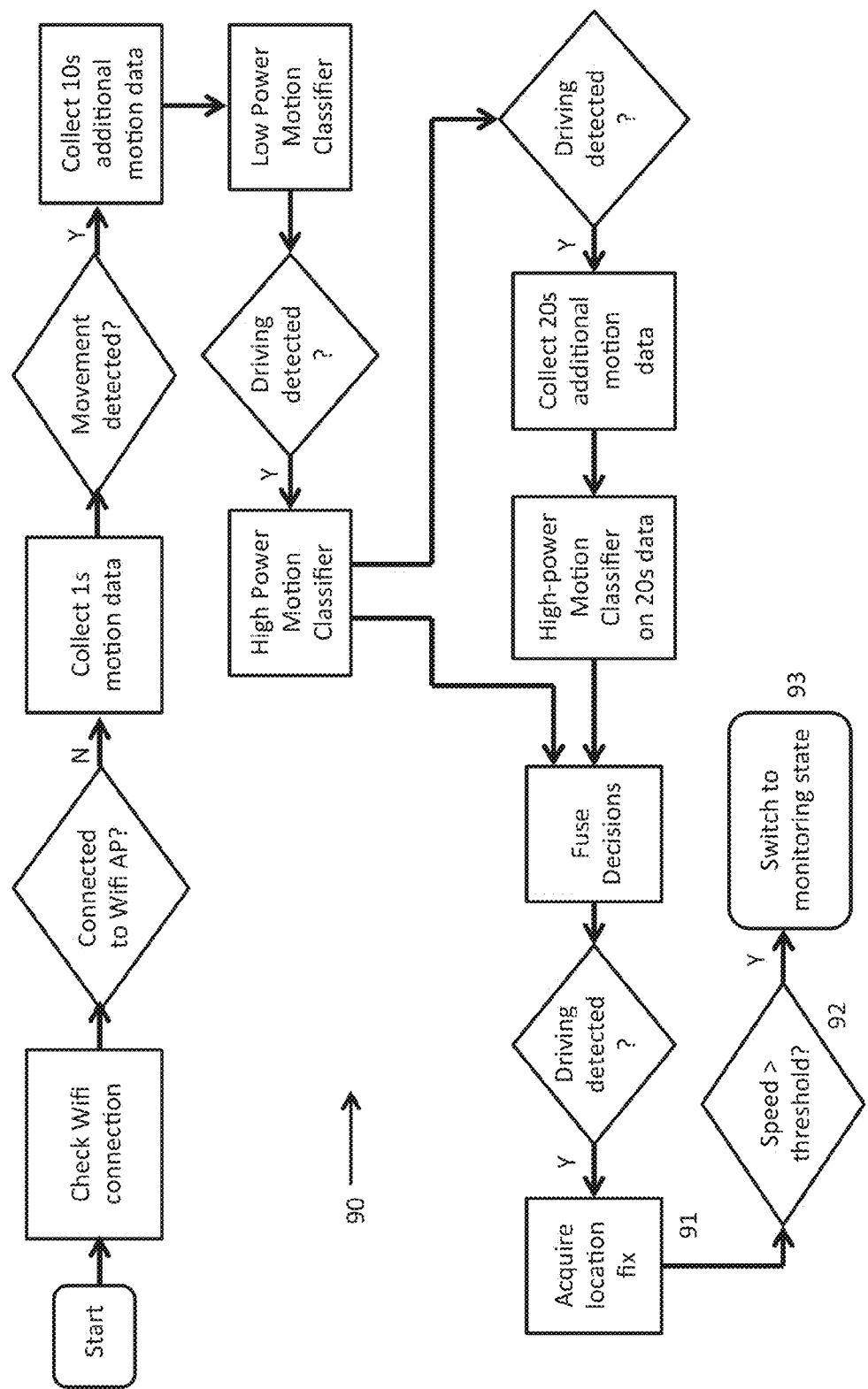
FIG. 9 is an exemplary decision flow for a triggered low-power architecture with Global Positioning System (GPS) at the end.

A variant of this embodiment is illustrated in flowchart 90 of FIG. 9, showing an exemplary decision flow for a triggered low-power architecture with GPS fix at the end. In this embodiment of FIG. 9, the method adds an additional final step of performing a single GPS fix at step 91, and examining the speed obtained through the fix to ascertain at step 92 whether the mobile device is moving at a speed greater than a certain threshold. A threshold of, for example, 5-7 mph works well as this eliminates those occasions during which the user is walking or moving the device around without being in a moving vehicular. If the speed is greater than the threshold, then the system switches to the monitoring state at step 93.

Figure 10:
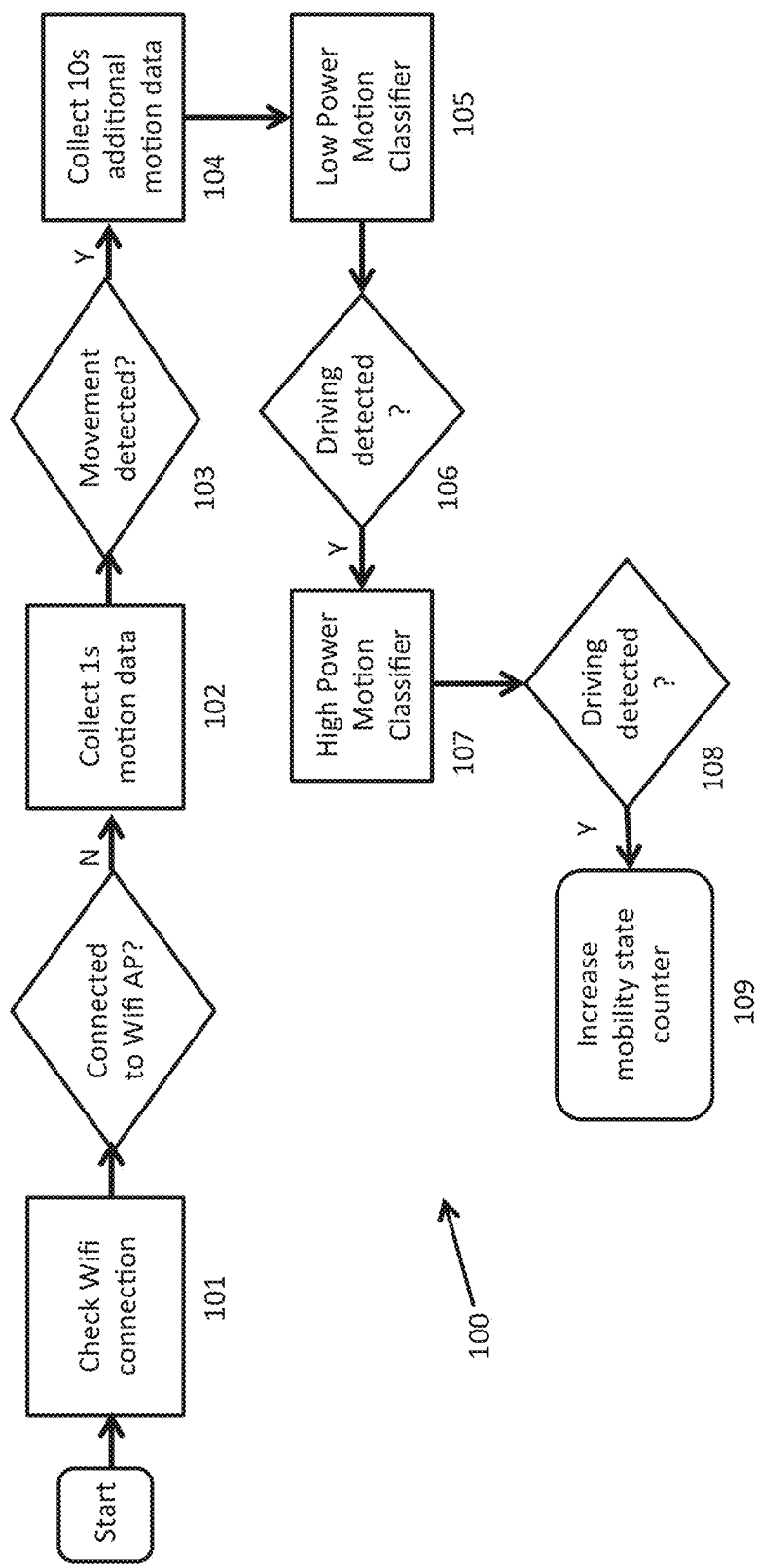
FIG. 10 is an exemplary decision flow with a mobility state machine.

Another embodiment uses a similar, simplified decision flow coupled with a mobility state machine. This variant is illustrated in flowchart 100 of FIG. 10, showing a decision flow with mobility state machine. During a wake-up period, first the system checks if the mobile device is connected to a Wifi AP at step 101. If it is not connected, collect 1 second of accelerometer data, or other suitable sample amount, at step 102, and check if there is any device movement at step 103. If so, collect 10 seconds of additional accelerometer data, or other suitable amount, at step 104 and run it through a low-power/high false alarm rate activity recognizer 105. If the lower power activity recognizer 105 reports vehicular motion at step 106, run the same data through a high-power/low-false alarm rate activity recognizer 107. If the high power activity recognizer 107 reports vehicular motion at step 108, increase the mobility state by 1 at step 109. Otherwise, reset the mobility state to 0. When the mobility state reaches N, the system switches from the triggering state to the monitoring state. A typical value of N may be, for example, 2 or 3.

Detecting Movement

Movement of the mobile device can be detected in a low-power fashion by collecting and analyzing motion sensor data such as data from an accelerometer. This can be done by computing a standard deviation of the norm of the accelerometer data. If the resulting value is greater than a threshold τ, movement is reported; otherwise, no movement is reported. Also, a check on the mean of the accelerometer data can be compared to the known accelerometer output for a device at rest to determine if there is movement.

If an accelerometer sample at time t is given by a triple $(a_x(t), a_y(t), a_x(t))$ then the norm is computed as $$n_t = \sqrt{a_x(t)^2 + a_y(t)^2 + a_z(t)^2}$$

and the standard deviation is computed as $$\sigma = \sqrt{\frac{1}{T-1} \sum_{t=1}^{T} (n_t - \mu)^2}$$

where the mean is $$\mu = \frac{1}{T} \sum_{t=1}^{T} n_t \qquad (2)$$

and where T is the number of samples of accelerometer data collected. A typical value for the threshold $\tau = 0.2$ m/s². Also if the difference between the mean, μ, and the acceleration output for a device at rest, 1 g=9.8 m/s², is greater than a threshold, for example a threshold of 0.3 g, then the device is also considered to be undergoing motion.

Activity Recognition

Figure 11:
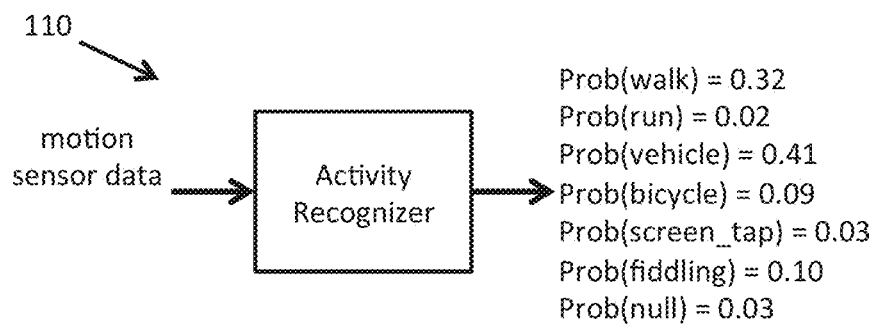
FIG. 11 is an embodiment of activity recognition.

An activity recognizer may be trained on motion sensor data to detect the presence of different activities from the data. Sample activities include walking, running, fiddling with the device, bicycling, driving, riding on a bus, riding on a train, tapping on the screen of the device, no activity, etc. Once trained, a sequence of motion sensor samples can be fed into the activity recognizer from which is outputted a decision as to which activity is present. Associated with the output may be a confidence, likelihood, posterior probability, etc. for each possible activity. For instance, if the activity recognizer outputs one of 3 activities, walk, vehicular_motion, null, a given input sequence of accelerometer data may result in an output vector of posterior probabilities [0.21, 0.03, 0.76] indicating the probability that the data corresponds to each respective state. This is illustrated in diagram 110 of FIG. 11, exemplifying activity recognition.

Different types of activity recognizers can be used, such as those built from Bayesian classifiers, Support Vector Machines, Neural Networks, etc. A Bayesian classifier can use a multivariate Gaussian Mixture Model (GMM). Such a model consists of a number of mixture components, each mixture component intuitively capturing a different mode of the data. For example one mode of the driving GMM may represent driving with the device in a pant pocket, another mode of the same model may represent driving with the device in a cup holder.

Figure 12:
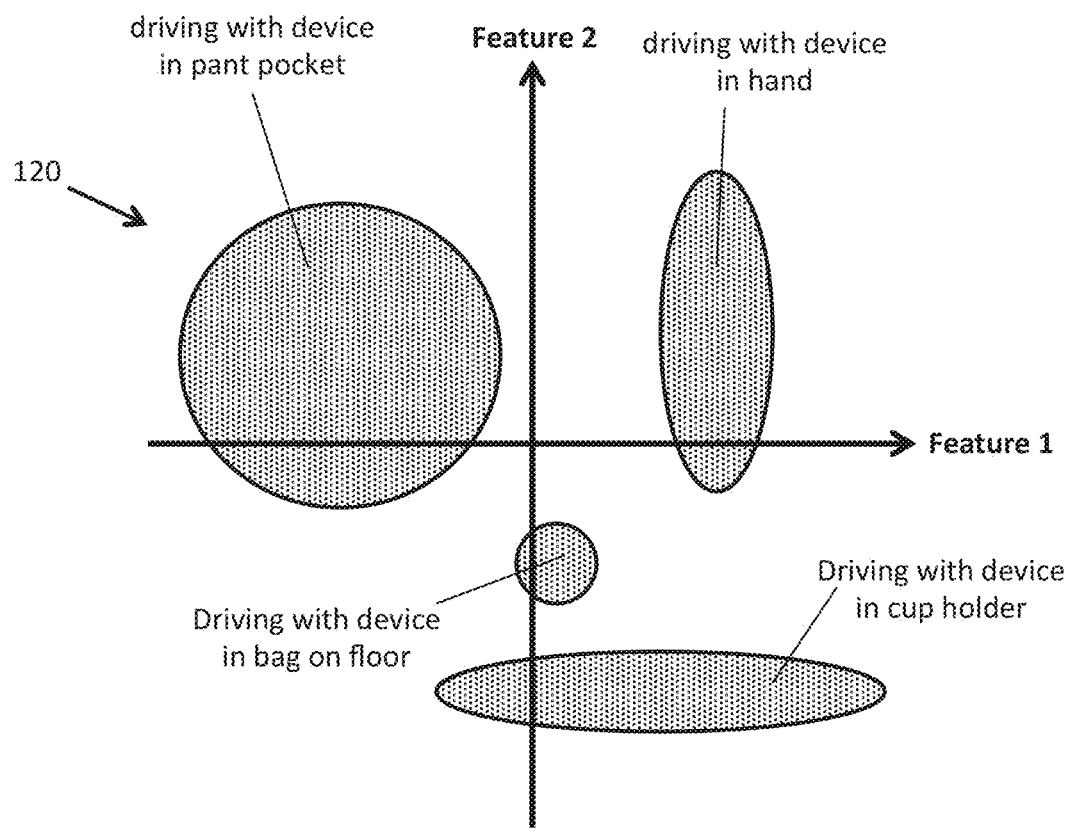
FIG. 12 is an exemplary diagram of an activity recognizer using a Bayesian Classifier with a Gaussian Mixture Model with a diagonal covariance matrix.

This is illustrated in diagram 120 of FIG. 12, showing an exemplary activity recognizer using a Bayesian Classifier with a Gaussian Mixture Model with a diagonal covariance matrix. To speed up the training and computation time required for an activity classifier using a GMM, a diagonal covariance matrix between the mixture components can be assumed. Each diagonal element represents the variance of a different mixture component. Each mixture component is represented in the feature space by a hyper-sphere with two parameters, its mean vector and its variance.

If the activity recognizer outputs posterior probability vectors, then these can be optimally combined across outputs by multiplying the vectors element-wise and then renormalizing. For example, if based on a first sequence of accelerometer data an activity recognizer outputs a posterior probability vector of [0.5 0.2 0.3] and based on a second sequence outputs [0.1 0.6 0.3], the optimally combined output would be [0.5 0.2 0.3]*[0.1 0.6 0.3]/(Σ[0.5 0.2 0.3]*[0.1 0.6 0.3])~=[0.156 0.563 0.281]. Alternatively if the output is a log-likelihood vector, the equivalent optimally combined output can be formed by adding the log-likelihood vectors element-wise, and renormalizing.

The activity recognizer is trained on the following distinct states: DRIVE, TRAIN, BUS, WALK, RUN, BICYCLE, FIDDLE, SCREEN_TAP, and NULL. The VEHICULAR_MOTION state is formed by merging DRIVE, TRAIN and BUS states. This is done by summing the posterior probabilities outputted by the recognizer. Many of these states are self-explanatory. The FIDDLE state is trained on motion data where the user is moving the device around in their hand. The benefit of training a separate FIDDLE state is that it helps eliminate false alarms for VEHICULAR_MOTION when the user was actually fiddling with the device in their hand. Likewise the SCREEN_TAP state is trained on motion data with the user tapping and swiping across their device's display. It is only detected if the screen is on (as detected by an API call). The NULL state is trained on all data collected during the day when the GPS reported speed is less than a certain threshold (e.g. 5-7 mph). All states are only trained on frames of motion data for which the movement detector detects movement. This is because the movement detector is always used as a pre-step for the activity recognizer.

Monitoring State

When the system switches to the monitoring state, its behavior on each wake-up changes. Whereas in the triggering state, at each wake-up the system checks to see if a drive event has started, in the monitoring state, at each wake-up the system collects sensor data. Some of this sensor data is analyzed immediately, some of it is stored for later use. Examples of data collected include:

Motion sensor data
Location data from GPS, or other means
Screen on/off data
Call data
Short message service (SMS) data
Foreground or background application data
Wifi scans
Bluetooth scans
Audio data
Light data
Pressure data This data can be collected for purposes such as Determining the precise start and end time of a drive.
Determining the precise start and end location of a drive.
Determining the precise route driven and/or total mileage.
Producing a running estimate of accrued mileage in a drive so far.
Determining if the user has begun walking, indicating they have exited the vehicle and that the drive has ended.
Recording acceleration, braking, cornering with associated forces, e.g. a braking event with a maximum g-force of 0.28 g's.
Recording maneuvering events such as harsh braking, fast cornering, hard acceleration, swerving, erratic acceleration/braking, harsh u-turns, harsh braking to complete stop, hard acceleration from stop, freeway merging, freeway exiting, etc.

Detecting if the user sends an SMS while driving.

Detecting if the user makes or takes a call while driving.

Detecting if the user turns the device's screen on or off.

Detecting if the user uses foreground applications (such as Facebook, Facebook messenger, Google Maps, etc.) or background applications (Navigation, Pandora, etc.) while driving.

Detecting if the user handled the device while driving (possibly without turning the screen on).

Determining the weather, road conditions and visibility in the vicinity of the driver's location.

Determining the type of road the driver is presently on (e.g. freeway vs. suburban).

Determining the grade of the road the driver is presently on (e.g. 7.4 degrees downhill).

Determining the speed of the vehicle (e.g. 54.4 mph).

Determining the speed limit of the road segment the user is presently driving on (e.g. 55 mph).

Determining the speed traffic typically moves along the road segment the user is presently driving on (e.g. 48.4 mph).

Determining the speed of current traffic on the road segment the user is presently driving on (e.g. 23.4 mph).

Determining the current density of traffic on the road segment the user is presently driving on.

Determining the risk of accident on the segment of road the user is presently driving on.

Providing a real time risk alert if at a given time the driver is at a substantially higher risk of accident than normal.

Rating a drive, or updating a driving score of a user.

Determining if the vehicular motion corresponds to driving in a car versus riding public transportation. If public transportation, then determining the mode of transportation (e.g. Bus), the departure time, arrival time, line (e.g. 52 bus) and agency (e.g. MTS) of the trip.

Determining if the user the driver of the vehicle or a passenger in the vehicle.

Determining if passengers are present in the automobile.

Determining if the user is listening to the radio or stereo while driving. Determining the type of music being listened to (talk radio, heavy rock, classical, etc.). Determining the precise radio station or audio track being listened to (e.g. 94.9 San Diego or CD of Nirvana's Smells Like Teen Spirit). Determining the absolute or relative volume at which the radio or stereo is being listened to.

Identifying which vehicle the user is driving based on listening to the audio environment, or listening to the sound of the turning signal.

Fusing Decisions and Exiting the Monitoring State

Before describing each of these in detail, we describe how the system switches from monitoring state back to triggering state. This is based on no driving being detected for a sufficient period of time, or a sufficient number of wake-up periods. The decision as to whether driving is detected or not is made based on sensor data collected during the wake-up period. For example, motion data may be collected and run through an activity recognizer to determine if the user is still driving. Alternatively the instantaneous speed obtained from a GPS fix may be used to make this determination. The average speed computed as the geodesic distance between the GPS fix obtained during the current and previous wake-ups, divided by the intervening time, may also be used. Regularization can be used if the intervening time is too small.

Figure 13:
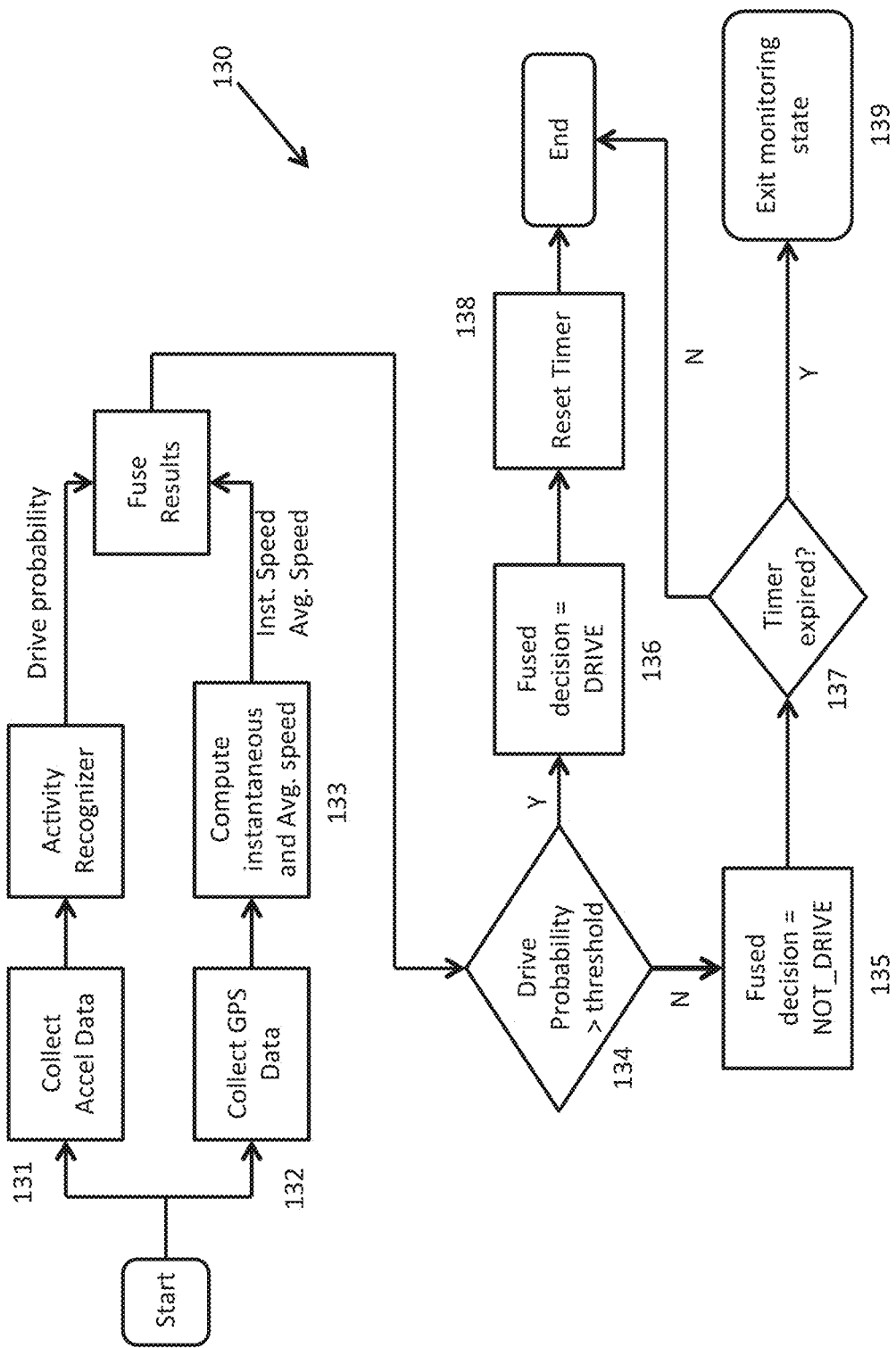
FIG. 13 is an exemplary decision flow for fusing decisions and exiting the monitoring state.

One embodiment uses a fused approach. A decision flow for fusing drive decisions and for exiting the monitoring state is illustrated in flowchart 130 of FIG. 13. A drive probability is computed as follows. Each wake-up period, accelerometer data 131 is collected for, as an example, 10 seconds and run through the high-power activity recognizer which outputs a posterior probability for drive. Similarly, at least one GPS fix 132 is obtained. Speed is computed in step 133 as the maximum of the instantaneous speed from the current GPS fix and average speeds between the current and previous fix. If this maximum value is greater than a certain threshold at step 134, the drive probability is set to 1. If this value is less than a certain threshold, the drive probability is set to the posterior probability from the activity recognizer. If the drive probability falls below 0.1, it is increased to 0.1. A threshold may be, for example, 5-7 mph. This produces a sequence of drive probabilities, one for each wake-up period. See Table 4. These drive probabilities can be converted into fused decisions such as in Table 1 by thresholding them, e.g. wake-up periods in which the drive probability is less than a threshold τ are assigned fused decisions of NOT_DRIVE (step 135), or else DRIVE (step 136). The threshold should be chosen based on the behavior of the activity recognizer. A value of 0.7-0.9 may be a typical value.

While in the monitoring state, the system maintains a timer that counts down. When the timer reaches zero (step 137), the system switches back to the triggering state (step 139, exit monitoring state). At the end of each wake-up period, if the fused decision is DRIVE, the timer is reset at step 138. The reset value should be set based on the maximum foreseeable stop duration at a traffic light or other location. A typical value is then, for example, 4-6 minutes allowing for a 4-6 minutes of NO_DRIVE being reported on each wake-up, until returning to the triggering state at step 139.

Determining the Start and End Time of a Drive

Filtering to Avoid Traffic Light Confusion

To determine the start and end time of a drive, data collected during both the triggering and monitoring states is examined. At the end of each wake-up period, data from motion sensors and location fixes can be combined to produce a fused decision of either DRIVE or NOT_DRIVE for the period. When the vehicle is stopped at a traffic light or otherwise, a decision of NOT_DRIVE may be outputted indicating the user is not driving. Such events can be confused with the end of a drive. For instance, a sequence of values as such displayed in Table 1 may on the surface indicate the presence of two drives, one starting at time 7 and ending at time 9, and another starting at time 12 and ending at time 17, when in reality a single drive was present starting at time 7 and ending at time 17 with times 10 and 11 corresponding to being stopped at a traffic light.

TABLE 1

Sequence of fused decisions obtained

| Wake-up | Fused Decision |
| --- | --- |
| 1 | NOT_DRIVE |
| 2 | NOT_DRIVE |
| 3 | NOT_DRIVE |
| 4 | NOT_DRIVE |
| 5 | NOT_DRIVE |
| 6 | NOT_DRIVE |
| 7 | DRIVE |
| 8 | DRIVE |
| 9 | DRIVE |
| 10 | NOT_DRIVE |
| 11 | NOT_DRIVE |

TABLE 1-continued

Sequence of fused decisions obtained

| Wake-up | Fused Decision |
|---|---|
| 12 | DRIVE |
| 13 | DRIVE |
| 14 | DRIVE |
| 15 | DRIVE |
| 16 | DRIVE |
| 17 | DRIVE |
| 18 | NOT_DRIVE |
| 19 | NOT_DRIVE |
| 20 | NOT_DRIVE |
| 21 | NOT_DRIVE |

In order to avoid confusion caused by temporarily stopping at traffic lights or other locations, the fused decision may be filtered to correctly determine at what times the drive started and ended. This filtering can be done in a number of ways.

The Hidden Markov Model (HMM)

One embodiment uses a Hidden Markov Model (HMM). Such a model has two sets of states, emitted states and hidden states. The emitted states represent the input that is observed by the HMM. The hidden state represents the underlying state that is not observed, but which the HMM attempts to reveal by filtering. The HMM used has two emitted states: DRIVE and NOT_DRIVE which correspond to the fused decision above, and three hidden states: DRIVING, STOPPED and NOT_DRIVING. The hidden states STOPPED and NOT_DRIVING cannot be determined from a single fused decision, as it is unclear whether NOT_DRIVE corresponds to being stopped at a traffic light, or actually not driving.

The HMM is characterized by two sets of parameters: the emission probabilities and the transition probabilities. The emission probabilities are chosen such that when DRIVE is emitted, the probability for the hidden state DRIVING is set to 1 and the probabilities for the hidden states NOT_DRIVING and STOPPED are both set to 0. Likewise, when NOT_DRIVE is emitted, the probability for the hidden state DRIVING is set to 0 and the probabilities for the hidden states NOT_DRIVING and STOPPED are set to values distinctly larger than zero (e.g. 0.4 and 0.6). Such an emission probability matrix has the following structure listed in Table 2. A sample parameter choice is $\alpha=0.8$.

TABLE 2

| | Probability hidden state = DRIVING | Probability hidden state = STOPPED | Probability hidden state = NOT_DRIVING |
|---|---|---|---|
| Emitted State = DRIVE | 1 | 0 | 0 |
| Emitted State = NOT_DRIVE | 0 | $(1 - \alpha)$ | $\alpha$ |

Figure 14:
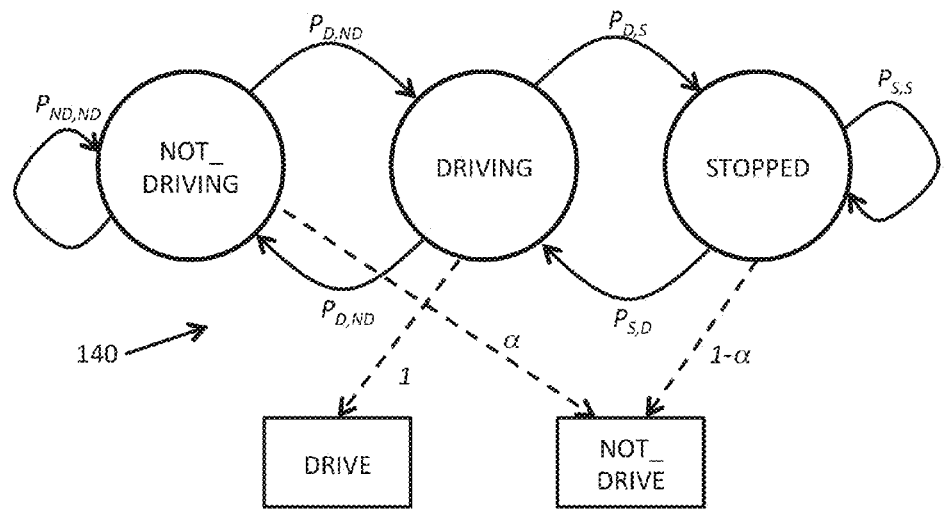
FIG. 14 is an embodiment of a Hidden Markov Model with emission probabilities, used for filtering out momentary stops at traffic lights and other locations.

The transition probability matrix captures the probability of moving from one hidden state to another, by the next wake-up. This is a 3×3 matrix of probabilities. This matrix is constrained such that the system cannot move from the NOT_DRIVING state directly to the STOPPED state, and vice versa. For example, it is possible for the underlying hidden state to take the sequence of values NOT_DRIVING, NOT_DRIVING, DRIVING, DRIVING, STOPPED, DRIVING, DRIVING, NOT_DRIVING, NOT_DRIVING, but it is not possible for it to take the sequence NOT_DRIVING, NOT_DRIVING, STOPPED, NOT_DRIVING, NOT_DRIVING. This constraint prevents as a user from moving from a state where they are not driving, directly to one where they are stopped at a traffic light, and then directly back again to not driving, without having driven in the intervening period. Such a transition probability matrix has the following structure listed in Table 3 where $P_{D,D}$, $P_{D,S}$, $P_{D,ND}$, $P_{S,D}$, $P_{D,S}$, 0, $P_{ND,D}$, 0, $P_{ND,ND}$ are probabilities taking values between 0 and 1. These transition probabilities should be chosen as a function of the wake-up period, the typical drive duration, the typical frequency of driving, and the typical wait time at traffic lights. Sample parameter choices are $P_{ND,ND}=0.99$, $P_{ND,D}=0.01$, $P_{D,ND}=0.1$, $P_{D,D}=0.7$, $P_{D,S}=0.2$, $P_{S,D}=0.5$, $P_{S,S}=0.5$. The HMM used is captured graphically in diagram 140 of FIG. 14, showing an exemplary Hidden Markov Model with emission probabilities, used for filtering out momentary stops at traffic lights and other locations.

TABLE 3

| | DRIVING | STOPPED | NOT_DRIVING |
|---|---|---|---|
| DRIVING | $P_{D,D}$ | $P_{D,S}$ | $P_{D,ND}$ |
| STOPPED | $P_{S,D}$ | $P_{D,S}$ | 0 |
| NOT_DRIVING | $P_{ND,D}$ | 0 | $P_{ND,ND}$ |

Forward-Backward and Viterbi Filtering

Using this HMM we run either the forward-background algorithm or the Viterbi algorithm on the input sequence of fused decisions. The forward-background algorithm computes the probability of being in the each hidden state at each wake-up period, given the model. The Viterbi algorithm computes the most likely sequence of hidden states. The forward-backward algorithm is generally preferred as it outputs probabilities that give a sense of confidence in each output. A delay can be used to improve the utility of the backward component of the algorithm. This delay is typically set to a similar value as the monitoring timer, i.e. 5-10 minutes.

Obtaining Start and End Times Using the HMM

Ultimately the interest is in whether the user was driving or not driving at each wake-up period. Times at which the user was stopped at a traffic light are counted as part of the drive. As such, the output of the forward-backward algorithm is post-processed by adding the probability of the STOPPED hidden state to the DRIVING hidden state. The probabilities of the DRIVING and NOT_DRIVING hidden states then sum to 1 and represent the perceived probabilities of the user either being in a drive or not being in a drive at each wake-up period.

Figure 15:
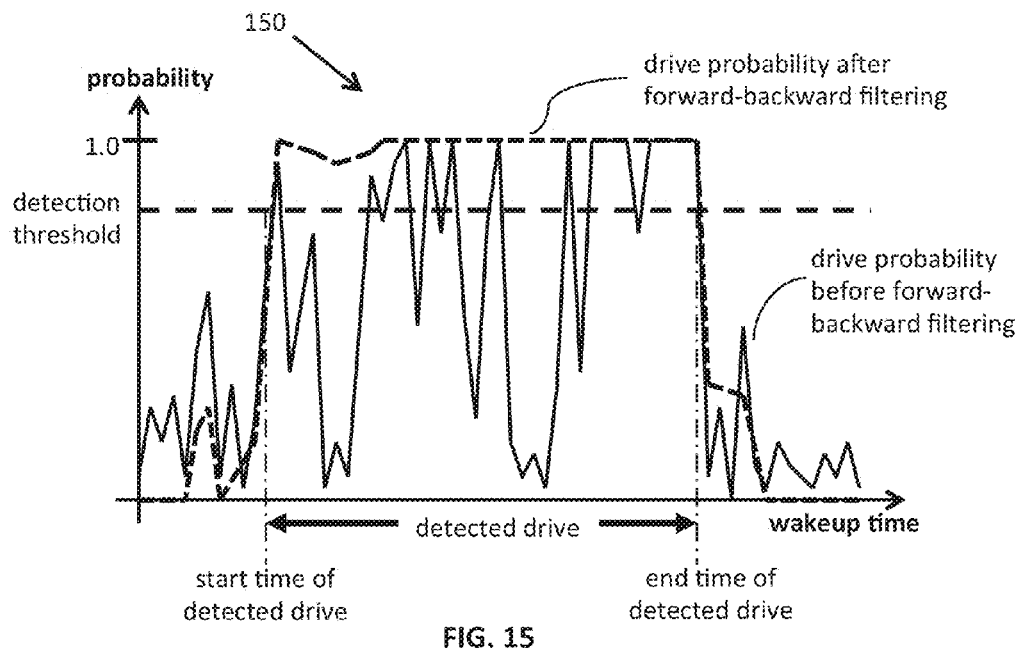
FIG. 15 is an embodiment of a graph of obtaining the start and end times of a drive.

The start and end time of each drive is obtained from this output as follows. Two states are maintained IN_A_DRIVE and NOT_IN_A_DRIVE. The system initially starts in the NOT_IN_A_DRIVE state. When the DRIVING probability first exceeds a threshold $\tau$, switch from the NOT_IN_A_DRIVE state to the IN_A_DRIVE state. When the DRIVING probability then first dips below the threshold $\tau$, switch back from IN_A_DRIVE to NOT_IN_A_DRIVE. It is also possible to use two thresholds here: $\tau_1$ and $\tau_2$, where $\tau_2-\tau_1>0$ represents a hysteresis region. The procedure for obtaining the start and end times of a drive from the initial forward-backward output is captured in graph 150 of FIG. 15, showing an exemplary procedure for obtaining the start and end times of a drive.

Forcing a Non-Drive Output

In some scenarios it is desirable to force the filtering output to definitely be in the NOT_DRIVING state at certain points in time. For instance, if a user is detected as walking during a single wake-up period, it is insufficient to merely compute a fused decision of NOT_DRIVE—this could be regarded as a traffic light stop by the HMM and filtered out when in actuality the walk definitely signaled the end of the drive. To force the filtering output to definitely be in the NOT_DRIVING state the emission probability for STOPPED is "manually" set to 0 (rather than $1-\alpha$) and the emission probability for NOT_DRIVING is set to 1 (rather than $\alpha$). This ensures that the HMM will end the drive when walking is detected.

Dealing with Non-Uniform Wake-Ups

If the wake-up+sleep periods have variable duration, the HMM can be modified as follows: select a transition matrix $P_{min}$ corresponding to a minimum wake-up period duration $T_{min}$, and pre-compute transition matrices $P_1, P_2, \ldots$ corresponding to the possibly wake-up periods observed $T_1, T_2, \ldots$ by taking $P_{min}$ to the relevant power. These transition matrices are then used in the forward-backward or Viterbi algorithm at the appropriate times in place of $P_{min}$.

Filtering Probabilities

The fused drive decision made at the end of each wake-up period may be represented in the form of a confidence, probability, log-likelihood, or similar soft metric. The output sequence may appear as follows in Table 4.

TABLE 4

Sequence of drive probabilities obtained

| Timestamp (seconds) | Drive Probability (p) |
| --- | --- |
| 1378673292 | 0.11 |
| 1378762382 | 0.08 |
| 1378858311 | 0.05 |
| 1378913033 | 0.12 |
| 1378926895 | 0.14 |
| 1378941825 | 0.19 |
| 1378967575 | 0.67 |
| 1379051647 | 0.93 |
| 1379077075 | 0.82 |
| 1379158504 | 0.10 |
| 1379182856 | 0.03 |
| 1379275783 | 0.55 |
| 1379310781 | 0.78 |
| 1379330441 | 0.89 |
| 1379355549 | 0.98 |
| 1379417153 | 0.99 |
| 1379464482 | 0.94 |
| 1379499648 | 0.08 |
| 1379582731 | 0.02 |
| 1379641258 | 0.01 |
| 1379696230 | 0.09 |

These drive probabilities can still be filtered using the HMM. The only difference is in how the emission probabilities are chosen. Rather than hard coding them as a function of the fused decision, as was done previously, they are set as a function of the drive probability p as follows in Table 5. Again, a sample parameter choice is $\alpha=0.8$.

TABLE 5

| Probability hidden state = DRIVING | Probability hidden state = STOPPED | Probability hidden state = NOT_DRIVING |
| --- | --- | --- |
| p | $(1 - \alpha)(1 - p)$ | $\alpha(1 - p)$ |

Operations Performed after Detecting the End of a Drive

Figure 16:
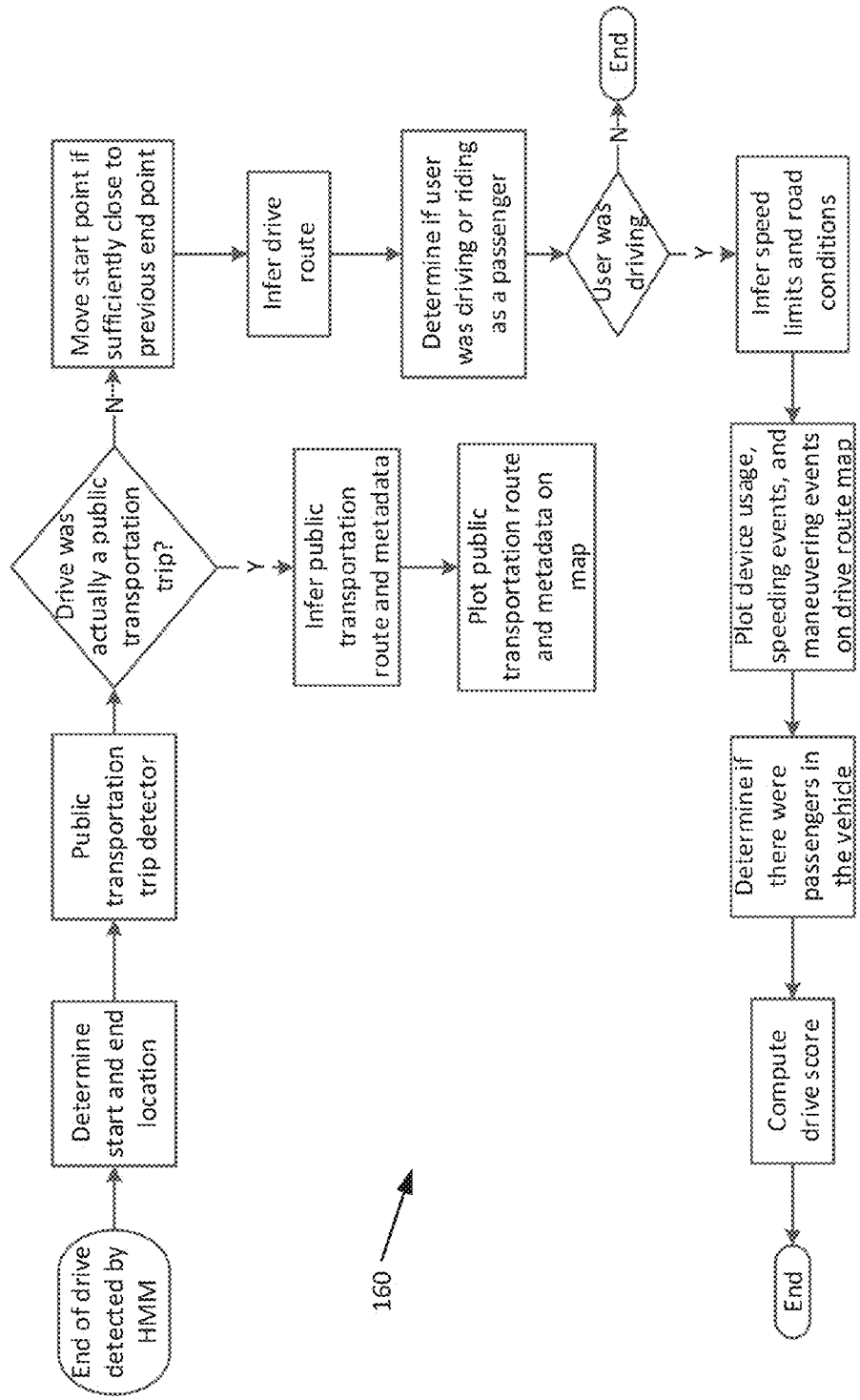
FIG. 16 is an exemplary flowchart of operations performed after detecting the end of a drive.

Once the end of a drive has been detected, a number of post-processing operations can begin. These are described in the next few sections and summarized in flowchart 160 of FIG. 16, showing an exemplary flow of operations performed after detecting the end of a drive.

Determining the Precise Start and End Location of a Drive

The start and end location of a drive can be obtained in a number of different ways. A simple approach is to use the first and last location fixes obtained while in the monitoring state as the start and end locations of the drive, respectively.

A slightly better approach is to buffer all location fixes acquired. Then associate the location fixes obtained as closely in time to the determined start and end time of the drive, as the start and end locations of the drive, respectively. The start and end times of the drive may be determined using the approach described in the previous section.

A variant of the previous approach is to again buffer all location fixes acquired. Then use the first location fix obtained after the determined start time of the drive, as the start location. Use the last location fix obtained before the determined end time of the drive, as the end location.

In another embodiment, a good approach is to again buffer all location fixes acquired. Then obtain the end location from the last location fix acquired before the determined end time of the drive. Obtain the start location from the end location of the previous drive. For the first drive, the start location is obtained by acquiring a location fix when the system is first activated. This approach assumes 1) that the user always starts a new drive from the end location of their last drive (i.e. where they parked their car), and 2) that drive end locations are more accurately captured than drive start locations. Assumption (1) is often true for users owning automobiles. Assumption (2) is almost always true for the triggering/monitoring state architecture. This is because there can be a delay in detecting the start of a drive from the triggering state, as by its low-power nature it captures less sensor data than the monitoring state and hence has a lower drive detection rate. For example, if a user gets in their car and drives very slowly and smoothly to a first traffic light, the drive may not be detected until after they have a chance to accelerate to a higher speed. Alternatively if a geo-fence exit event is used to switch from triggering to monitoring state, the radius of the geo-fence will determine the accuracy at which the drive start location is captured.

Figure 17:
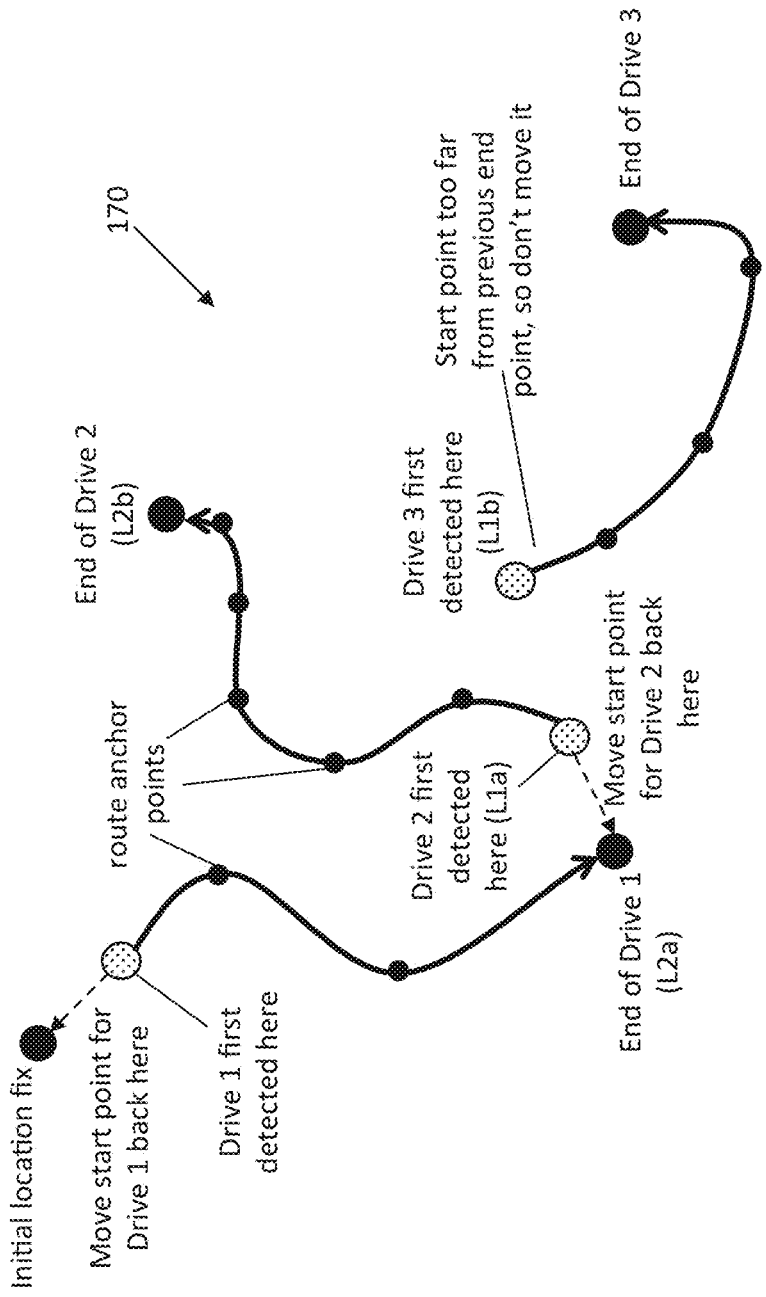
FIG. 17 is an exemplary diagram of setting the start location of the current drive to the end location of the previous drive.

Another embodiment provides an altered version of the previous approach. As there may be a small chance that a particular drive is not detected at all, the start location of the drive is only moved to the end location of the previous drive, if it lies within X miles of it. This approach is illustrated in diagram 170 of FIG. 17, which illustrates setting the start location of the current drive to the end location of the previous drive. In more detail: buffer all location fixes acquired. Obtain the end location from the last location fix acquired before the determined end time of the drive. Let L1a and L1b be the first location acquired after the determined start time of drive 2 and drive 3, respectively. Let L2a and L2b be the end location of the previous drive for L1a and L1b, respectively. In this example of FIG. 17, the start location L1a of drive 2 is set to L2a because L2a is within X miles of L1a. In contrast, the start location L1b of drive 3 remains at L1b because it is too far from the previous end point L2b. A typical parameter choice for X is, for example, 1-3 miles.

Dealing with Location Fixes of Different Accuracy

Above it is assumed that one or more location fixes are obtained each wake-up period. The location fixes may come from varying sources (e.g. GPS, Wifi, cellular triangulation, etc.) and be obtained with varying degrees of reported accuracy. It may be beneficial to average the locations of all fixes obtained during a given wake-up period in order to improve the accuracy of the above approaches. Alternatively each wake-up period it may be better to only use the location fix obtained with the lowest (i.e. best) reported accuracy, and discard the rest. Alternatively it may be beneficial to discard any fixes with reported accuracies greater than a certain threshold, e.g. 150 meters.

In one embodiment, the method is to only associate one location fix with each wake-up period and do this as follows: if a GPS fix was obtained, choose the GPS fix with the lowest reported accuracy. If no GPS fix was obtained, choose the Wifi or cellular fix with the lowest reported accuracy.

Inferring a Drive Route from Sparse Location Fixes Using a Driving Directions API In order to use location fixes to retroactively learn a drive route that was taken by a mobile device, without severely impacting battery life or accuracy, two things must happen: 1) location fixes must be collected only during the route, not at other, superfluous times, and 2) fixes must be obtained sparsely throughout the route. For a contra-positive example, observe the high battery drain associated with navigation apps. Of the two items listed above in this paragraph, the first of these things is achieved via the triggering/monitoring state architecture. The second is achieved in the monitoring state by waking up only infrequently to acquire a location fix.

When the monitoring state is entered, location fixes may be obtained with a fixed periodicity of say 1 minute, or with a periodicity that is modulated, say between 30 seconds-5 minutes. The periodicity may be selected based on several factors such as vehicle speed, a route prediction, etc., in order to obtain a more accurate interpolation with fewer samples. For example, in regions that are dense and unpredictable (such as downtown) more frequent fixes are obtained, whereas in regions that are sparse and predictable (such as a freeway trip back home) fewer fixes are obtained. Vehicle speed may be used as a proxy for this, e.g. if the instantaneous speed is below 30 mph, the user is assumed to be driving on an urban road and fixes are taken every 30 seconds, if the speed is between 30 and 50 mph, the user is assumed to be driving on a suburban road and fixes are taken every 60 seconds, and if the speed if greater than 50 mph, the user is assumed to be driving on a highway/freeway and fixes are taken every 120 seconds. These numerical values are listed only as examples, and are not limited to these exact quantities.

Figure 18B:
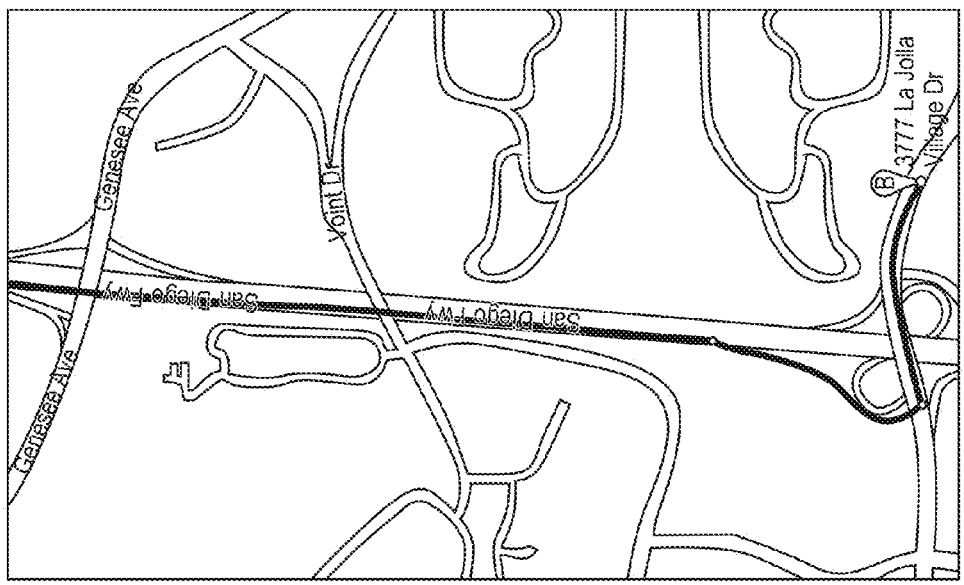
FIGS. 18A-18B show exemplary erroneous routes returned by driving directions application programming interface (API) due to noisy location fixes.
Figure 18A:
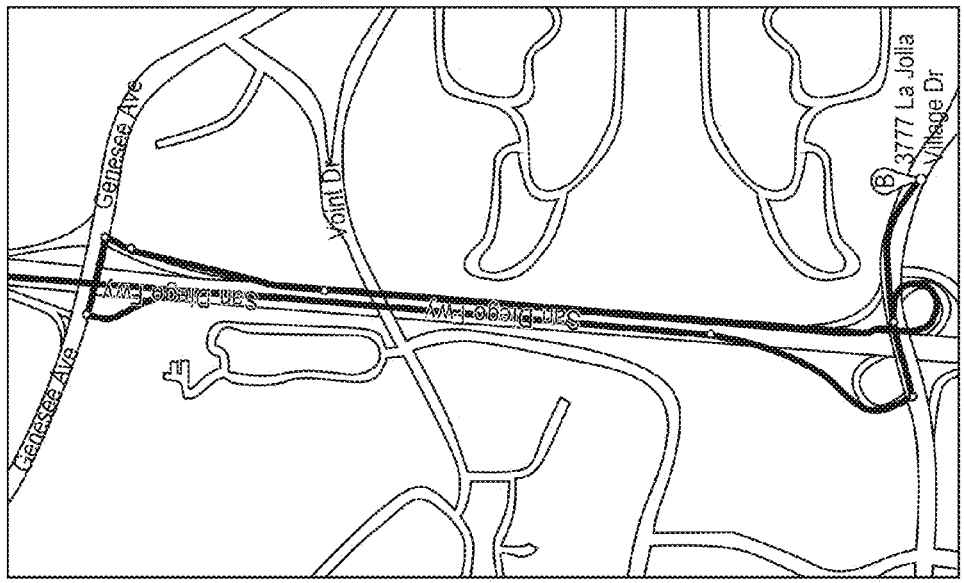

At the end of the trip, the fixes are interpolated using a driving directions database. The database may have an API that when queried with a series of fixes, interprets the first and last fixes as the start and end of the route, respectively, and fixes in between as desired waypoints visited by the user. As the fixes are not perfectly accurate, a small error can lead to a gross miscalculation of the route taken. For example, if a fix is obtained while the user is driving across an overpass over a freeway, a small offset of as little as 5 meters can cause the directions API to return a route that takes the user onto the freeway, driving many additional miles before exiting and driving back to rejoin the route consistent with the remaining waypoints. This problem is illustrated in diagram 180 of FIG. 18A and diagram 185 of FIG. 18B, which show an example of an erroneous route returned by driving directions API due to noisy location fixes. In the route of FIG. 18A, a noisy location fix lands on the wrong side of the freeway causing the directions API to infer a loopy route. The route shown in FIG. 18B is correct.

As a primary use of this interpolation is for accurate estimation of mileage driven for auto-insurance telematics purposes, the directions API alone may be grossly insufficient (often worse than just connecting the sparse location fixes with straight lines). This is an artifact of the API used: it provides directions via waypoints, it does not provide an interpolated driving route.

Figure 19C:
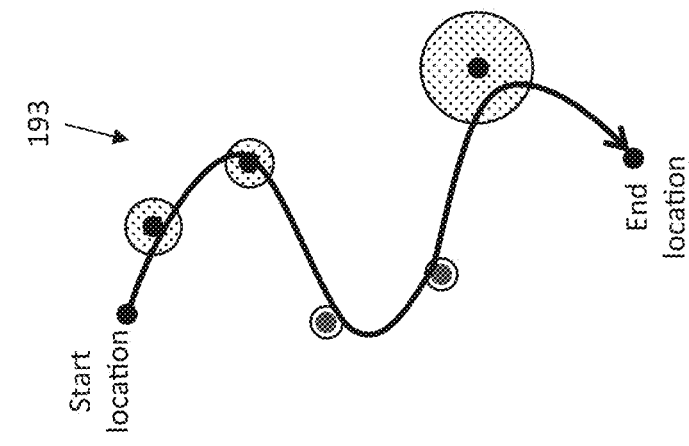
FIGS. 19A-19C are an exemplary diagrams of a goal of a route interpolation algorithm.
Figure 19B:
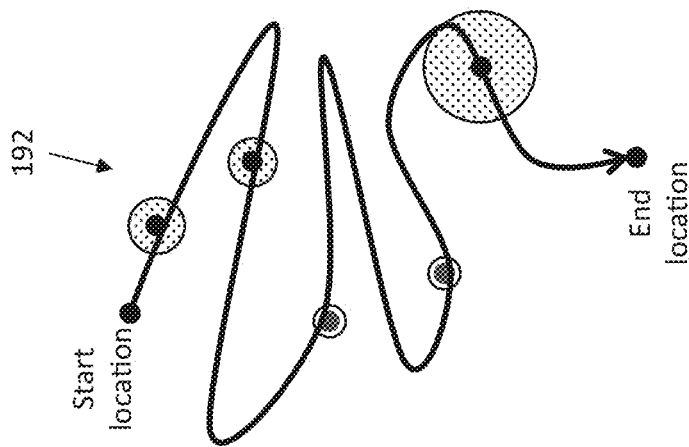
Figure 19A:
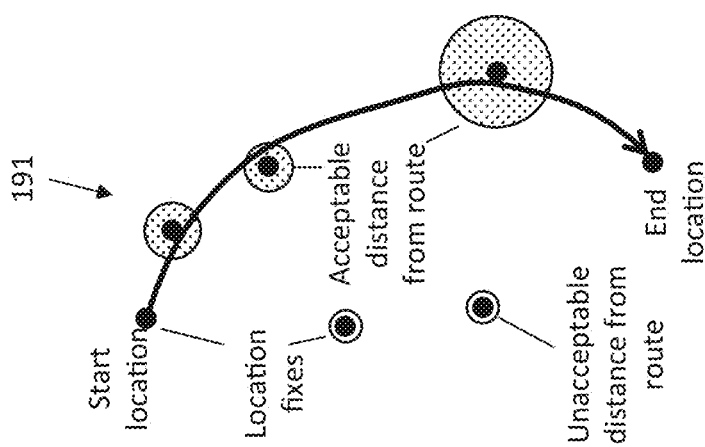

The algorithm builds a route interpolation API from a driving directions API. The goal of the algorithm is to find a subset of waypoints that when fed into the driving directions API return the route both consistent with the location fixes observed and with the shortest possible length (or quickest drive time). This is illustrated in diagram 191 of FIG. 19A, 192 of FIG. 19B, and 193 of FIG. 19C, which show an exemplary goal of the route interpolation algorithm. Goal of route interpolation algorithm. The assumption here is that the driver took the most direct (or quickest) route consistent with the observed location fixes. Though route 191 of FIG. 19A is shortest, it is not consistent with the location fixes observed and is hence invalid. The route 192 of FIG. 19B is consistent but is unnecessarily long. The route 193 of FIG. 19C is the desired output, as it is the shortest consistent route.

A location fix is defined to be consistent with a given route (or route to be consistent with a given location fix), if the route passes sufficiently close to it. This may be defined in many ways: in terms of the accuracy of the reported location fix, the density of the road network in the vicinity of the fix, etc.

The procedure starts with the first and last fix obtained during the drive, (which may for various reasons be the most accurate ones obtained). The procedure is illustrated in diagrams 200 and 205 of FIGS. 20A-20B, respectively, showing an embodiment of recursive route interpolation. These points for the first and last fix are designated as anchor points. This set of anchor points is sent to the directions API with the first anchor point representing the start point of the drive and the last anchor point representing the end point. Those intermediate location fixes that are sufficiently close to the returned drive route are designated as ignored points, as shown in diagram 200. From the set of intermediate location fixes that are not sufficiently close to the return drive route, a "best" location fix is selected and added to the set of anchor points. The anchor points are ordered chronologically according to the time the respective location fixes were obtained. The set of anchor points is then again sent to the directions API, with the first anchor point representing the start point of the drive, the last anchor point representing the end point of the drives, and the intermediate location fix representing a waypoint. The waypoint represents a detour in the shortest (or quickest) route between the start and end location. This procedure is recursively repeated, such as in diagram 205, on remaining segments of the route that contain points yet to be designated either anchor or ignore points. When all location fixes have been labeled either anchor or ignore points, the procedure terminates. The final set of anchor points is considered a minimal set of location fixes necessary to characterize the route, including its start and end points, and any detours. The last route returned by the directions API will also correspond to this final set of anchor points and hence be used as the inferred driving route.

As location fixes are reported together with an accuracy value (e.g. 26 m), the reported accuracy is used in determining whether a fix is considered sufficiently close to a route. One embodiment defines a fix as sufficiently close if it lies within either $D_{min}$ meters of the nearest point on the route, or within K times the reported accuracy of the fix, so long as the fix is no more than $D_{max}$ meters from the nearest point on the route. Typical parameter settings are, for example, $K=2-4$, $D_{min}=20-40$ m $D_{max}=200-300$ m.

An intermediate fix is selected as the "best" way point based on its accuracy and deviation from the route. One embodiment is to select the way point that maximizes the ratio of the accuracy of the location fix to the minimum geodesic distance from the route.

The route inference procedure can be improved by, during each recursion, after each route is returned, performing additional checks to ensure the selected best way point does not result in looping such as in the freeway overpass scenario illustrated in FIGS. 18A-18B. One such check is to disqualify a selected "best" way point if its inclusion as an anchor point results in a route that contains "overlap in the same direction." This is defined as a route that at two different times follows precisely the same underlying road geometry for at least a certain number of points. This is precisely the error that occurs in the example of FIG. 18A.

Additionally, when the recursion has terminated, a series of anchor point manipulations is performed to determine if a shorter route, consistent with the fixes, can be obtained. This procedure is very helpful in removing errors that occur due to a high density of grid points in the underlying road geometry within the vicinity of an anchor point. These manipulations are performed by going through each anchor point in the final set, one by one, and perturbing it by a small amount. The new anchor point set (containing the perturbed point) is then sent to the directions API. If the returned driving route is significantly shorter than the existing driving route, and no inconsistencies have been created, then the perturbation is kept. Multiple perturbations may be performed for each anchor point. These perturbations may be done in many different ways. For example, for each point it can be moved a fixed distance (e.g. 20 m) in each compass direction (N, S, E and W). Alternatively the underlying road geometry can be accessed within the vicinity of the anchor point to determine which potential perturbations may result in a route of shorter length. Note the underlying road geometry can also be used within the vicinity of an anchor point to determine if a location fix should be selected as a "best" point/anchor point, to begin with.

Additional information may also be incorporated when inferring the drive route, for example: 1) the elapsed duration between location fixes, 2) the bearing of the vehicle obtained from the location fixes, relative to the bearing of candidate road segments, 3) any previous routes traveled.

Produce a Running Estimate of Accrued Mileage in a Drive so Far

This can be obtained from location data gathered in the monitoring state. A first location fix can be obtained from the last location fix obtained before entering monitoring mode. Alternatively a first location fix can be obtained from the end location of the last drive. After switching to the monitoring state, location fixes are obtained each wake-up period. A best location fix can be chosen each wake-up period using one of the approaches described in "Dealing with location fixes of different accuracy."

While in the monitoring state, in each wake-up period the geodesic distance between the best location fix obtained, and the last best location fix that was obtained, is computed. This distance is added to an accrued distance. The accrued distance is reset to zero when the system switches back into the triggering state.

Alternatively the accrued mileage can be obtained by each wake-up period, re-computing the precise route taken so far and computing its length.

Methods for Exiting Monitoring State Early

The standard technique for switching from monitoring state back into triggering state is based on waiting for a period of T minutes to elapse without driving being detected. T is chosen to allow for stopping at long traffic lights without prematurely exiting monitoring mode, e.g. T=5.0 minutes. While a large value of T ensures that drives will not be truncated or split prematurely, it also results in unnecessarily high power usage for T minutes after a drive has ended. As such, it is advantageous to seek ways of exiting the monitoring state early. Such approaches are described below.

Note that these approaches can be fused (probabilistically or otherwise), e.g. two or more of the following may be required to exit monitoring state early.

Early Exit from Monitoring State Based on Detecting Walking

Each wake-up period accelerometer data may be collected and run through an activity recognizer. If this recognizer detects walking, the system can exit the monitoring mode immediately, as the user cannot be walking while driving in a vehicle. As it is typically quite easy for an activity recognizer to discriminate between walking and driving, this can be a fairly robust technique. After detecting walking while in monitoring mode, in one embodiment it is ensured that a GPS fix is obtained before exiting monitoring mode. This improves the accuracy of the estimated end location of the drive.

Early Exit from Monitoring State Based on Wifi Connectivity

Each wake-up period in monitoring state, the system can check to see if it is connected to a Wifi AP. If so, this may indicate the user has arrived at their destination (e.g. home or office). As such, the presence of a Wifi connection can be used to exit monitoring state early. Similarly, connectivity to a fixed Bluetooth class of device such as a printer or desktop computer can also be used. It is worth noting that it is possible for the user to connect to a passing Wifi AP while stopped at a traffic light, for instance, a Starbucks AP. To circumvent false early exits this may cause, the media access control (MAC) address of the Wifi AP can be checked to determine if it is on a white-list of APs within the vicinity of which the user spends considerable time (e.g. home or office Wifi APs). If not, early exit can be cancelled.

Early Exit from Monitoring State Based on Location

If based on a location fix obtained in monitoring state, the user is determined to have arrived at their location, and the monitoring state can be exited, e.g. if the user arrives home, or at work. Based on a history of routes, the system may be able to tell that the user has arrived at their location, e.g. if the user arrives at a location that lies within X meters of a previously observed end location of drive.

Estimating G-Forces from Acceleration, Braking and Cornering

During monitoring state wake-ups, sensor data may be collected to aid in estimating acceleration, braking and cornering g-forces. Acceleration g-force is a force in the direction of the moving vehicle. Braking g-force is a force in the opposite direction. Cornering g-force is a centrifugal force associated with a change in bearing at positive speed.

Such g-forces can be individually estimated from sensors such as the GPS, accelerometer, magnetometer and gyroscope. Alternatively g-forces can be estimated by fusing data from these sensors.

Using GPS Data

GPS fixes report speed data, often with fairly good accuracy. Acceleration and braking can be estimated by looking at the rate-of-change-of-speed, with increases in speed being associated with acceleration and decreases with braking Centrifugal cornering forces can be estimated by multiplying the rate-of-change-of-bearing (in rad/s) by the speed of the vehicle (in m/s). Note, in order to avoid discontinuities, the bearing must first be unwrapped before computing its rate of change. This is a straightforward procedure.

More accurate estimates of these forces can be obtained by filtering the sequence of speed values or rate-of-change-ofbearing values. One such filter that is optimal in a certain sense, if the speed values are obtained at regular intervals, is the Savitzky-Golay filter. If the sequence of speed (or rate-of-change-of-bearing) values is denoted $y_1, \ldots, y_T$, the filtered rate-of-change-of-speed (or rate-of-change-of-bearing) estimates for times $$\frac{N+1}{2} \leq j \leq T - \frac{N-1}{2}$$

are computed as $$\hat{r}_j = f_s \cdot \frac{1}{h} \sum_{i=-\frac{N-1}{2}}^{i=\frac{N-1}{2}} \alpha_i y_{j+i}$$

where $f_s$ is the sampling frequency in Hz (e.g. if one GPS fix is obtained per second, $f_s=1$). The value N controls the degree of smoothing (and must be odd in the above expression). A larger value of N will lead to less noise but poorer dynamic response, i.e. a large value of N will attenuate momentary accelerations, brakes, and corners. For GPS fixes obtained each second, a typical value is N=5, i.e. the filtering occurs over 5 seconds. This provides sufficient time to capture a prolonged g-force without excessively dampening it. If the time samples are uniformly spaced then Savitzky-Golay coefficients can be found in a table. For example, for N=5 the coefficients are $\alpha_{-2}=1$, $\alpha_{-1}=-8$, $\alpha_0=0$, $\alpha_1=8$, $\alpha_2=-1$ and h=12.

When the GPS fixes are logged continuously (e.g. one every second), rate-of-change-of-speed and rate-of-change-of-bearing estimates can be computed continuously. When only a limited duration of GPS is logged (say T samples), it is difficult to compute an estimate for times near the boundary. This is typically the case when the wake-up duration is less than the total cycle duration. For example, if only 5 GPS fixes are in the 5 second wake-up period and the system sleeps for 55 s, then if N=5, only 1 set of estimates is produced. This problem may be circumvented by computing estimates for points near the boundary using a smaller value of N. For example, producing estimates for the first and last sample using N=1, for the second and fourth samples using N=3, and for the middle (third) sample using N=5. Alternatively the boundary points may be ignored when computing estimates. It should be clear that the value of N needs to be chosen smaller than the value of T.

Using Motion Sensor Data

Motion sensor data can also be used in assessing acceleration, braking and cornering forces. A simple way to estimate the total g-force experienced (denoted as f), is to compute the square of the accelerometer norm, subtract off the force of gravity squared, take the square root, and divide by 9.8, i.e.

$$\hat{f} = \frac{1}{9.8}\sqrt{a_x^2 + a_y^2 + a_z^2 - 9.8^2}$$

If the accelerometer is not properly calibrated, the norm may be less than 9.8 (accelerometer calibration is discussed below). To account for this the max of the norm and zero is taken as such:

$$\hat{f} = \frac{1}{9.8}\sqrt{\max(a_x^2 + a_y^2 + a_z^2 - 9.8^2, 0)}$$

Figure 21:
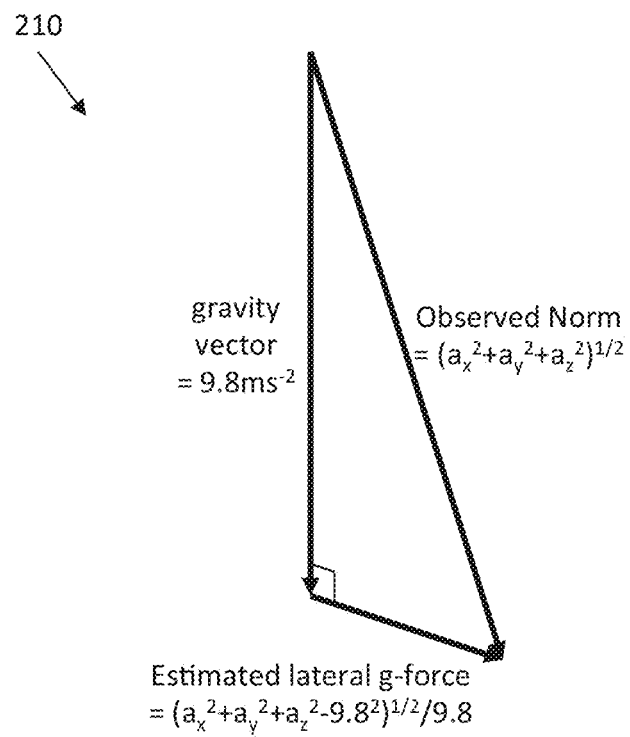
FIG. 21 is an exemplary diagram of estimating lateral forces from a single accelerometer data point.

This assumes that all acceleration is at right angles to gravity (i.e. acceleration, braking and cornering)—any vertical acceleration due to bumps or change in road grade will not be properly accounted for. This is illustrated in diagram 210 of FIG. 21, showing an example of Estimating lateral forces from single accelerometer data point.

To the improve accuracy of the lateral g-force estimation, rather than estimating lateral acceleration from a single accelerometer sample, noise may be filtered out by first filtering each axis of the accelerometer data before computing the norm. By using a moving mean filter, a running sequence of such estimates can be produced at each time t, i.e.

$$\hat{f}(t) = \frac{1}{9.8N}$$

$$\sqrt{\max\left(\left[\sum_{s=t-\frac{N-1}{2}}^{t+\frac{N-1}{2}} a_x(s)\right]^2 + \left[\sum_{s=t-\frac{N-1}{2}}^{t+\frac{N-1}{2}} a_y(s)\right]^2 + \left[\sum_{s=t-\frac{N-1}{2}}^{t+\frac{N-1}{2}} a_z(s)\right]^2 - 9.8^2 N, 0\right)}.$$

Here the variable N controls the degree of smoothing (and must be odd), in the same manner as for GPS above. A typical value of $N=5f_s$ where $f_s$ is the sampling frequency of the accelerometer.

Figure 22:
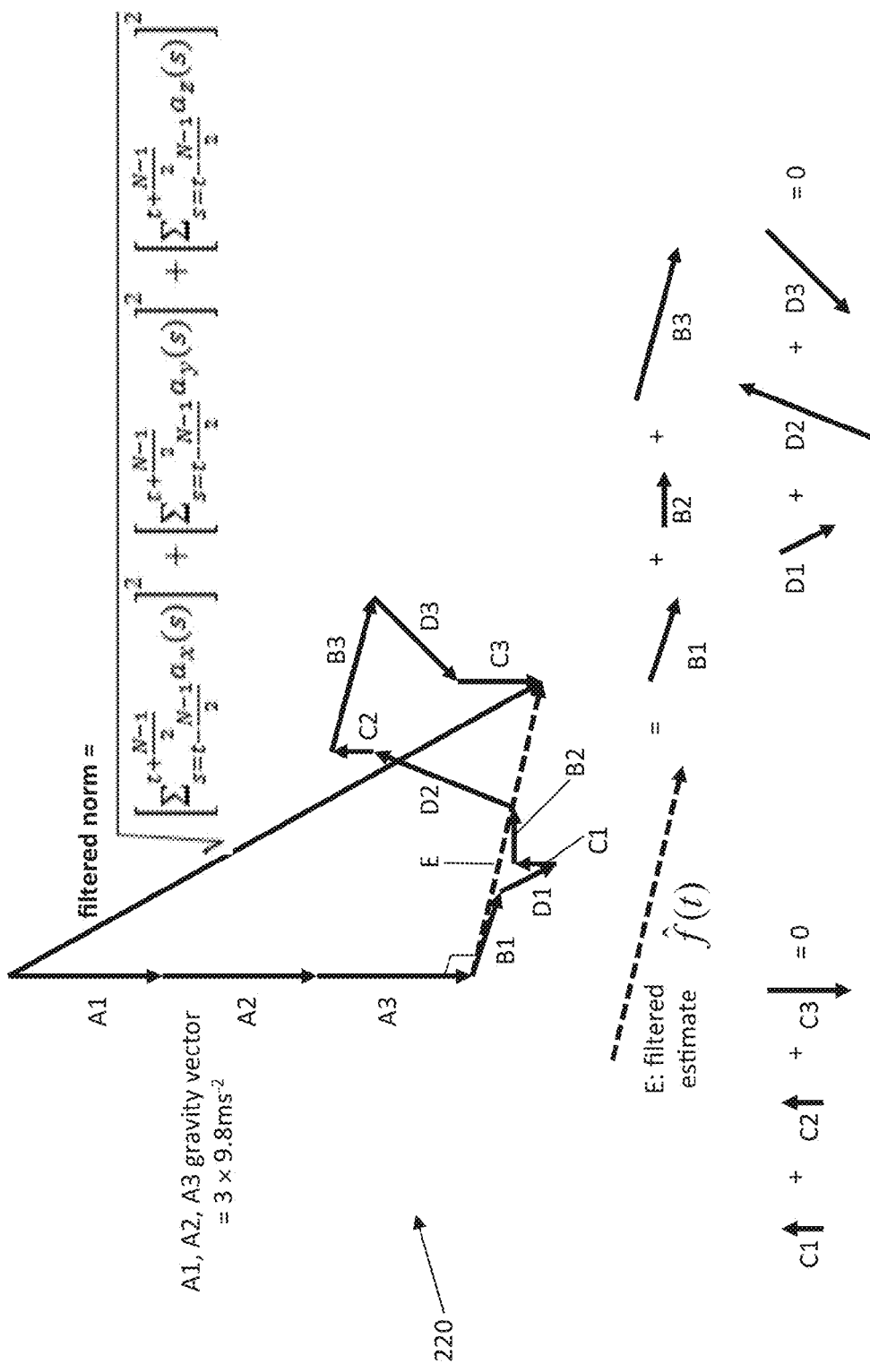
FIG. 22 is an exemplary diagram of estimating lateral forces by filtering a sequence of accelerometer data.

This moving mean filter has the added benefit of removing any non-lateral accelerations due to bumps in the road, as on any road with no change of grade, all up accelerations will be cancelled out by down accelerations such that the net displacement in the vertical direction is zero, provided the averaging time (dictated by N) is sufficiently large. By the same principle it is also very effective at removing any device movements caused by the user and not the vehicle. For example if the user waves the device around inside a moving vehicle that is accelerating, all the accelerations of the device with respect to the vehicle will sum to zero, as the net displacement of the device with respect to the vehicle is zero. The accelerations of the vehicle however will be captured, because these lead to a net displacement relative to the frame of reference of the moving vehicle. This is illustrated in diagram 220 of FIG. 22, which shows an example of estimating lateral forces by filtering a sequence of accelerometer data. In this illustration, there are three accelerometer samples corresponding to times t=1, t=2, and t=3. Each accelerometer vector can be decomposed into a sum of the component due to 1) gravity (vectors A1 at t=1, A2 at t=2, and A3 at t=3), 2) lateral vehicle movements (B1 at t=1, B2 at t=2, B3 at t=3), 3) vertical vehicle movements due to bumps in the road (C1 at t=1, C2 at t=2, C3 at t=3), and 4) device movements with respect to the moving vehicle (D1 at t=1, D2 at t=2, D3 at t=3). Components 3) and 4) result in a net displacement of zero (arrows sum to zero) and hence the filtered estimate E is equal only to the sum of the lateral vehicle movements B1, B2 and B3.

The above approach computes the total lateral g-force experienced by the moving vehicle but does not attribute or deconstruct it into components due to acceleration, braking and cornering. There are various approaches to determining this attribution or deconstruction.

By logging magnetometer data along with accelerometer data it is possible to determine if a strong g-force was due to cornering. This can be done by first fusing the accelerometer and magnetometer data into a compass bearing. Alternatively the bearing may be directly provided by the operating system (OS) with an appropriate API call (e.g. orientation or rotation vector from the Sensor Manager in Android). If over the time window in which the g-force event is measured, the net change of bearing is greater than a certain threshold, the g-force can be attributed to cornering. Note, this approach does not work for singular device orientations where the magnetometer sensor is aligned with gravity—typically when the device face is pointing completely horizontally. This is an atypical orientation for a device in a vehicle and can also be detected from the accelerometer with the compass being disabled at such points in time. A more robust approach to computing change of bearing is to log gyroscope data along with magnetometer and accelerometer and fuse the three. The downside to this approach is that gyroscope data is very power consumptive to log. It is worth noting that although the vehicle may have its own magnetic field which may interfere with the measurements, by lowering the detection threshold slightly, the change in bearing event should still be recordable. Another approach is to multiply the vehicle speed from a GPS fix obtained at a similar time, by the net change of bearing computed from the magnetometer, to obtain a centrifugal force. This approach is similar to the GPS-only approach described above except that it only requires a single GPS fix from which to derive the vehicle speed—the change of bearing can be obtained from a sequence of magnetometer samples rather than a sequence of bearing values coming from GPS fixes.

Attributing a G-Force to Acceleration, Braking or Cornering

If via one of the above approaches, the lateral g-force is determined not to be due to cornering, it is attributed to either acceleration or braking There are a number of different ways of making this attribution. One approach is to obtain a speed value from GPS fixes at the start and end of the window in which the g-force is measured. If the end speed is greater than the start, the g-force is attributed to acceleration, else braking An approach that does not rely on GPS is to determine when the vehicle is at rest (for example, by running the movement detector on the accelerometer data, as described earlier) and then monitor the accelerometer data following this to see in which direction the force acts on the device when it starts moving again. The rationale here is that the g-force experienced after rest must be acceleration and not braking By noting the vector direction of acceleration, a subsequent g-force can be attributed to acceleration if it falls in the same direction, and braking if it falls in the opposite direction. An improvement in this approach is as follows. Once vehicle rest is detected by the movement detector, run the activity recognizer (detailed in a previous section) on all subsequent data frames until the VEHICULAR_MOTION state is detected. At this point in time, stop running the activity recognizer and over the next few seconds, measure the direction of acceleration. In more detail, when rest is detected by the movement detector, compute and store the vector direction of gravity as:

$$g = \left( \frac{1}{N} \sum_{t=1}^{N} a_x(t), \frac{1}{N} \sum_{t=1}^{N} a_y(t), \frac{1}{N} \sum_{t=1}^{N} a_z(t) \right)$$

where N is the number of samples over which the gravity vector is estimated. A typical value of N should correspond to about 1-10 seconds of accelerometer data. When the movement detector starts detecting movement, run the activity recognizer. When the activity recognizer first starts outputting VEHICULAR_MOTION again, compute the vector direction of acceleration in the same manner as the vector direction of gravity was computed above, i.e.

$$a = \left( \frac{1}{N} \sum_{t=1}^{N} a_x(t), \frac{1}{N} \sum_{t=1}^{N} a_y(t), \frac{1}{N} \sum_{t=1}^{N} a_z(t) \right)$$

The same value of N can be used as above. Then compute the direction of net acceleration as the unit vector:

$$d = \frac{a - g}{\|a - g\|}$$

At a later point in time, a non-cornering g-force can be resolved to an acceleration or braking event by projecting the filtered vector:

$$f = \left( \frac{1}{N} \sum_{t=1}^{N} a_x(t), \frac{1}{N} \sum_{t=1}^{N} a_y(t), \frac{1}{N} \sum_{t=1}^{N} a_z(t) \right)$$

onto the direction of acceleration as $f^T g$. If the projection is positive, i.e. $f^T g > 0$ the g-force is attributed to acceleration, else it is attributed to braking. If accelerometer data is continuously logged, the above procedure can be applied retroactively in reverse when the vehicle is braking to a stop.

Calibrating the Accelerometer

Precise and timely calibration of the accelerometer is crucial to being able to measure g-forces of acceleration, braking or cornering, with any kind of reliable accuracy. Periodically recalibrating is also crucial since the accelerometer sensor can drift over time. It is also important as the manufacturer may perform its own calibration in the background from time to time, which invalidates the most recent system calibration. Manufacturer calibration typically occurs at night (e.g. 3 AM), but it is wise to periodically run checks to detect such an event. This can be done by measuring the filtered accelerometer norm (as computed above) when the device is detected to be at rest by the movement detector. If the filtered accelerometer norm differs from 9.8 by more than a certain threshold, a recalibration should be performed.

Silent background calibration is performed without any input from the user. This is done by periodically collecting accelerometer data throughout the day, storing those segments of data for which no movement is detected, and using these segments for recalibration at a periodic recalibration time. In more detail, whenever the system logs accelerometer data (in triggering or monitoring state) the movement detector is run. If movement is not detected, with some probability p (typically p=0.1) the system computes the filtered norm of this accelerometer data and stores both it and the raw data in a buffer. If the last N (typically 3-5) stored filtered norms all deviated from 9.8 by more than a certain threshold amount (typically 0.1-1.0), all previous data is wiped from the buffer and a flag is set to recalibrate. When the monitoring state is next entered, recalibration is started based on all the accelerometer data in the buffer.

While there are many recalibration algorithms in the literature, in one embodiment a highly effective least squares approach is used. This recalibration generates six parameters: three scaling factors $K_x$, $K_y$ and $K_z$ and three offsets $b_x$, $b_y$ and $b_z$. At all points in time following this, until the next recalibration, all accelerometer values ($a_x$, $a_y$, $a_z$) logged are modified as follows:

a. $\bar{a}_x = K_x a_x + b_x$ b. $\bar{a}_y = K_y a_y + b_y$ c. $\bar{a}_z = K_z a_z + b_z$ With the ($\bar{a}_x$, $\bar{a}_y$, $\bar{a}_z$) used in place of ($a_x$, $a_y$, $a_z$). These parameters are computed recursively. This recursion is initialized with the values ($K_x$, $K_y$, $K_z$, $b_x$, $b_y$, $b_z$)=(1, 1, 1, 0, 0, 0). The input data is denoted $a_x$, $a_y$ and $a_z$ where each of these variables is a vector containing all the x, y, and z axis accelerometer data in the buffer, respectively. Each iteration of the calibration procedure, the following is computed:

$$X = K_x a_x + b_x$$
$$Y = K_y a_y + b_y$$
$$Z = K_z a_z + b_z$$
$$A = [\, a_x.X \quad a_y.Y \quad a_z.Z \quad X \quad Y \quad Z \,]$$
$$b = \frac{1}{2}(9.8^2 + X.X + Y.Y + Z.Z)$$
$$C = \begin{bmatrix} I_{3\times3} & 0_{3\times3} \\ 0_{3\times3} & 0_{3\times3} \end{bmatrix}$$
$$d = \begin{bmatrix} 1 \\ 1 \\ 1 \\ 0 \\ 0 \\ 0 \end{bmatrix}$$
$$E = \begin{bmatrix} 0_{3\times3} & 0_{3\times3} \\ 0_{3\times3} & I_{3\times3} \end{bmatrix}$$
$$k = (A^T A + \alpha C^T C + \beta E^T E)^{-1}(A^T b + \alpha C^T d)$$

where x. y indicates element-wise multiplication of x and y, and $I_{3\times3}$ represents the 3×3 identity matrix. A typical value for $\alpha$ is $10^4$-$10^6$. The six parameters are then read from the vector k=[$K_x$, $K_y$, $K_z$, $b_x$, $b_y$, $b_z$]. These parameters are used to initialize the next iteration. A total of, for example, 10-20 iterations are run.

Detecting and Removing Motion Sensor Corresponding to User Movements

In some scenarios it is necessary to check if the user is handling the device while motion sensor data is being logged. This may be useful for ignoring the results of g-force values computed or maneuvering events detected. This is done by computing the difference in tilt of the device over the window of data collected. If the tilt is greater than a certain threshold, the system may not compute g-force data or detect maneuvering events with that data. The details of computing tilt are described below in the section on device handling while driving.

Detecting Maneuvering Events

Sensor data from the accelerometer can also be used to capture target maneuvering events such as harsh braking, fast cornering, hard acceleration, swerving, erratic acceleration/braking, harsh u-turns, harsh braking to complete stop, hard acceleration from stop, freeway merging, freeway exiting, etc.

A harsh braking event may be defined as a braking event where the maximum g-force observed exceeds a given threshold, such as 0.3 g's. Note 1 g=9.8 ms$^{-2}$.

A hard acceleration event may be defined as an acceleration event where the maximum g-force observed exceeds a threshold, such as 0.25 g's.

A fast cornering event may be defined as a cornering event where the maximum g-force observed exceeds a threshold, such as 0.5 g's.

A swerving event can be detected by comparing the direction of motion of the vehicle with the direction of the road. If the difference between these two quantities exceeds a threshold, swerving is reported. The direction of motion of the vehicle can be obtained directly through either the reported bearing from GPS fixes or from motion sensors such as the magnetometer. The direction of the road can be obtained from an online map database. For example, if the current road direction is 279° N and the current vehicle bearing is 330° N, a swerving event may be detected. Alternatively a swerving event may be detected by considering a sequence of road minus vehicle bearing values. The swerving event may be detected from this sequence first filtering and then thresholding it.

An erratic acceleration/braking event may be detected by observing in the sensor data, a rapid change from acceleration to braking, or vice versa. This event may be detected by measuring the spread of the g-force data (or more concretely, the standard deviation or variance) in the direction of the moving vehicle.

A harsh U-turn event may be detected by observing a change in bearing of approximately 180 degrees in a short period of time. The registered cornering g-forces may also be used in detecting this event.

A harsh braking to complete stop event may be detected by observing a harsh braking event that ends in a speed of 0 mph.

A hard acceleration from stop event may be detected by observing a hard acceleration event beginning with a speed of 0 mph.

A freeway merging or freeway exiting event may be detected by comparing the location of the device with a map database of freeway entrances/exits.

A lane toggling event may be detected by detecting numerous swerving events or lane changes in succession.

Maneuvering events may be illustrated on a mobile device by showing a map view with the precise location at which the event occurred highlighted on top of a display of the driving route taken. See FIG. 23 for an example of a map view 230 illustrating the locations at which various events occurred.

Detecting if the User Sent an SMS or Placed or Received a Call while Driving

It may be straightforward to record the occurrence of SMS events or incoming/outgoing calls on a particular OS platform. By retroactively learning the precise start and end times of a drive as previously described, the system may determine if a given SMS was sent during the drive, or before or after it. Likewise it can learn if a call was placed or received while driving. A call may have been placed or received before the drive began. In this case, the system can note that the user was still on the call when the drive began.

For the purpose of assessing risk of accident/claim, it may be valuable to learn and report to an insurer, the duration of a call made while driving. Likewise it may be valuable to learn and report to an insurer, the number of characters or number of key presses that went into creating an SMS that was sent while driving.

For the purpose of assessing risk of accident/claim it may also be valuable to know, not just that a call was made/ received or an SMS sent while driving, but information associated with these actions, such as:

the location of the user when the SMS was sent or call was made/received the speed of the vehicle when the SMS was sent or the maximum speed of the vehicle during the duration of the call whether or not the user was accelerating, braking, or cornering when sending the SMS or on a call the time of day, road conditions, traffic density, road type, etc., when the SMS was sent or call made.

Figure 23:
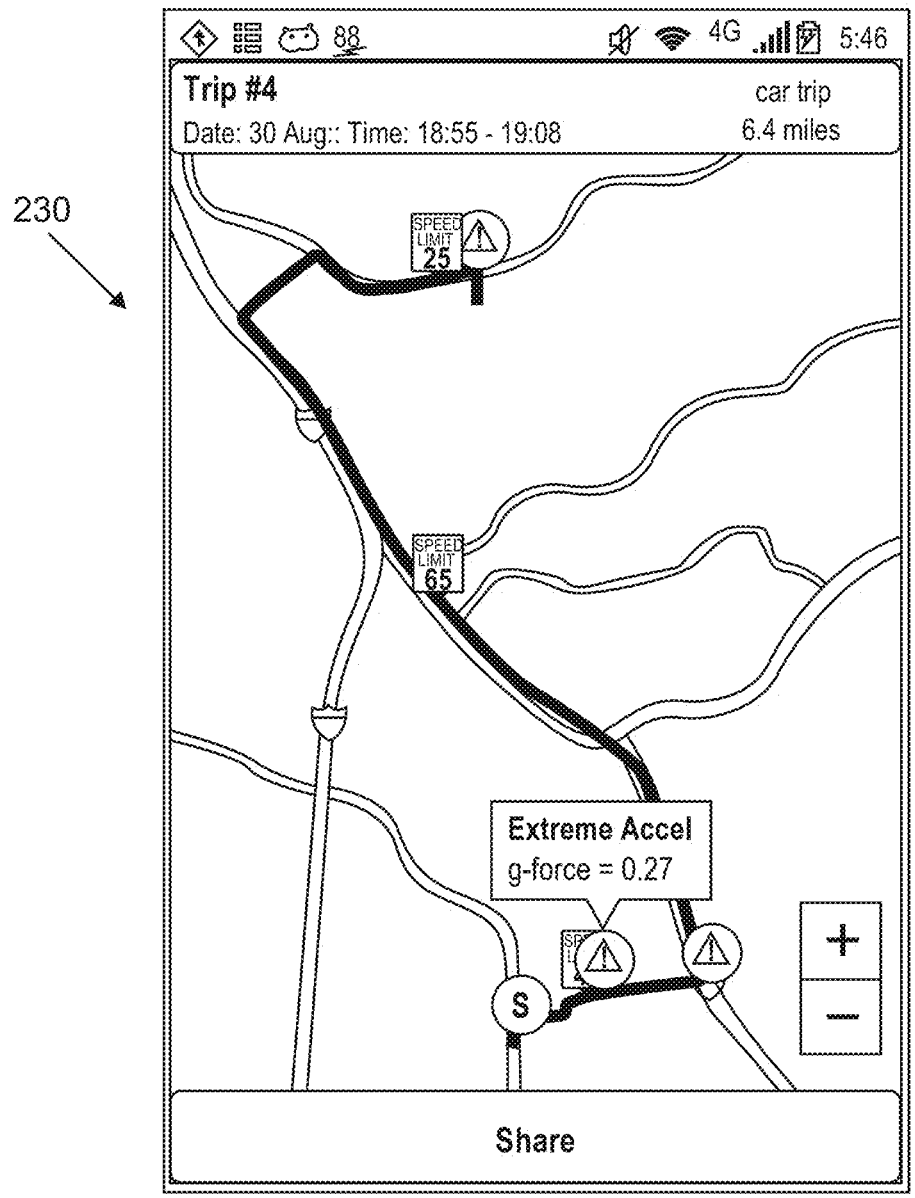
FIG. 23 shows an exemplary map view illustrating the locations at which various events occurred.

The precision location of a sent SMS or placed or received call can be obtained by acquiring a GPS fix when such an event is detected. This information can then be presented on a map together with the drive route taken, such as is shown in FIG. 23.

It may also be possible to record if a call was placed through the speakerphone, car Bluetooth or Bluetooth headset. For instance, by examining the Bluetooth class of device associated with its basic service set identification (BSSID) the system can learn if the user's device is paired with an audio headset of vehicle. This is information may be of value for the purpose of assessing risk of accident/claim.

Detecting if the User Turns the Device's Screen On or Off

For the purpose of assessing risk of accident/claim, it may be valuable for an insurer to know if the user turned the device screen on or off while driving, and how long the screen was kept on for. If the duration that the screen was kept on for is not a pre-set duration such as 10 seconds, 30 sec, 1 min, 2 min, 5 min, 10 min, 30 min, etc., it may be possible to conclude that the user was interacting with the device for at least X seconds.

Such an event may be illustrated on a mobile device by showing a map view with the precise location at which the event occurred highlighted on top of a display of the driving route taken. See FIG. 23 for an example.

Logging Application Usage while Driving

For the purpose of assessing risk of accident/claim, it may be valuable for an insurer to know which applications are in the foreground of the device while the screen is on and the user is driving (e.g. Facebook, Facebook messenger, Google maps, etc.). While in the monitoring state it may be possible to log this information and use it to conclude that the user was using these applications while driving. The duration for which each application was used may also be recorded. Other information described in the above bullets may also be useful for assessing risk when correlated with foreground application usage. Background application usage (such as turn-by-turn navigation, Pandora) may also be logged and used for the purpose of assessing risk.

Such events may be illustrated on a mobile device by showing a map view with the precise location at which the event occurred highlighted on top of a display of the driving route taken. See FIG. 23 for an example.

Detecting Device Handling while Driving

For the purpose of assessing risk of accident/claim it may be valuable for an insurer to know if the user handles their device while driving, even without turning the screen on. This can be detected in monitoring state by collecting motion sensor data and analyzing it to see if the data is consistent with being handled by a user. One embodiment of a method for doing this involves detecting if the device has been tilted while driving. Tilting refers to changing the orientation of the device with respect to gravity. When the device is at rest with respect to a moving vehicle, its bearing may change as the vehicle turns corners, etc., but the tilt should not change significantly. The tilt can only change significantly if handled by the user (or if the device becomes dislodged from it resting position in the vehicle, for example if the vehicle brakes very suddenly and the device goes flying and spinning.

Tilt can be detected in many ways. The preferred embodiment detects tilt by examining 1 sec of accelerometer data and computing the angle subtended between the first and last accelerometer vector sample. If the accelerometer vector samples are $a(1), \ldots, a(N)$, then tilt is detected if $$a\cos\left(\frac{a(1)^T a(N)}{\|a(1)\|\|a(N)\|}\right) > \tau,$$

where $\tau$ is the tilt threshold. A typical choice for $\tau$ is, for example, 5-20 degrees.

Determining Auxiliary Location Based Information

Information on weather, road conditions (age, number of lanes, grade, speed limit, historical probability of accident, etc), traffic density, current traffic speed, typical traffic speed, road type (e.g. freeway vs. suburban) and visibility in the vicinity of the driver's location and time can be looked up in online databases based on location data collected in the monitoring state. This information may be useful for assessing long term risk of accident/claim and/or generating real time risk alerts (see below).

Determining the Speed of the Vehicle

Location fixes obtained in the monitoring state may contain the speed of the vehicle. This information coupled to information such as the posted speed limit, the current average traffic speed, the distribution of speeds observed on the current road segment, etc. may be useful for assessing long term risk of accident/claim and/or generating real time risk alerts (see below).

This information may be illustrated on a mobile device by showing a map view with the precise location at which the speed was registered, highlighted on top of a display of the driving route taken. Information about the posted speed limit, typical traffic speed, or traffic speed at the time of passing can also be displayed on this map at this location. See FIG. 23 for an example.

Real Time Risk Alerts

Sensor data collected in the monitoring state can be used to generate real time risk alerts for the driver. These alerts indicate to the driver that they may presently be at significantly increased risk of accident relative to normal. These alerts may be audible alerts generated by the mobile device. They may also contain voice instructions recommending preventative actions the driver should take to reduce their risk of accident, e.g. "Slow down", "Slow down by 5 mph", "Corner slower", "Brake more gently", "Reduce radio volume", etc. The alerts may be generated by fusing together information from several dynamic sources such as: speed of vehicle relative to posted speed limit, speed of vehicle relative to typical traffic speed, speed of vehicle relative to current traffic speed, time of day, maneuvering events (harsh braking, accelerating, swerving, lane toggling, etc.), weather conditions, visibility (including night time visibility full/new moon), road conditions (such as age, number of lanes, grade, historical probability of accident, etc.), traffic density, road type (freeway vs. suburban), presence of passengers in the vehicle, music/talk/station listened to on radio/stereo, volume of radio/stereo. Static factors such as driver age, gender, vehicle type, vehicle color, garaged zip code, number of years of experience, etc. may also be taken into consideration. External factors such as the number of hours of sleep the user has gotten may also be factored in.

Rating a Drive, or Updating a Driving Score of a User
Discriminating Between Riding in a Car Vs. Taking Public Transportation Data collected in the monitoring state can be used to determine if the vehicular motion that triggered the system to switch into the monitoring state actually corresponded to riding on a public transportation vehicle such as a bus, train, subway, etc. The preferred embodiment is to attempt to make this determination after a drive start and end times and start and end locations have been determined, but before a driving route for the drive is determined. See FIG. 16.

Evidence from different classifiers and detectors can be fused together to make the overall discrimination. Classifier or detectors may utilize data from different sources. A summary of useful classification/detection techniques is as follows:

- Examine the sequence of location fixes obtained in the monitoring state to see whether they follow the route of a known public transportation route. Such routes can be found in online databases.
- Examine the start and end location of a drive to determine if these correspond to the start and end location of a known public transportation route.
- Compare the duration of a drive to the duration of known public transportation routes in the vicinity. Compare the start and/or end time of a drive to the start and/or end time of known public transportation routes in the vicinity.
- The motion and location data can be examined to determine if the user was waiting at a known public transportation station or stop location for several minutes prior to the detected drive, e.g. the user is observed at the location of Solana Beach train station for 5 minutes prior to the detected drive, and the motion data, when run through an activity recognizer, reveals the user was sitting during this period.
- Observing a prolonged period of walking or bicycling, both before and after the detected drive, e.g. if the user walked for 8 minutes prior to, and 12 minutes post the detected drive, this may indicate a public transportation route was taken.
- Collect motion sensor data during monitoring state wake-up periods. At the end of a detected drive, run all this motion sensor data through an activity recognizer to classify car vs. bus vs. train.
- The maximum g-force and/or maximum speed experienced during the drive may help discriminate between car vs. train or bus. For instance, if rapid acceleration to 75 mph is observed, this likely rules out the possibility of bus.
- Detecting turning events. Turning events can be detected from either the GPS change of bearing or the magnetometer or gyroscope. These can be used to rule out the possibility of a train ride.
- The number of stops made during the drive can be useful for classifying car vs. public transportation.
- Detecting if the radio is playing using the microphone can be useful for establishing the user was driving in a car, under the assumption that the radio does not play on a bus or train.

Using Location Fixes and an Online Database of Public Transportation Routes

One embodiment of a technique for discriminating between car vs. public transportation involves comparing a sequence of location fixes to an online database of public transportation routes. We utilize an API that when queried with a start location, end location and either departure or arrival time, returns a list of N quickest transportation trips satisfying the input constraints. The start and end location inputted to the API are those obtained for the detected drive. The departure or arrival time inputted is the start or end time of the drive. For each of the N quickest trips, the API returns a list of steps such as: "1. Walk from W to X; 2. Train from X to Y; 3) Bus from Y to Z." From this list we remove any initial and final walking steps. This leaves only the public transportation steps. The overall route for the public transportation steps is extracted. The route is characterized by a sequence of latitude/longitude coordinates. These coordinates either correspond to the location of the stations/stops (this is typical for subways), or a detailed piecewise linear representation of the route (this is typical for above ground transit options). Each location fix obtained in monitoring mode is compared to this route. The comparison is done by computing a deviation of the obtained location fix from the route. The deviation can be computed in many ways, such as the minimum geodesic distance of the location fix from the route. One embodiment is to compute an angular deviation of the location fix from the route. For example: computing the angle between the geodesic line joining the location fix and the nearest station, and the geodesic line joining the nearest route point from the next nearest route point. If the route points correspond to stations or stops spaced many hundreds of meters apart, then merely computing the distance of the location fix from the nearest point on the straight line joining the two stations/stops may be a highly inaccurate measure of deviation as the route may have significant curvature between these points. This is illustrated in FIGS. 24A and 24B, showing angular deviation of location fix from a route. In diagram 240 of FIG. 24A, computation is performed without accounting for fix accuracy, while in diagram 245 of FIG. 24B, computation is performed with accounting for fix accuracy. The accuracy of a location fix can be taken into consideration when computing its angular deviation from a route. A simple and effective way of doing this is to move the location fix directly toward the route by an amount proportional to the accuracy, before computing the angular deviation. Thus inaccurate location fixes will be given a greater benefit of the doubt by being moved closer to the route and accurate ones will be largely left in place. One embodiment is to move the location fix by a distance represented by (e.g., in meters):

$$\min(\max(20, 3 \times accuracy), \max(150, accuracy))$$

Learning Public Transportation Routes

The afore-described technique can be modified slightly to, in the event that public transportation is detected, learn the precise public transportation route taken. This is done by choosing the "best" of the public transportation trips returned by the API as the trip taken. For example, the trip with the highest scoring comparison metric can be outputted as the actual public transportation taken. Information associated with this route can also be stored in a database such as the mode of transportation (bus, train, subway, etc.), line taken (52 Bus), agency (e.g. Coaster), precise route, departure and arrival times and addresses, etc.

If the angular deviation is large, the location fix is noted as being inconsistent with the route, else it is noted as being consistent with it. After this deviation has been evaluated for each location fix, a comparison metric is computed between all location fixes obtained and the route. A good comparison metric is the fraction of consistent location fixes obtained. For example, if 14 locations fixes were obtained during the route, 7 of them were found to be consistent and 7 were found to be inconsistent, the fraction of consistent fixes is 0.5. If any of the trips returned by the API result in a fraction of consistent fixes greater than a fixed threshold, the detected drive is declared to actually be a public transportation trip. If none of the trips returned by the API return a fraction of consistent fixes greater than a fixed threshold, the detected drive is declared to indeed be a car trip. A typical value for the threshold is, for example, 0.5-0.8.

A better approach to computing the fraction of consistent location fixes is to take into account wake-up periods during which location fixes were not able to be acquired. If a location fix was requested during a particular wake-up period, but none was obtained, this is counted as a consistent location fix when computing the fraction. The rationale behind this is that if the user is in a moving vehicle but is unable to obtain a location fix, the user is likely in a subway tunnel and hence moving along a public transportation route.

A better comparison metric can be obtained by subtracting the time deviation from the fraction of consistent fixes. The time deviation characterizes the difference between the duration of the drive D (time between start and end) and the estimated travel time for the trip T, as returned by the API. The time deviation can be computed as a fraction as follows:

$$\text{time deviation} = \frac{|D - T|}{\max(D, T)}.$$

When computing the comparison metric, the time deviation can be weighted by a parameter $\alpha$ as follows:

comparison_metric=fraction_of_consistent_ fixes−α·time_deviation.

A typical choice for $\alpha$ is, for example, 0.5.

Cancelling a Background Audio Stream Using an Audio Lookup Service

While in the monitoring state the system may collect audio data that can be analyzed to detect events of interest pertaining to driving behavior or vehicle usage. The mobile device records the sound signals inside the vehicle, where the sound will be a combination of signals generated inside the vehicle, by the vehicle, from the direct environment outside the vehicle, and from the vehicle stereo system. The audio signal may include a background audio stream and a residual audio stream. For the purposes of this disclosure, a background audio stream shall be defined as an audio signal that originates from a reference signal that can be obtained, such as a radio or television broadcast, or pre-recorded audio track. The background audio stream may be lower in level than audio content within the vehicle, such as when music is playing quietly behind conversation taking place in the vehicle. In other instances, the background audio stream may be dominant in the recorded audio signal, such as if music is playing loudly. The recorded audio signal is processed, such as by canceling the background audio stream to result in the residual audio stream. The residual audio stream is used to determine a driving behavior factor such as identification of a vehicle in which the recorded audio signal was recorded, location of the mobile device within the vehicle, and speech recognition to identify the presence of other passengers in the vehicle. Other possible driving behavior factors that may be identified and used to characterize driving circumstances include, for example, road noise, car windows being open, or car maintenance conditions (e.g., brakes screeching, indicating low brake pads). Thus, the residual audio stream is used to detect anomalies that can indicate certain driving conditions.

An insurance driving score for a driver may be calculated based at least in part on the driving behavior factor, where the driving behavior factor relates to automobile insurance. A driving score may be calculated, for example, by using the vehicle identification and the location of the mobile device within the vehicle to identify the driver of the vehicle. Upon identifying a particular driver, statistical data can be gathered on common driver routes and their properties, such as the density of traffic, speed limit, etc. that may be associated with insurance risk. Additionally, a driving score can be determined by the driving habits of the user, such as the number of hard brakes or sharp turns per drive. The residual audio signal may also be used to determine the noise environment present in the vehicle, such as several loud passengers for example, that may influence driving behavior. Not the driver but unsafe, drunk driving detection—lots of sharp turns, swerving, speed changes.

In one example of analyzing audio data, for instance, the presence of speech in the audio stream may indicate there are passengers in the vehicle. If the car radio/stereo is switched on, it may be difficult to discern such events from the audio stream. This is particularly the case if the radio/stereo is playing at a high volume. In this section a technique is disclosed for cancelling a background audio stream using a reference signal obtained from an audio lookup service. In the context of driving, the background audio stream may emanate from the radio or stereo, but more generally it may come from any auditory source for which a reference signal can be obtained, such as a radio, satellite radio, television, movie, audio book, Youtube video, music, etc. Potential uses include:

Improved speech recognition accuracy (e.g. Siri or Google Voice) at a bar, restaurant, party, in a car, store, etc.

Figure 25:
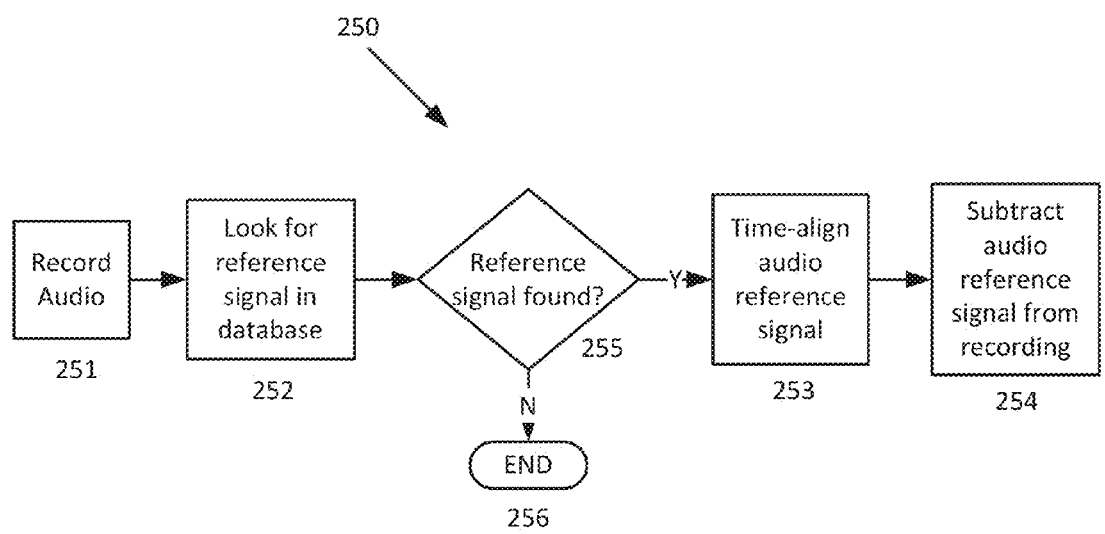
FIG. 25 is an exemplary flowchart showing an overview of background audio stream cancellation using an audio lookup service.

Enhanced speech quality for voice or VOIP (Voice over Internet Protocol, e.g. Skype) calls Detecting characteristics of an audio environment such as the presence of someone talking Overview The technique is as follows and summarized at a high level in flowchart 250 of FIG. 25, which shows an overview of an exemplary background audio stream cancellation using an audio lookup service. In step 251 an audio signal is recorded. In some embodiments, the audio signal is stored on a memory device, such as the memory of the audio device, or uploaded to a server. In other embodiments, the audio signal may be processed in real-time by the system, such that the audio signal is not stored. The system communicates with an audio database to obtain a reference signal to which the audio signal can be compared. It may then be determined if the background audio stream in the recorded audio signal matches the reference signal. If a match is confirmed, a time alignment is computed between the background audio stream and the reference signal, by aligning at least a portion of the recorded audio signal with the reference signal using the time alignment. For example, an online database is contacted (e.g. Shazam, TuneInRadio) in step 252 to identify the original background stream, time-align it with the audio signal in step 253 and then use it as a pilot to cancel out its contribution from the recording in step 254. The remaining signal captures the audio minus the background stream and thus enables one to perceive elements of the signal with greater clarity. If the online database fails to identify a background stream in step 255, the system assumes that none is present and ends the cancellation procedure at step 256. The various operations in this process, such as determining, computing, and canceling, may be done by the mobile device, on a computer processor such as a server that is in communication with the mobile device, or a combination of the mobile device and server.

If the reference background stream is in stereo (as is typically the case), the two channels (left and right) will interfere greatly with one another. In order to achieve high gain a successive cancellation of each channel may be performed using a receiver/equalizer design such a Minimum Mean Square Error (MMSE) receiver. Geometrically the MMSE receiver projects the recorded signal onto a subspace that is close to orthogonal with one channel, in order to estimate the other channel with little interference.

In the case of radio, the user's coarse geographic location (obtained through a location identifier such as GPS, cellular network, Wifi signature, or Internet Protocol (IP) address) is used to determine the possible radio stations they may be listening to. The radio station may have an online radio database to serve as the audio database for audio analysis. The recorded audio signal is matched with an online streamed radio database (e.g. Tune-In radio) to determine the station and then use the original background stream from this radio station as the reference. A streamed database of satellite radio is also checked. The recorded audio signal is compared with the online radio database from the radio station to determine if a match is found between a selected signal in the online radio database and the background audio stream. If a match is found, the selected signal in the online radio database is used as the reference signal for computing the time alignment. The same methodology applies for a reference background stream from television stations.

In performing the cancelling the system incidentally learns the responses for each channel (left/right). This can be used to learn properties of the environment the user is in such as which side of a vehicle a user is seated on. See later section.

Server-Client Interaction

Figure 26:
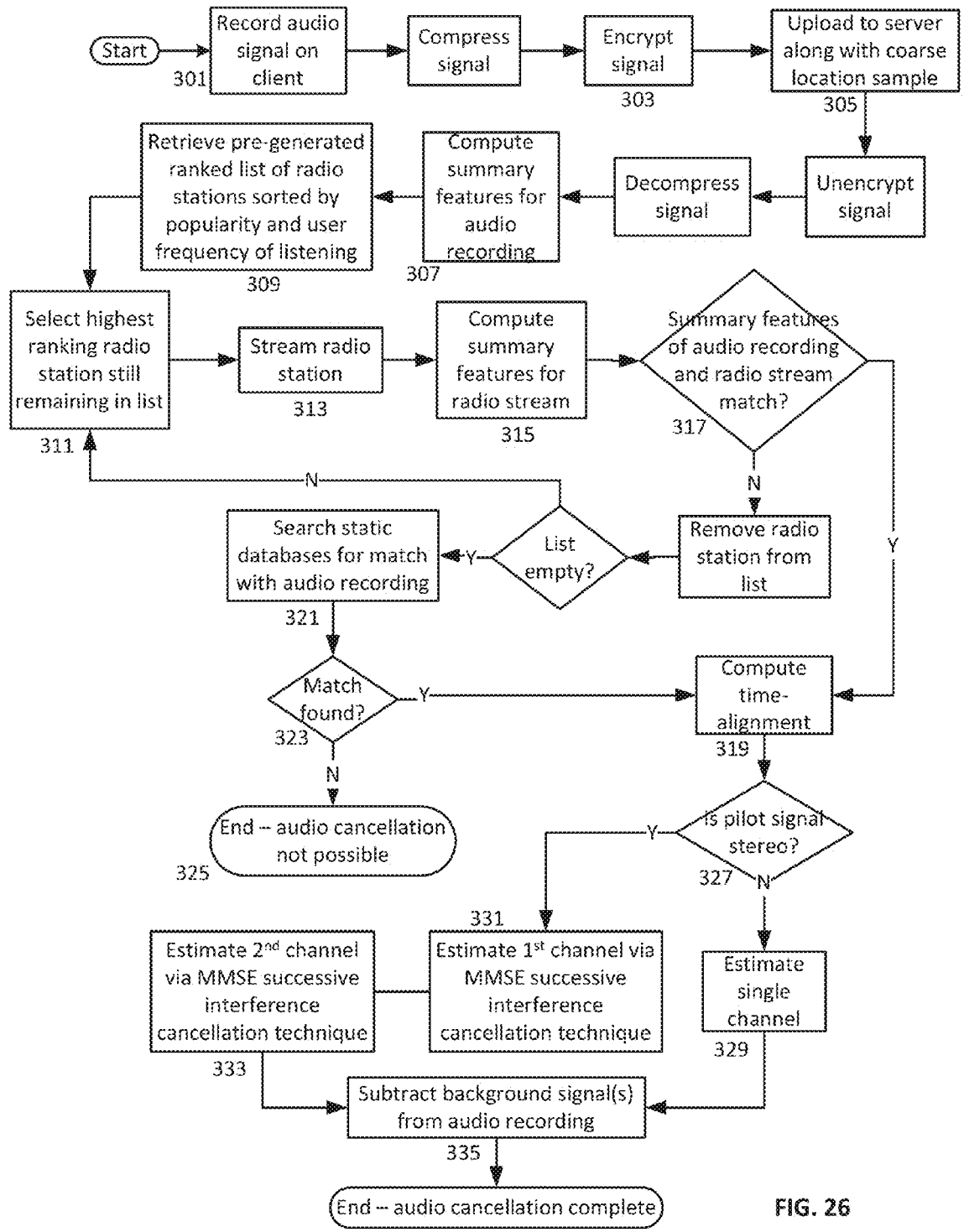
FIG. 26 is a flowchart of an embodiment of background audio stream cancellation using an audio lookup service, with cancellation performed on a server.

Some steps in this technique may take place on the server. One embodiment is as follows and shown in flowchart 300 of FIG. 26, which is an embodiment of background audio stream cancellation using an audio lookup service, with cancellation performed on server. An audio recording of, for example, 10-30 seconds in duration is collected on the client at step 301, along with a coarse location sample. Summary features are computed, encrypted at step 303 and uploaded to the server along with the coarse location sample at step 305. The summary features in step 307 may include locations of time/frequency energy maxima, Mel Frequency Cepstral Coefficients (MFCCs), etc. At the server, the coarse location is used to look up a list of radio stations playing in the area. The list of radio stations is sorted at step 309 according to criteria such as popularity, frequency of listening by the user, etc. Starting from the top of the sorted list in step 311, each radio station is streamed in step 313 from an online radio database (e.g. TuneInRadio). Summary features for the radio stream are computed at step 315 and compared to the summary features uploaded by the client. If a sufficient match is found in step 317, the audio stream is declared to contain this radio station and a pilot snippet of each channel of the radio stream is then taken. That is, the selected online radio database that has been identified as a match is used as the reference signal for computing the time alignment with the recorded audio signal. The pilot snippet may be an audio segment having a length of, for example, a few milliseconds, 1 second, 30 seconds, 2 minutes, or up to an entire song. The start and end time of the pilots are chosen based on the uploaded summary features so that they align at step 319 with the start and end time of the original audio recording as closely as possible. The pilots are then downloaded back to the client. The client uses them to cancel off the audio stream. This procedure is described below.

If a sufficient match is not found, the server attempts to find a match in step 321 in offline databases cataloguing music, audio books, etc. If this service is used in scenarios other than when the user is in a vehicle, other online and offline databases are consulted. For instance the server may try consulting a music database to find a match for the uploaded summary features. If a match is found in a database at step 323, the audio stream is declared to contain this music/audio and as above, a snippet of each channel of the music/audio is taken with the start and end time chosen based on the uploaded summary features so that they align in step 319 with the start and end time of the original audio recording as closely as possible. In this sense the snippets are time aligned with the original audio recording. We refer to these snippets as pilot signals. If no match can be found in any database, the audio recording is declared to not contain any music/audio that can be cancelled at step 325.

The afore-described embodiment can be modified in various ways. For instance, cancellation may be performed on the server with the client encrypting and uploading the entire audio recording at steps 303 and 305. Additional audio analysis then may be performed on the server with the results being sent back to the client.

As the background cancellation may require intensive processing and hence affect user experience and battery drain, it may be advantageous to store the audio recordings for later processing, for instance, when the user plugs in their device to charge. In some scenarios it may suffice to capture the audio recording, compute relevant features, and store only these features for later processing. The later processing may involve afore-described communication with the server.

In some scenarios both the cancellation and the subsequent audio analysis may both be performed using only features computed from the raw audio data. If this is the case, the client may compute and upload only these features to the server at step 305. This approaches saves on data transfer. It also provides greater privacy protection for the user. In more detail of this embodiment, upon completing an audio recording, MFCCs are computed and the original recording is discarded. The MFCCs are encrypted and uploaded to the server along with the coarse location at steps 303 and 305, and the server uses this information to look up the pilot signal and subtract its component from the computed MFCCs.

Computing Summary Features

Different summary features can be computed at step 307, for example the (time, frequency) location of peaks in the energy spectrogram. One embodiment is to first divide the audio recording into 30 millisecond chunks, overlapping by 15 ms. For each 30 ms chunk, 39 MFCCs are computed consisting of 12 static MFCCs+1 log-energy coefficient, 13 delta-MFCCs and 13 accel-MFCCs. The uploaded summary features are thus contained in a matrix of size N×F where N depends on the duration of the audio recording and F=39. Note that the numerical values described here are used as examples, but are not limited to these values.

Identifying the Source of the Background Audio Stream

The uploaded summary features can be used to identify the source of the background audio stream through an online database and/or lookup service such as Shazam.

Computing Time-Alignment

Once the source of the background audio stream has been identified, this pilot signal needs to be aligned at step 319 as closely as possible in time with the audio recording. This can be done in a number of different ways. One effective way is to compare the MFCC summary features computed for the audio recording with the MFCC features computed for the pilot signal. If the pilot signal is stereo at step 327, a simple approach is to add the left and right channels together and compute the MFCCs from the sum. The offset between the two signals can then be obtained by finding the offset of maximum correlation between these two MFCC sequences.

In more detail, denote the MFCC features computed for the audio recording and pilot signal as X(f, n) and Y(f, n), respectively, where f indexes the feature number and t indexes the window number with f=1, . . . , F and n=1, 2, . . . . The cross-correlation function between these two sequences is $$R(n) = \sum_{f=1}^{F} \sum_{s=n+1}^{N} X(f, s-n) Y(f, s)$$

The offset is chosen as the value of t that maximizes this expression. This offset is expressed is units of MFCC chunks. This can be converted back into milliseconds by multiplying by the number of milliseconds per MFCC chunk.

Estimating the Left and Right Channels and Cancelling Off the Pilot

Once the background audio has been identified and the pilot signal(s) extracted and time-aligned with the audio-recording, the channel(s) are estimated and the pilot(s) cancelled from the recorded audio stream. We first check if the background signal is mono or stereo. If mono at step 327, we use mono subtraction, if stereo, we use stereo subtraction.

Mono Channel Estimation and Subtraction

Mono channel estimation at step 329 and subtraction at step 335 is simpler than the stereo case as there is no interference from a second channel. The channel is assumed to be constant for the duration of the audio recording and a linear time-invariant model is hence used. The received signal y(t) is assumed to be a sum of the background reference (pilot) signal s(t) convolved with the channel h(t), and the residual audio signal w(t) we are trying to estimate $$y(t) = h(t) * s(t) + w(t).$$

The first goal is to estimate h(t) at step 329 and then convolve it with the pilot x(t) and subtract the result off. This is done by first computing spectrograms for the channel and the audio recording. A spectrogram is a sequence of short-time Fourier transforms of a signal, with successive estimates being taken over successive temporal windows of the signal. These windows are typically overlapping in time. It is thus represented by a matrix, the rows of which represent the short-time Fourier transforms of the signal for the time window of interest. Successive columns represent successive time windows. Typically when computing a spectrogram there are three options: choice of 1) window function, 2) window width, and 3) window overlap. A window function such as a Hamming window may be used in some embodiments, but other embodiments do not use one (i.e. it uses a square window function). The choice of window width is dictated by the delay spread (i.e. echo) of the channel. Channels with larger delay spread (greater echo delay) require a larger window width so that the echoes of the signal in one window do not leak into too great a fraction of the following window. However, there is a tradeoff. The wider the window the fewer the number of spectrogram samples computed, the less averaging that can take place and hence the less accurate the channel estimates are. To balance these two conflicting constraints, for a 10 s audio recording, we choose a window width of about 0.5-1 s and a 50% overlap. This leads to about 20-40 spectrogram rows from which to estimate the channel. Once the spectrograms are computed, each frequency bin of the spectrogram of the audio recording only depends on the same frequency bin of the pilot spectrogram (ignoring the small amount of echo leakage). This enables us to estimate the channel for each of these frequency bins in isolation.

In more detail, denote the spectrograms of the audio recording and channel $Y \in \mathbb{C}^{F \times N}$ and $S \in \mathbb{C}^{F \times N}$, respectively. Here F and N are the number of frequency bins and time windows used, respectively. The spectrograms can be represented as matrices, each row corresponding to a different frequency bin, i.e.

$$Y = \begin{bmatrix} y(1)^T \\ \vdots \\ y(F)^T \end{bmatrix},$$

$$S = \begin{bmatrix} s(1)^T \\ \vdots \\ s(F)^T \end{bmatrix},$$

where the vectors $y(f)^T = [y(f, 1), \ldots, y(f, N)]$ and $s(f)^T = [s(f, 1), \ldots, s(f, N)]$ are the f-th rows of the respective spectrograms. The signal-to-noise ratio (SNR) of the channel is denoted P(f). This is estimated for each frequency f.

The MMSE estimate of the channel is obtained by projecting the audio recording onto the subspace spanned by the pilot signal and scaling appropriately:

$$\hat{h}(f) = \frac{P(f)}{1 + P(f) s(f)^T s(f)} s(f)^T y(f)$$

Figure 27:
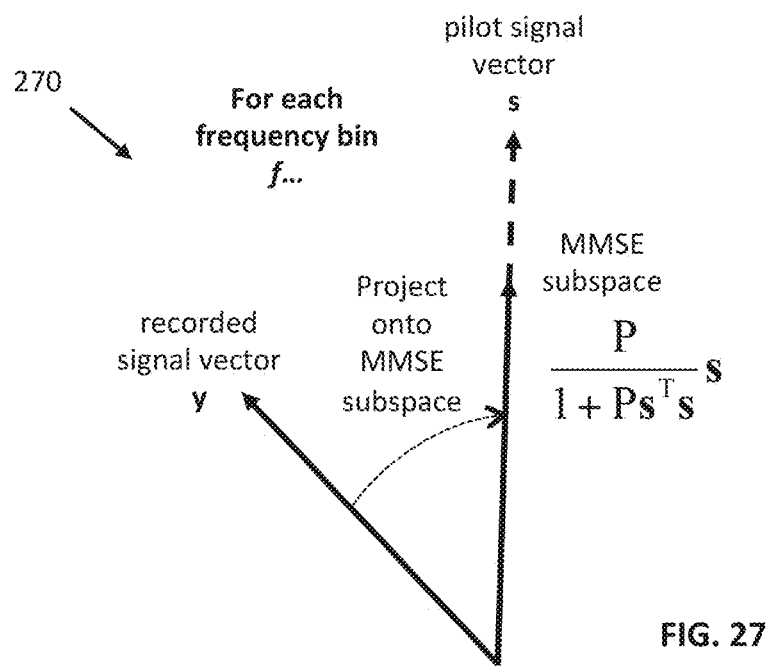
FIG. 27 is an exemplary geometric illustration of Minimum Mean Square Error (MMSE) estimation of channel for mono pilot.

This is illustrated geometrically in diagram 270 of FIG. 27, which shows geometric illustration of MMSE estimation of channel for mono pilot.

The estimate of the channel impulse response $\hat{h}(t)$ can then be found by taking the inverse Fast-Fourier Transform (FFT) of $\hat{h}(f)$.

In the frequency domain $$y(f,n) = h(f) s(f,n) + w(f,n) + r(f,n)$$

where r(f, n) represents the leakage of the signal from the previous time window. As such, after estimating the channel we can estimate the spectrogram of the residual audio signal by cancelling off the background signal, i.e.

$$\hat{w}(f,n) = y(f,n) - \hat{h}(f) s(f,n)$$

The estimate of the audio recording with the background audio stream cancelled can then be found by taking the inverse FFT of each $\hat{w}(f, n)$ for n=1, . . . , N and concatenating the results.

If the spectrograms are computed using an overlap, this step needs to be modified appropriately. For example if a 50% overlap is used, two concentrated sequences can be formed, one from the inverse FFTs of $\hat{w}(f, 1), \hat{w}(f, 3), \ldots$ and the other from the inverse FFTs of $\hat{w}(f, 2), \hat{w}(f, 4), \ldots$ . These two sequences can then be averaged to return the desired audio signal estimate.

Stereo Channel Estimation and Subtraction

In some embodiments, the recorded audio signal is a stereo signal including a left channel and a right channel, where canceling the background audio stream includes performing successive cancellation of the channels based on interference between the left and the right stereo channels. In the stereo channel estimation case, one channel is first estimated at step 331 of FIG. 26, and its contribution is canceled off to estimate the other at step 333. The received signal y(t) is assumed to be a sum of the background reference (pilot) signal played through the left channel $s_L(t)$ convolved with the left channel $h_L(t)$, the pilot signal played through the right channel $s_R(t)$ convolved with the right channel $h_R(t)$ and the residual audio signal $w(t)$ we are trying to estimate $$y(t)=h_L(t)*s_L(t)+h_R(t)*s_R(t)+w(t)$$

We start with three inputs, the spectrogram of the audio recording $Y \in \mathbb{C}^{F \times N}$, and the spectrograms of the left and right pilot signals $S_L \in \mathbb{C}^{F \times N}$ and $S_R \in \mathbb{C}^{F \times N}$ respectively. Again F and N are the number of frequency bins and time windows used, respectively. The signal-to-noise ratio (SNR) of the left and right channels are denoted $P_L(f)$ and $P_R(f)$, respectively. These are estimated for each frequency f. We describe this procedure below.

Figure 28:
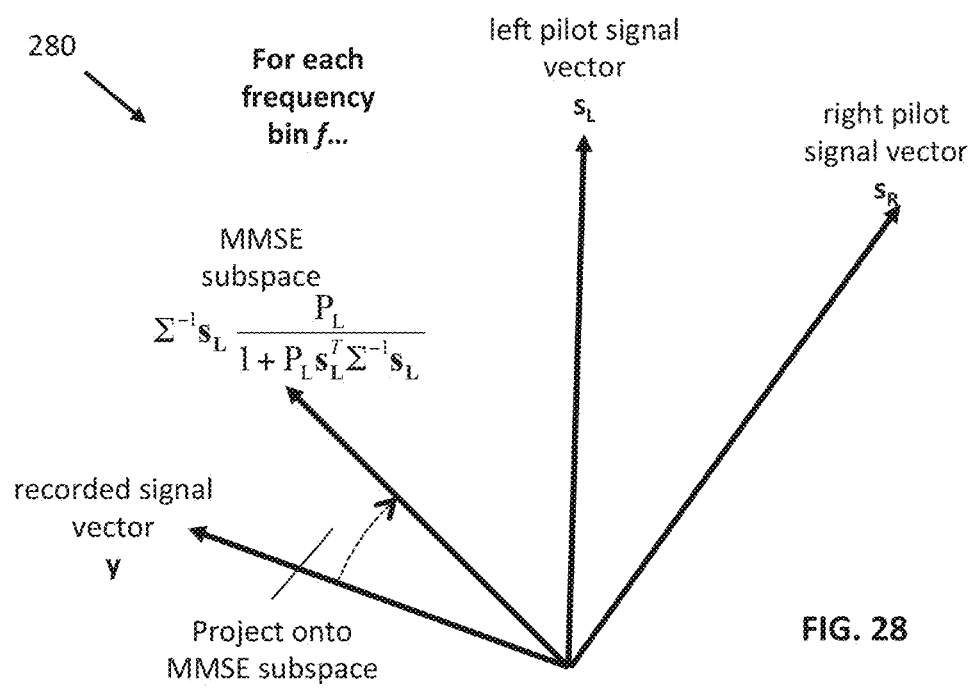
FIG. 28 is an exemplary geometric illustration of MMSE estimation of channel for stereo pilot.

There are various ways of estimating the channels but under certain standard assumptions, one embodiment is to use a MMSE equalizer/filter with successive cancellation. This involves first estimating one channel (e.g. the left) in the presence of interference from the other channel (e.g. the right), and then subtracting its contribution from the original signal to then estimate the other channel interference free. For each frequency bin, this is done by projecting the corresponding audio recording spectrogram vector (i.e. row in the matrix) onto a particular subspace. The MMSE subspace is a weighted combination of the subspaces spanned by the noise and the interference from the other channel. This subspace is obtained by first whitening the signal, and then projecting onto the space spanned by the left channel. This technique is illustrated in diagram 280 of FIG. 28, which shows an exemplary geometric illustration of MMSE estimation of channel for stereo pilot.

To simplify the description, in what follows the dependence on the frequency f is omitted, making it implicit. We start by describing the procedure to estimate the left channel, subtract its contribution off, then estimate the right channel more cleanly. That is, in some embodiments, the recorded audio signal is a stereo signal having a left channel and a right channel, and the canceling involves performing successive cancellation of the channels based on interference between the left and the right stereo channels.

The whitened subspace is the inverse of the noise covariance matrix plus the interference (right channel) covariance matrix. It can be expressed analytically using the matrix inversion lemma:

$$\sum\nolimits^{-1} = I_T - \frac{P_R s_R s_R^T}{1 + P_R s_R^T s_R}$$

Where $I_T$ is the T×T identity matrix. The MMSE estimate of the left channel at frequency f is then $$\hat{h}_L = \frac{P_L}{1 + P_L s_L^T \sum^{-1} s_L} s_L^T \sum\nolimits^{-1} y$$

The quality of this channel estimate at frequency f can be ascertained by computing the signal-to-interference-ratio SINR, which is $$SINR = \frac{P_L \left| s_L^T \sum^{-1} s_L \right|^2}{P_R \left| s_L^T \sum^{-1} s_R \right|^2 + \left\| \sum^{-1} s_L \right\|^2}$$

It is often easier to work in the log domain, i.e. deal with $$SINR\_dB = 10\log\left(\frac{P_L \left| s_L^T \sum^{-1} s_L \right|^2}{P_B \left| s_L^T \sum^{-1} s_R \right|^2 + \left\| \sum^{-1} s_L \right\|^2}\right)$$

Computing the SINR or SINR_dB is important as it enables providing an accurate confidence about how effective the cancellation has been. This helps at a later point in determining whether or not to proceed with analysis of the audio signal to which cancellation has been applied. For example, if the computed SINR_dB is low (e.g. below a target threshold) it may be decided to abandon further analysis for that wakeup period. The SINR_dB varies from audio recording to audio recording based primarily on how similar the left and right background streams are. For example, if the stereo cancellation approach is applied to a mono signal, where left and right pilot signals are identical, SINR_dB will be $-\infty$ meaning that the left and right channels cannot be discerned.

The right channel is then estimated by subtracting the left signal contribution from the recording spectrogram:

$$x(f)=y(f)-\hat{h}_L(f)s_L(f)\approx h_R(f)s_R(f)+w(n)$$

for f=1, . . . , F. The estimate of the right channel is then obtained by applying another MMSE filter:

$$\hat{h}_R = \frac{P_R s_R}{1 + P_R s_R^T s_R} x$$

In theory, the above the above filter is not truly MMSE as it under-estimates the noise variance (which has increased now due to the non-perfect estimate of the left channel).

Although in this procedure estimates have been computed for both channels, in practice a more accurate estimate of the left channel is gained by re-applying the above procedure with the left and right channels swapped.

In the frequency domain $$y(f,n)=h_L(f)s_L(f,n)+h_R(f)s_R(f,n)+w(f,n)+r(f,n)$$

where r(f,n) represents the leakage of the signals from the previous time window. As such, after estimating the left and right channels the spectrogram of the residual audio signal can be estimated by cancelling off the background signal, i.e.

$$\hat{w}(f,n)=y(f,n)-\hat{h}_L(f)s_L(f,n)-\hat{h}_R(f)s_R(f,n)$$

The estimate of the audio recording with the background audio stream cancelled can then be found by taking the inverse FFT of each $\hat{w}(f, n)$ for n=1, . . . , N and concatenating the results. As in the mono case, if the spectrograms are computed using an overlap, this step needs to be modified appropriately. See above section.

Estimating SNRs

The SNRs can be estimated in various ways though it always makes sense to utilize knowledge of the energy in the pilot signal and the energy in the overall signal for this purpose. For the mono case, one embodiment is to use $$P(f) = \frac{\frac{1}{NF}\sum_{n=1}^{N}\sum_{f=1}^{F}|s(f,n)|^2}{1+\frac{\alpha}{NF}\sum_{n=1}^{N}\sum_{f=1}^{F}|y(f,n)|^2}$$

where $\alpha$ is a tunable parameter. A typical choice of $\alpha$ is 0.01-1.

For the stereo case we have:

$$P_L(f) = \frac{\frac{1}{NF}\sum_{n=1}^{N}\sum_{f=1}^{F}|s_L(f,n)|^2}{1+\frac{\alpha}{NF}\sum_{n=1}^{N}\sum_{f=1}^{F}|y(f,n)|^2}$$

and $$P_R(f) = \frac{\frac{1}{NF}\sum_{n=1}^{N}\sum_{f=1}^{F}|s_R(f,n)|^2}{1+\frac{\alpha}{NF}\sum_{n=1}^{N}\sum_{f=1}^{F}|y(f,n)|^2}$$

Detecting if the User is Listening to the Radio/Stereo while Driving

While in monitoring state the system may collect audio data that can be analyzed to detect if the user is listening to the radio/stereo. This information may be useful to an insurer for assessing the risk of claim/accident. Additionally, the type of music being listened to (e.g. talk radio, heavy rock, classical, etc.), the precise radio station or audio track being listened to (e.g. 94.9 San Diego or CD of Nirvana's Smells Like Teen Spirit), and the absolute or relative volume at which the radio or stereo is being listened to. This can be done as described in the previous section on cancelling a background audio stream using an audio lookup service.

Determining if the User is the Driver of the Vehicle or a Passenger

Figure 29:
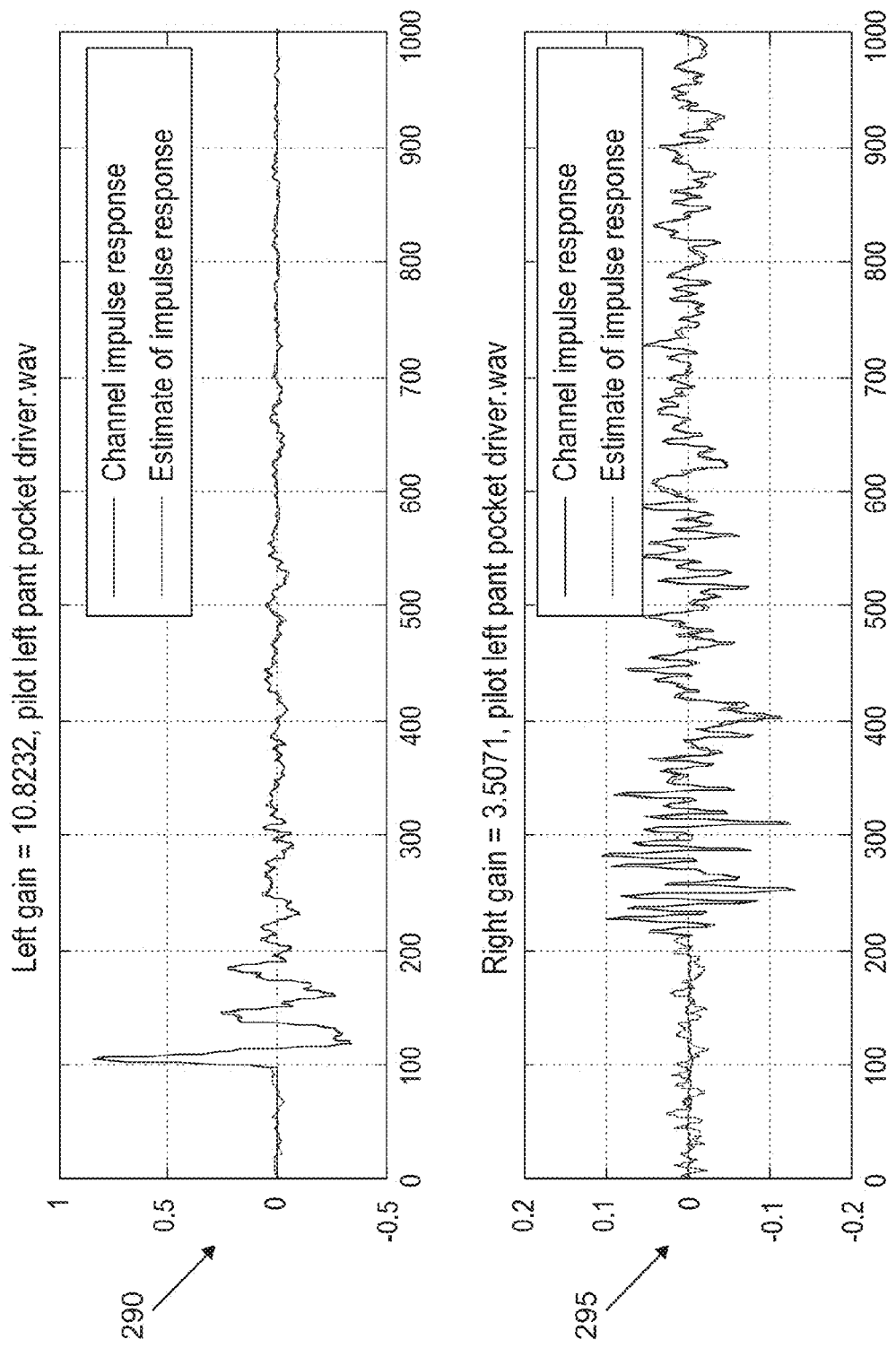
FIG. 29 shows exemplary estimated impulse responses from left and right channels in a 4-door passenger sedan when a mobile device was in the driver's left pant pocket.
Figure 30:
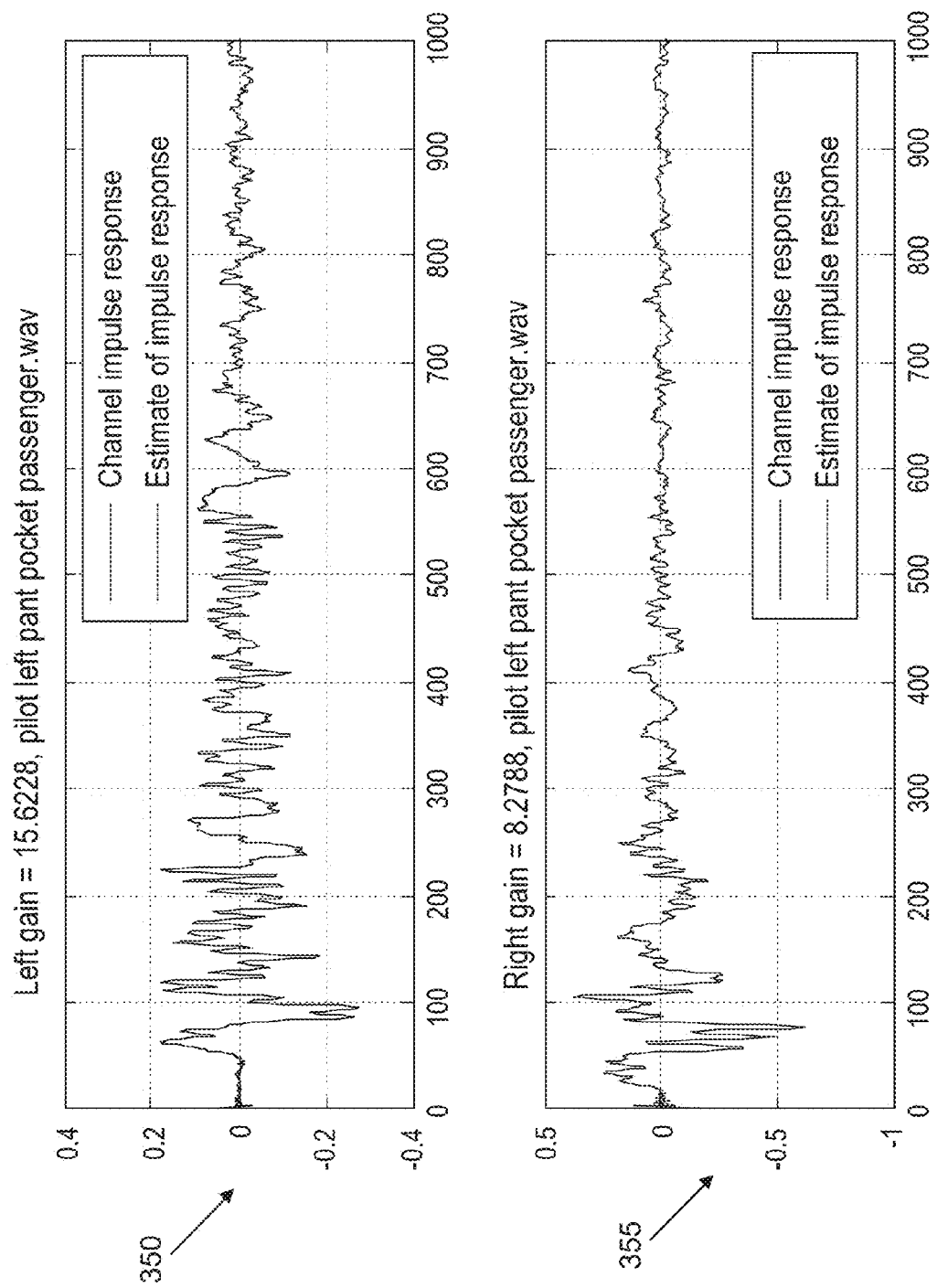
FIG. 30 shows exemplary estimated impulse responses from left and right channels in a 4-door passenger sedan when a mobile device was in the passenger's left pant pocket.

During wake-up in the monitoring state audio data may be captured. From it the contribution of the radio/stereo is attempted to be canceled as described above. If radio/stereo music/talk is detected, it is possible to estimate the channels between the user's mobile device and the left and right set of loudspeakers in the vehicle. If the mobile device is on the left side of the vehicle, the estimated impulse response of the left channel $\hat{h}_L(t)$ will arrive before the estimated impulse response of the right channel $\hat{h}_R(t)$. If the device is on the right side of the vehicle, the opposite will occur. This is illustrated in graphs 290 and 295 of FIG. 29, showing exemplary estimated impulse responses from left and right channels in a 4 door passenger sedan. In graph 290, the left channel impulse response is shown (estimated as a dotted line, actual as a solid line) and the estimated right channel impulse response is shown in graph 295. This data comes from measuring left and right channel impulse responses in a 4 door passenger sedan and simulating the received audio signal composed of a CD playing through the stereo, speech, and road noise. From these plots one can see that the left channel impulse response arrives about 120 samples ahead of the right channel corresponding to a delay of 2.72 ms (@44.1 KHz) between the signals arriving from the left and right sets of loudspeakers. This indicates that the mobile device is on the left side of the vehicle, which is indeed the case—the device was in the drivers left pant pocket. Another example is shown in FIG. 30 showing estimated impulse responses from left (diagram 350) and right (diagram 355) channels in a 4 door passenger sedan, Here the right impulse response arrives before the left by about 40 samples ahead of the left channel corresponding to a delay of 0.91 ms (@44.1 KHz), suggesting the device is on the right side of the vehicle. Indeed this is the case—it was in the passenger's right pant pocket. Thus, the method involves measuring a time delay between the left and right stereo channels, and determining a location of the mobile device within the vehicle based on the time delay.

Additionally one may compare the volume of the left channel versus right to determine which side of the vehicle the device is located on. More precisely, this is done by taking the ratio of the energy in the left channel impulse response to the right channel. If this quantity is greater than 1, the device is estimated to be on the left side of the vehicle, else the right side. The smaller or greater this quantity is in magnitude away from 1, the more certain the conclusion. This approach is not as desirable as the first as it can potentially be gamed by the user who is driving, by adjusting the stereo balance to make the right speaker stronger, increasing the likelihood that the device will be estimated to be on the right side of the vehicle. This approach can also be combined with the previous to make a fused decision.

Knowing whether the user's mobile device is on the left or right side of the vehicle can indicate whether the user is driving the vehicle or riding as a passenger. Rather than relying on a delay estimate obtained from a single wake-up period, this procedure can be performed at multiple wake-up periods throughout a drive to determine a plurality of devices locations within the vehicle. If instances are observed where the device is on the driver side of the vehicle, it is inferred that the device's owner is driving. If all observed instances reveal the device on the right side of the vehicle, it is inferred that the device's owner is a passenger.

In countries that drive on the left side of the road, this procedure is reversed. This information can be used in a telematics system that monitors driver behavior (mileage, speed, harsh braking, etc.) for the purpose of awarding an auto-insurance premium discount. If for a particular trip, the device owner is found to be a passenger, the record would not count toward the potential premium discount. This information could also be combined with other information, such as details of the route taken, or other audio information (see below) to enhance the accuracy of the driver/passenger detection. There remains the possibility that the user rides as a passenger in the back seat behind the driver. In this rare case, if used in isolation, the afore-described approach could potentially rate the user based on someone else's driving.

Determining if Passengers are Present in the Automobile Via Audio

Figure 31:
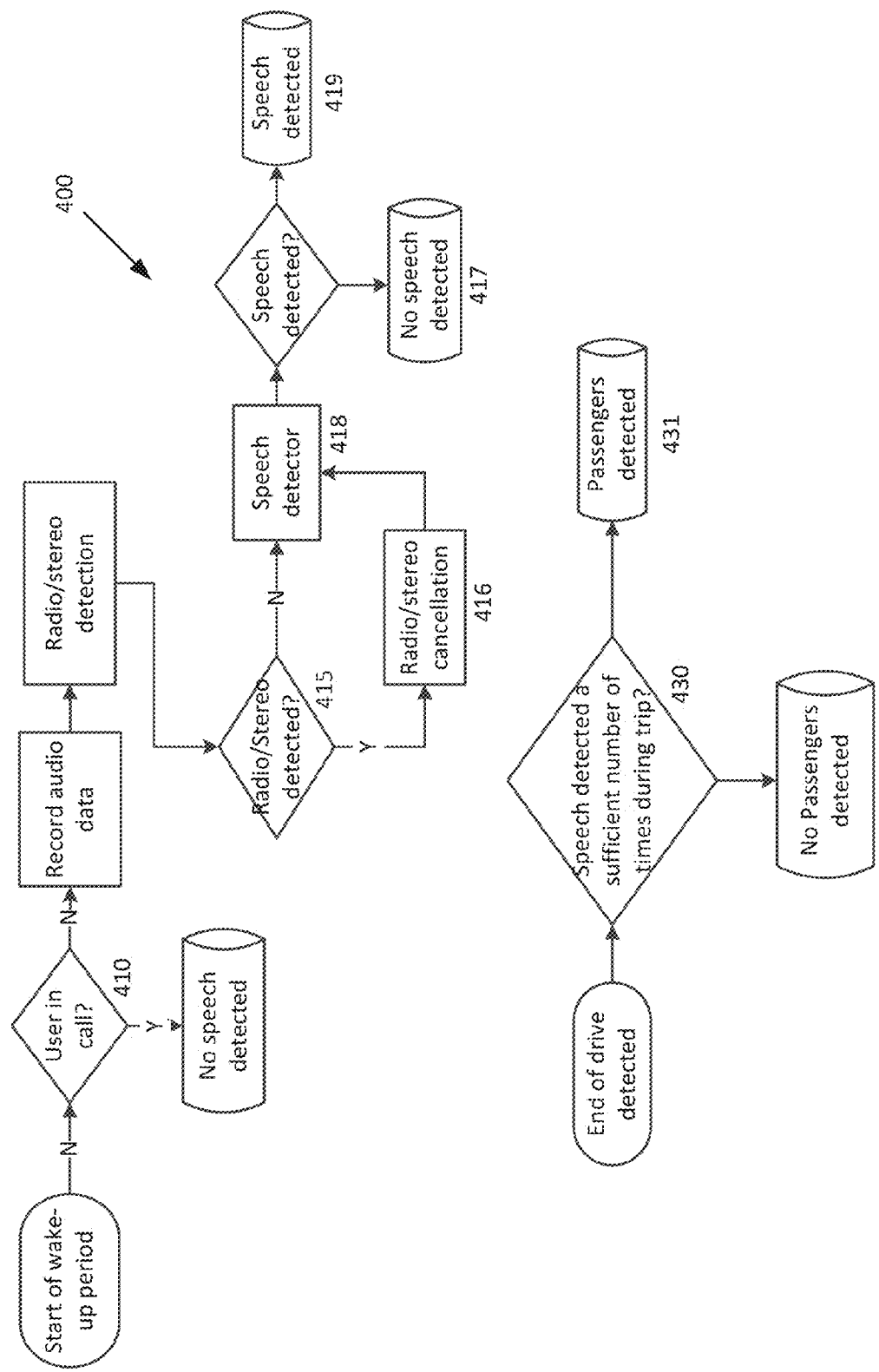
FIG. 31 is an exemplary flowchart of detecting if passengers are present in an automobile via audio.

During monitoring state wake-ups, audio data can be collected and analyzed to determine if speech is present in the audio stream, such as the residual audio stream after background audio stream cancellation. One embodiment of the passenger detection technique is summarized in flowchart 400 of FIG. 31, detecting if passengers are present in the automobile via audio. If speech is observed in the audio stream during multiple wake-ups, the system may infer that passengers are in the vehicle (431 of FIG. 31)—for example, if the fraction of wake-ups, or the total number of wake-ups, for which speech is detected is greater than a certain threshold at step 430. Here the assumption is that the user will not speak for prolonged periods of time unless passengers are in the vehicle. The exception is if the user is speaking on the phone, such as at step 410. As these events are also detected (as described in a section above) the system can eliminate these false alarms. The other alternative is if the user is listening to talk radio, an audio book, or any other forms of speech emanating from the radio/stereo at step 415. As this can be ascertained using the techniques described above, the system can also eliminate these false alarms by reporting that no speech/passenger is present if speech is detected at step 417 from the radio/stereo. Furthermore, if the radio/stereo is detected from the radio/stereo, it can be cancelled from the audio stream at step 416 using the technique described above. It then becomes easier to detect if speech from passengers is present, in step 419, in the residual audio stream. This technique is particularly helpful if the radio/stereo is turned up to a high volume such that it partially or fully masks the speech from passengers. It can also help deal with the case where speech is both emanating from the car speakers and from a passenger by removing the speech from the car's speakers to reveal the presence of the speech from the car's passengers.

Speech Detection

To determine if speech is present in a given audio recording, the audio recording is run through a speech detector 418. The speech detector 418 works by computing features such as Mel-Frequency Cepstral Coefficients (MFCCs) from the audio signal and using in a GMM classifier that has been trained offline using a database of speech and non-speech signals. The speech detector may output a soft decision such as a probability of speech present or log-likelihood.

The presence of passengers may be used as an indicator that the driver is at increased risk of accident. This information may be used in auto-insurance telematics to adjust the driver's policy discount (adversely). It can also be used in a system that generates risk alerts by fusing information from different sources (see above). It can be very helpful in aiding driver/passenger detection by identifying that the device owner is the driver if no passengers are present. A possible exception is if the user is riding in a taxi or shuttle.

Determining which Vehicle the User is in Using Audio

During monitoring state wake-ups, audio data can be collected and analyzed to attempt to detect the presence of audio signatures particular to a vehicle environment, such as a turn signal sound. The vehicle can them be identified based on the audio signature. Other audio signature characteristics that are possible for identifying a vehicle include, for example, engine noise, the vibrating vehicle chassis or components in the vehicle interior, audio echoes, the vehicle horn when used, passenger voice signatures, and the unique ID of the mobile device. Using the audio player of the device, known reference signals can be generated to be used in vehicle identification. If detected, the audio signature of the turn signal, which typically differs between different brands and models of vehicle, can be used to characterize the vehicle. This can be done in numerous ways. A supervised way is to compare the audio signature to a database of known turn signal audio signatures. An unsupervised way is to perform a distance test, i.e. compare the audio signature captured in a particular drive to the audio signal captured in other drives. If the current signature matches greater than a certain fraction of signatures captured during previous drives, the vehicle can be assumed to be the user's primary vehicle covered by their insurance policy. This can help distinguish when the user is driving versus riding as a passenger. A variant of this approach (also unsupervised) is to, at the end of a given drive, cluster all turn signal audio signatures captured in drives to date. The cluster with the most data points landed in it is assumed to correspond to the user's primary vehicle. Drives that fall within this cluster are assumed to occur with the user driving rather than riding as a passenger.

In some embodiments, the audio signature that is identified is used as a fingerprint for that vehicle, and is stored in a database of vehicle audio signatures. The signature may serve as a unique sound fingerprint for the vehicle model and even the specific vehicle owned by that driver; and the database may be created as various vehicles are characterized and added to the database. The audio signature may be stored with an identifier of the mobile device (e.g., phone ID) in the vehicle audio signature database.

Automatic Drive/Travelling Companion Detection

This method enables the monitoring to determine if person, called "target", is driving or more broadly is in transition or is travelling with at least one other person, called "approved companion", which is part of a defined group of approved people, called "approved companion pool." As an example: Say two parents would like to detect if their child is riding a car with someone other than a defined group of people (e.g. parents, nanny, grandmother, Friend A). Given the child (target) is in a moving vehicle (as a driver or as a passenger), the idea is to be able to automatically determine if the child (target) is travelling with at least one person (approved companion) which is marked as approved, or if the child is travelling without an approved person (hence not with a person being part of the approved companion pool). Given the outcome of this determination, different actions may be taken, e.g. the route can be made available to a third party (e.g. the parents), a notification can be sent (e.g. to the parents, police), an alert mode can be entered, and many more/other actions.

The method to detect whether or not a target is travelling with an approved companion utilizes a set of mobile devices (e.g. phone, watch, dongle, . . . ) where each of these devices is enabled with drive/travelling monitoring capability. All persons part of the corresponding approved companion pool will carry a device with activated drive/travel monitoring. Once the target's device is determining that the target is travelling, all devices of all corresponding approved companions are verified (through means of communication) to determine if any of them is detecting travelling on the same route. As soon as an approved companion is detected to be travelling the same route, the target is detected to travel with an approved companion, otherwise if none of the corresponding approved companions is found to travel on the same route at this moment the target is travelling without approved companion. This process determines if or if not the target is travelling with an approved companion. Based on the outcome, actions can be triggered.

Determine the Driven Mileage/Odometer Reading from a Vehicle Using a Camera or Video Enabled Mobile Device.

This method enables the determination of the driven mileage/odometer reading of a vehicle from a vehicle using a camera or video enabled mobile device by directing the focus of the photo camera or video camera towards the odometer reading. The same method as well as all variations below can be used to determine total driven mileage or trip mileage of the total mileage odometer or the trip mileage odometer, respectively.

Variation 1: The method describes the use of a photo camera of a mobile device to capture image data of the odometer of the vehicle and utilize optical character recognition to identify the mileage reading displayed on a picture taken by this device.

Variation 2: The method describes the use of a photo camera of a mobile device to focus on the odometer of the vehicle (without taking a picture) and utilize optical character recognition on the data stream produced by the camera (without taking a picture) to identify the mileage reading displayed in focus.

Variation 3: The method describes the use of a video camera of a mobile device to capture a video of the odometer of the vehicle and utilize optical character recognition on the video data produced by the video camera to identify the mileage reading displayed in the video taken by this device.

Variation 4: The method describes the use of a video camera of a mobile device to focus on the odometer of the vehicle (without capturing any video data) and utilize optical character recognition on the data shown in focus to identify the mileage reading displayed.

Using Image or Video Data from a Mobile Device to Enable Post Verification of the Driven Mileage/Odometer Reading from a Vehicle at a Later Point in Time.

Variation 1: The method describes the use of a photo camera of a mobile device to capture image data of the odometer of the vehicle and utilizes communication to send the data to the backend server. On the backend, the image data is stored.

Variation 2: The method describes the use of a video camera of a mobile device to capture video data of the odometer of the vehicle and utilize communication to send the video data to the backend server. On the backend, the video data is stored.

Using Image or Video Data from a Mobile Device to Challenge the Data Accuracy of a Previous Computation that Determined a Total Driven Mileage Reading.

Variation 1: The method describes a process in which an operator whose vehicle mileage is monitored though a third party utilizes a photo camera of a mobile device to challenge the accuracy of the third party monitoring method. At the beginning of the process the operator is starting the process by capturing image data of the odometer of the vehicle. Before or at least at and after the time the image was done, the third party method is used to monitor/compute the mileage driven. This computed mileage data (by the third party) is periodically presented to the operator of the vehicle. The operator can then challenge the accuracy of the data produced by the third party method by utilizing a photo camera of a mobile device to capture image data of the odometer of the vehicle. This data can then be used as part of a complaint which is communicated to the backend server. At the server the complaint can then be verified. This enables the operator to prove potentially occurring inaccuracy in the third party mileage monitoring method.

Variation 2: The method describes a process in which an operator whose vehicle mileage is monitored though a third party utilizes a video camera of a mobile device to challenge the accuracy of the third party monitoring method. At the beginning of the process the operator is starting the process by capturing video data of the odometer of the vehicle. Before or at least at and after the time the video was done, the third party method is used to monitor/compute the mileage driven. This computed mileage data (by the third party) is periodically presented to the operator of the vehicle. The operator can then challenge the accuracy of the data produced by the third party method by utilizing a video camera of a mobile device to capture video data of the odometer of the vehicle. This data can than be used as part of a complaint which is communicated to the backend server. At the server the complaint can then be verified. This enables the operator to prove potentially occurring inaccuracy in the third party mileage monitoring method.

Review of Concepts

Audio Analysis

In some embodiments, methods for cancelling a background audio stream in a recorded audio signal include contacting an online database that contains a plurality of audio streams; identifying the background audio stream from the plurality of audio streams contained in the database; and canceling the contribution of the background audio stream in the recorded audio signal based on the background audio stream obtained from the database. When a stereo background audio stream is detected in the recorded audio signal, the method may include performing successive cancellation of each stereo channel. The successive cancellation may comprise for each stereo channel, projecting the recorded signal onto a subspace approximately orthogonal with one stereo channel and estimating the background audio stream of other stereo channel. Another embodiment includes obtaining a coarse geographic location of a recorder at a time the background audio stream was recorded in a recorded audio signal; determining, based on the coarse geographic location, one or more radio stations as a possible source of the background audio stream; comparing the recorded audio signal with an online streamed radio database to identify one of the one or more radio stations as the source of the background audio stream; and canceling the contribution of the background audio stream in the recorded audio signal using an original background stream from the identified radio station as the reference. Obtaining a coarse geographic location may comprise obtaining the location via at least one of GPS, cellular network, WiFi signature, and IP address.

A method for determining a position of a mobile device in a vehicle include detecting that the device is riding in a vehicle; recording a first plurality of audio signals, each at a different time; contacting an online database that contains a second plurality of audio streams; identifying a background stereo audio stream from each of the first plurality of recorded audio signals based on the second plurality of audio streams contained in the database; estimating responses of both stereo channels for background stereo audio streams for each of the first plurality of audio signals to determine a delay time between an arrival of left and right stereo channel audio signals; and determining, based on a combined estimated response, that the mobile device is positioned on the left side of the vehicle when the left stereo channel audio signal arrives before the right stereo channel audio signal, and the mobile device is positioned on the right side of the vehicle when the right stereo channel audio signal arrives before the left stereo channel audio signal.

A method of detecting presence of a passenger in a vehicle includes detecting that the device is riding in a vehicle; recording an audio signal; contacting an online database that contains a plurality of audio streams; identifying a background audio stream from the recorded audio signals based on the plurality of audio streams contained in the database; detecting no human speech by analyzing the background audio stream; detecting human speech by analyzing the recorded audio signal; determining a passenger is present based on whether human speech is detected in the recorded audio signal and not detected in the background audio stream. Analyzing the audio signal may include computing Mel-Frequency Cepstral Coefficients (MFCCs) from the audio signal having the background audio stream canceled; and applying the MFCCs to a Gaussian Mixture Model (GMM) classifier that differentiates between speech and non-speech signals. A passenger is determined to be present when a predetermined amount of identified speech is detected. Some embodiments may include canceling the contribution of the background audio stream in the recorded audio signal based on the background audio stream obtained from the database; and detecting human speech by analyzing the audio signal having the background audio stream canceled.

Low-Power Triggering Architecture

Some embodiments include, a method of determining, on a mobile device, when to enter a mobility monitoring mode of high power-consumption, by using operations of low power consumption includes: waking up the mobile device periodically for a limited period of time; collecting data from motion sensors on the mobile device; analyzing the collected motion sensor data to determine if the user is in one of a plurality of predetermined mobility states; and entering a mobility monitoring mode of high power-consumption, if the user is determined to be in one of a plurality of pre-determined mobility states. In a lowest power mode, the method may include first determining if the mobile device is connected to a wireless network access point; and immediately putting the mobile device back to sleep if it is determined to be connected to a wireless network access point. Analyzing the collected motion sensor data may involve determining from the collected motion sensor data, if the mobile device is stationary, and immediately putting the mobile device back to sleep if it is determined to be stationary. In other embodiments, analyzing the collected motion sensor data may involve performing activity recognition on the sensor data; and immediately putting the mobile device back to sleep if the activity recognizer fails to recognize one of a plurality of predetermined mobility states.

Methods may also include performing low-accuracy, low-power consumption activity recognition on the sensor data; immediately putting the mobile device back to sleep if the low-accuracy, low-power consumption activity recognizer fails to recognize one of a plurality of predetermined mobility states; collecting a second amount of data from motion sensors on the mobile device if the low-accuracy, low-power consumption activity recognizer recognizes one of a plurality of predetermined mobility states; performing high-accuracy, high-power consumption activity recognition on the first and second amount of sensor data; and immediately putting the mobile device back to sleep if the high-accuracy, high-power consumption activity recognizer fails to recognize one of a plurality of predetermined mobility states. Another embodiment includes if the activity recognizer recognizes one of a plurality of predetermined mobility states, collecting a second amount of sensor data; performing activity recognition on the first and second amounts of sensor data; immediately putting the mobile device back to sleep if the activity recognizer fails to recognize one of a plurality of predetermined mobility states. A further embodiment includes obtaining a GPS fix for the mobile device; extracting from the GPS fix, a speed of the mobile device; determining if the speed of the mobile device is consistent with one of a plurality of predetermined mobility states; and immediately putting the mobile device back to sleep if the speed of the mobile device is not consistent with one of a plurality of predetermined mobility states. Another embodiment includes performing a succession of scans for visible wireless network access points; determining if the overlap between the succession of scans is consistent with one of a plurality of predetermined mobility states; immediately putting the mobile device back to sleep if the overlap between the succession of scans is not consistent with one of a plurality of predetermined mobility states. One embodiment includes incrementing a state of a state machine when the actual mobility state of the mobile device is determined. In some embodiments, the plurality of possible predetermined mobility states comprise walking, running, bicycling, and riding inside a moving vehicle.

In some embodiments, controlling power consumption of a mobile monitoring device includes waking-up the mobile monitoring device periodically for a predetermined period of time; analyzing motion of the mobile monitoring device during each wake-up period of a plurality of wake-up periods by—in a lowest power mode, determining if the mobile monitoring device is connected to a wireless network access point; in response to a determination that the mobile monitoring device is not connected to a wireless network access point, in a second power mode higher than the lowest power mode collecting a first amount of sensor data to determine if the mobile monitoring device is in motion; in response to a determination that the mobile monitoring device is in motion, in a third power mode higher than the second power mode collecting a second amount of sensor data greater than the first amount of sensor data and performing low accuracy activity recognition on the second amount of sensor data; determining a plurality of possible mobility states of the mobile monitoring device based on the results of the low accuracy activity recognition performed on the second amount of sensor data; in response to a determination of the plurality of possible mobility states, in a fourth power mode higher than the third power mode performing high accuracy activity recognition on the second amount of sensor data; determining an actual mobility state of the mobile monitoring device as one of the plurality of possible mobility states based on the results of the high accuracy activity recognition performed on the second amount of sensor data; and in response to a determination of a same actual mobility state of the mobile monitoring device during a predetermined number of consecutive wake up periods, in a fifth power mode higher than the fourth power mode enabling a monitoring mode of the mobile monitoring device. The methods may include incrementing a state of a state machine when the actual mobility state of the mobile monitoring device is determined. The plurality of possible mobility states may comprise walking, running, bicycling, and driving.

Learning a Driving Route

Methods of learning a driving route include periodically obtaining location fixes over the driving route to accumulate a sparse plurality of location fixes; obtaining an initial driving route based on starting and ending location fixes using a driving directions API; and recursively interpolating a driving route obtained from the driving directions API based on selected best route way points from the sparse plurality of GPS location fixes. In one embodiment, periodically obtaining location fixes comprises modulating the periodicity between about 30 seconds and 5 minutes. The periodicity may be modulated based on at least one of vehicle speed, route prediction, and directional change. In one embodiment, a location fix is selected as a best way point based on a predetermined accuracy and deviation from the driving route during the recursive interpolation. In another embodiment, the location fixes are obtained through a GPS scan. In some embodiments, the location fixes are obtained by scanning for the presence of wireless network access points; and querying a database of location information for wireless network access points to obtain a geographic location consistent with the set of wireless network access points visible in the scan.

Methods of learning a public transit route include periodically obtaining location fixes over the public transit route traveled to accumulate a sparse plurality of location fixes; obtaining a plurality of possible routes traveled based on starting and ending location fixes using a public transit directions API; comparing each of the plurality of possible routes traveled with the sparse plurality of location fixes; and determining the route with a greatest fraction of consistent location fixes as the public transit route traveled. A location fix may be consistent with a route when the location fix is within a predetermined deviation from the route to which it is compared. The location fixes may be obtained through a GPS scan. In some embodiments, the location fixes are obtained by scanning for the presence of wireless network access points; and querying a database of location information for wireless network access points to obtain a geographic location consistent with the set of wireless network access points visible in the scan.

In this document, various computer-implemented methods, processes and procedures are described. It is to be understood that the various actions (storing, determining, computing, etc.) are performed by hardware, such as general-purpose computing hardware devices, even if the action may be authorized, initiated or triggered by a user, or even if the hardware is controlled by a computer program, software, firmware, etc. Further, it is to be understood that the hardware is operating on data, even if the data may represent concepts or real-world objects, thus the explicit labeling as "data" as such is omitted. For example, when the hardware device is described as "storing a signal," it is to be understood that the hardware device is storing data that represents the signal.

Figure 32:
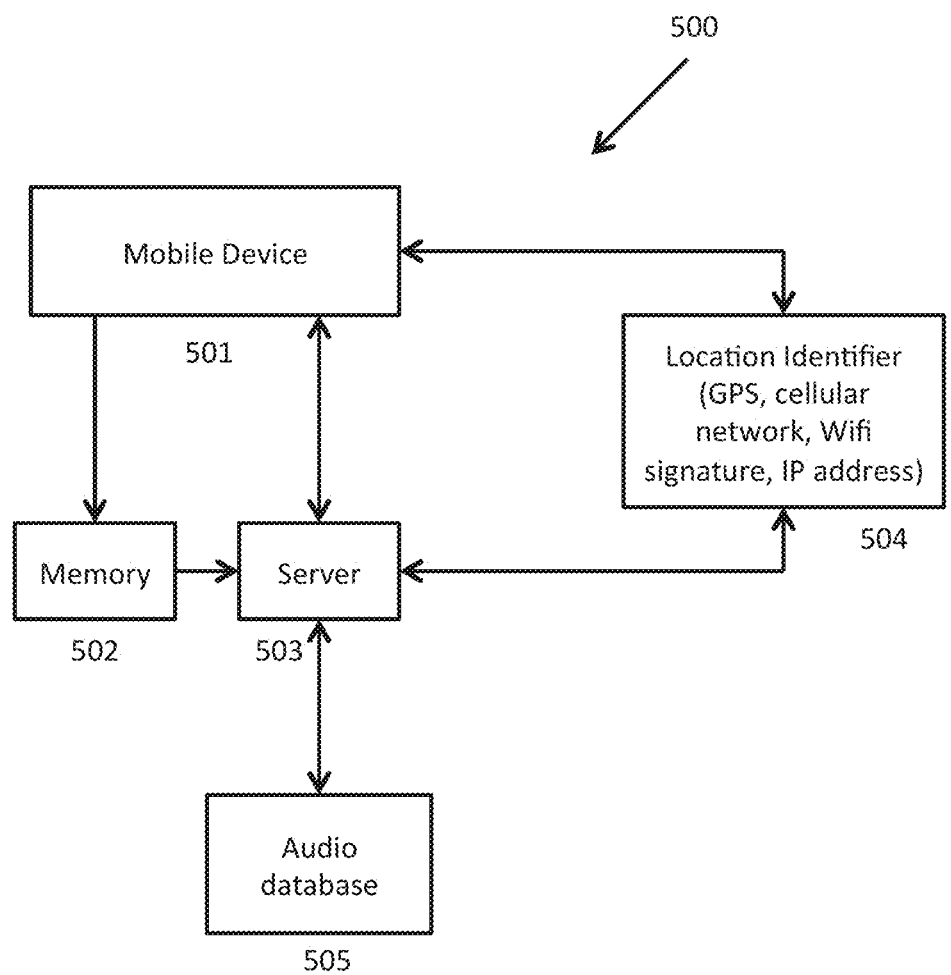
FIG. 32 is an embodiment of a computer-implemented system including a mobile device.

An exemplary embodiment of a computer-implemented system with a mobile device is provided in FIG. 32. In system 500 of FIG. 32, a mobile device 501 is, for example, a smartphone, tablet or smartwatch. The mobile device 501 records and stores data, such as audio signals and accelerometer data, on its own internal memory, or in other embodiments, may store data on an external memory device 502. Memory device 502 may be, for example, a personal computer, system server, or cloud storage. In some embodiments, memory 502 is part of a server 503. Server 503 is a general-purpose computer that is capable of hosting and performing computations for a telematics software program, such as has been described herein. Mobile device 501 and server 503 communicate with a location identifier 504, where location identifier 504 may be a GPS system, cellular network, Wifi signature identifier, or IP address. Data from location identifier 504 can be used to provide information for the telematics software program, such as geographic positions for estimating driving routes, or possible audio input sources including radio and televisions stations. Using data from mobile device 501, memory 502, location identifier 504 and audio database 505, the server 503 performs operations for the telematics software such as determining audio signal matches, computing time alignments between recorded and reference audio signals, cancelling background audio streams, determining driving behavior factors, estimating drive routes, and determining operation of the mobile device between triggering and monitoring states.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method of analyzing audio signals for a drive monitoring system, the method comprising:
   recording an audio signal from a mobile device, the recorded audio signal including a background audio stream and a residual audio signal;
   communicating with an audio database to obtain a reference signal, wherein the communicating uses a location identifier to determine input sources for the audio database, and wherein the location identifier is chosen from the group consisting of a global positioning system (GPS), cellular network, Wifi signature, and internet protocol address;
   determining if the background audio stream in the recorded audio signal matches the reference signal;
   if a match between the background audio stream and the reference signal is confirmed, computing a time alignment between the background audio stream and the reference signal;
   aligning at least a portion of the recorded audio signal with the reference signal using the time alignment;
   canceling the background audio stream from the recorded audio signal, wherein the remaining portion of the recorded audio signal, after cancellation of the background audio stream, comprises the residual audio stream; and
   determining, with a computer processor, a driving behavior factor from the residual audio stream, wherein the driving behavior factor is chosen from the group consisting of: identification of a vehicle where the recorded audio signal was recorded, location of the mobile device within the vehicle, and speech recognition to identify the presence of passengers in the vehicle.

2. The method of claim 1, further comprising calculating an insurance driving score for a driver based at least in part on the driving behavior factor.

3. The method of claim 1, further comprising:
   locating a radio station, based on a coarse geographic location from the location identifier, wherein the radio station has an online radio database to serve as the audio database;
   comparing the recorded audio signal with the online radio database from the radio station to determine if a match is found between a selected signal in the online radio database and the background audio stream; and
   using the selected signal in the online radio database, if a match is found, as the reference signal for computing the time alignment.

4. The method of claim 1, wherein the recorded audio signal is a stereo signal comprising a left channel and a right channel, and
   wherein the canceling comprises performing successive cancellation of the channels based on interference between the left and the right stereo channels.

5. The method of claim 4, further comprising:
   measuring a time delay between the left and right stereo channels; and
   determining a location of the mobile device within the vehicle based on the time delay.

6. The method of claim 1, further comprising:
   analyzing the residual audio stream to detect the presence of an audio signature particular to a vehicle environment; and
   identifying a vehicle based on the audio signature.

7. A method of analyzing audio signals for an automobile insurance system,
   the method comprising:
   recording an audio signal from a mobile device, the recorded audio signal including a background audio stream and a residual audio signal;
   communicating with an audio database to obtain a reference signal;
   determining if the background audio stream in the recorded audio signal matches the reference signal;

if a match between the background audio stream and the reference signal is confirmed, computing a time alignment between the background audio stream and the reference signal;

aligning at least a portion of the recorded audio signal with the reference signal using the time alignment;

canceling the background audio stream from the recorded audio signal, wherein the remaining portion of the recorded audio signal, after cancellation of the background audio stream, comprises the residual audio stream; and determining, with a computer processor, a driving behavior factor from the residual audio stream, wherein the driving behavior factor is chosen from the group consisting of: identification of a vehicle where the recorded audio signal was recorded, location of the mobile device within the vehicle, and speech recognition to identify the presence of passengers in the vehicle;

wherein the communicating uses a location identifier to determine input sources for the audio database, wherein the location identifier is chosen from the group consisting of a global positioning system (GPS), cellular network, Wifi signature, and internet protocol address.

8. The method of claim 7, further comprising:

locating a radio station, based on a coarse geographic location from the location identifier, wherein the radio station has an online radio database to serve as the audio database;

comparing the recorded audio signal with the online radio database from the radio station to determine if a match is found between a selected signal in the online radio database and the background audio stream; and using the selected signal in the online radio database, if a match is found, as the reference signal for computing the time alignment.

9. A method of analyzing audio signals, the method comprising:

recording an audio signal from a mobile device, the recorded audio signal including a background audio stream and a residual audio signal;

communicating with an audio database to obtain a reference signal;

determining if the background audio stream in the recorded audio signal matches the reference signal;

if a match between the background audio stream and the reference signal is confirmed, computing a time alignment between the background audio stream and the reference signal, wherein the computing comprises taking pilot snippets of the reference signal and aligning the pilot snippets with a start time and an end time of the recorded audio signal;

aligning at least a portion of the recorded audio signal with the reference signal using the time alignment;

canceling the background audio stream from the recorded audio signal, wherein the remaining portion of the recorded audio signal, after cancellation of the background audio stream, comprises the residual audio stream; and determining, with a computer processor, a driving behavior factor from the residual audio stream, wherein the driving behavior factor relates to automobile insurance;

wherein the communicating uses a location identifier to determine input sources for the audio database, wherein the location identifier is chosen from the group consisting of a global positioning system (GPS), cellular network, Wifi signature, and internet protocol address, and wherein the method further comprises:

locating a radio station, based on a coarse geographic location from the location identifier, wherein the radio station has an online radio database to serve as the audio database;

comparing the recorded audio signal with the online radio database from the radio station to determine if a match is found between a selected signal in the online radio database and the background audio stream; and using the selected signal in the online radio database, if a match is found, as the reference signal for computing the time alignment.

* * * * *